(12) United States Patent
Kondo

(10) Patent No.: US 8,787,453 B2
(45) Date of Patent: *Jul. 22, 2014

(54) IMAGE DECODING DEVICE, IMAGE ENCODING DEVICE, AND METHOD THEREOF

(71) Applicant: Sony Corporation, Tokyo (JP)

(72) Inventor: Kenji Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/943,028

(22) Filed: Jul. 16, 2013

(65) Prior Publication Data

US 2013/0301710 A1 Nov. 14, 2013

Related U.S. Application Data

(63) Continuation of application No. 13/994,247, filed as application No. PCT/JP2012/050456 on Jan. 12, 2012.

(30) Foreign Application Priority Data

Jan. 24, 2011 (JP) .............................. P2011-011861
Jul. 11, 2011 (JP) .............................. P2011-153183

(51) Int. Cl.
*H04N 7/12* (2006.01)

(52) U.S. Cl.
USPC ................................ 375/240.03; 375/240.25

(58) Field of Classification Search
USPC .................. 375/240, 240.01, 240.03, 240.18, 375/240.25; 725/131
See application file for complete search history.

(56) References Cited

U.S. PATENT DOCUMENTS

2008/0256589 A1* 10/2008 Osaki ............................ 725/131
2011/0038422 A1* 2/2011 Cheon et al. ............. 375/240.18

* cited by examiner

*Primary Examiner* — Allen Wong
(74) *Attorney, Agent, or Firm* — Sherr & Jiang, PLLC

(57) ABSTRACT

A lossless decoding unit 52 takes quantization parameters of decoded blocks spatially or temporally adjacent to a block to be decoded, as selection candidates, and extracts, from stream information, difference information indicating difference as to a prediction quantization parameter selected from the selection candidates. A quantization parameter calculating unit 59 calculates, from the prediction quantization parameter and the difference information, a quantization parameter of the block to be decoded. Thus, decoding of the image can be performed correctly by calculating a quantization parameter equal to a quantization parameter used at the time of image encoding.

20 Claims, 31 Drawing Sheets

FIG. 13

| seq_parameter_set_rbsp( ) { | Descriptor |
|---|---|
|   profile_idc | u(8) |
|   reserved_zero_8bits /* equal to 0 */ | u(8) |
|   level_idc | u(8) |
|   seq_parameter_set_id | ue(v) |
|   pic_width_in_luma_samples | u(16) |
|   pic_height_in_luma_samples | u(16) |
|   bit_depth_luma_minus8 | ue(v) |
|   bit_depth_chroma_minus8 | ue(v) |
|   log2_max_frame_num_minus4 | ue(v) |
|   pic_order_cnt_type | ue(v) |
|   if( pic_order_cnt_type == 0 ) | |
|     log2_max_pic_order_cnt_lsb_minus4 | ue(v) |
|   else if( pic_order_cnt_type == 1 ) { | |
|     delta_pic_order_always_zero_flag | u(1) |
|     offset_for_non_ref_pic | se(v) |
|     num_ref_frames_in_pic_order_cnt_cycle | ue(v) |
|     for( i = 0; i < num_ref_frames_in_pic_order_cnt_cycle; i++ ) | |
|       offset_for_ref_frame[ i ] | se(v) |
|   } | |
|   max_num_ref_frames | ue(v) |
|   gaps_in_frame_num_value_allowed_flag | u(1) |
|   log2_min_coding_block_size_minus3 | ue(v) |
|   log2_diff_max_min_coding_block_size | ue(v) |
|   log2_min_transform_block_size_minus2 | ue(v) |
|   log2_diff_max_min_transform_block_size | ue(v) |
|   max_transform_hierarchy_depth_inter | ue(v) |
|   max_transform_hierarchy_depth_intra | ue(v) |
|   adaptive_loop_filter_enabled_flag | u(1) |
|   cu_qp_delta_enabled_flag | u(1) |
|   rbsp_trailing_bits( ) | |
| } | |

FIG. 16

| slice_header( ) { | Descriptor |
|---|---|
|   first_tb_in_slice | ue(v) |
|   entropy_slice_flag | u(1) |
|   if( !entropy_slice_flag ) { | |
|     slice_type | ue(v) |
|     pic_parameter_set_id | ue(v) |
|     frame_num | u(v) |
|     if( IdrPicFlag ) | |
|       idr_pic_id | ue(v) |
|     if( pic_order_cnt_type == 0 ) | |
|       pic_order_cnt_lsb /* | u(v) |
|     if( slice_type == P || slice_type == B ) { | |
|       num_ref_idx_active_override_flag | u(1) |
|       if( num_ref_idx_active_override_flag ) { | |
|         num_ref_idx_l0_active_minus1 | ue(v) |
|         if( slice_type == B ) | |
|           num_ref_idx_l1_active_minus1 | ue(v) |
|       } | |
|     } | |
|     ref_pic_list_modification( ) | |
|     ref_pic_list_combination( ) | |
|     if( nal_ref_idc != 0 ) | |
|       dec_ref_pic_marking( ) | |
|     if( entropy_coding_mode_flag && slice_type != I ) | |
|       cabac_init_idc | ue(v) |
|     slice_qp_delta | se(v) |
|     if( adaptive_loop_filter_enabled_flag ) | |
|       alf_param() | |
|     if( deblocking_filter_control_present_flag ) { | |
|       disable_deblocking_filter_idc | |
|       if( disable_deblocking_filter_idc != 1 ) { | |
|         slice_alpha_c0_offset_div2 | |
|         slice_beta_offset_div2 | |
|       } | |
|     } | |
|     if( slice_type == B ) | |
|       collocated_from_l0_flag | u(1) |
|   } else | |
|     if( entropy_coding_mode_flag && slice_type != I ) | |
|       cabac_init_idc | ue(v) |
| } | |

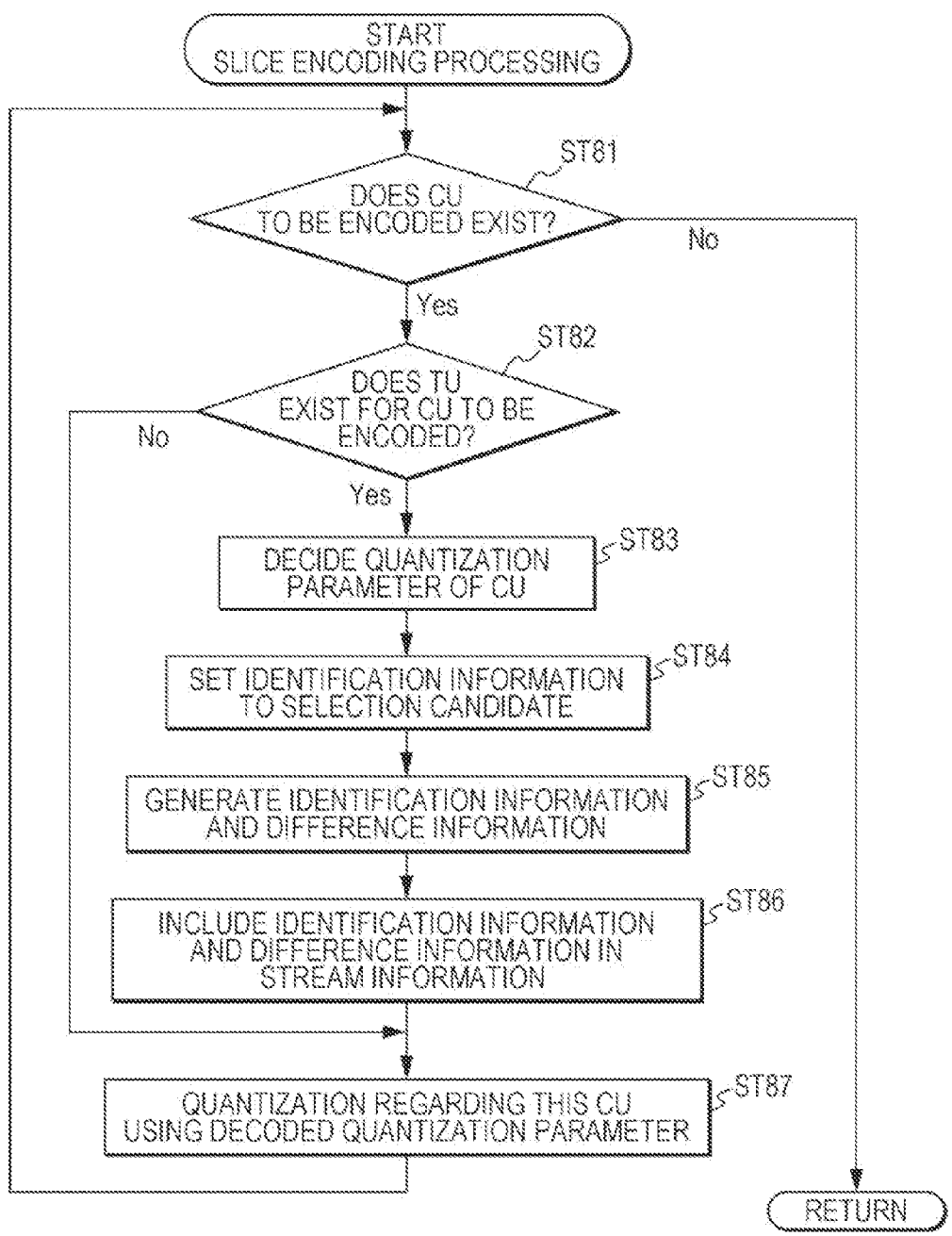

FIG. 27

```
if ( left & above ) dQP = Avg.(QP_A, QP_B)
else if ( left )dQP = QP_A
else if ( above ) dQP = QP_B
else if (above-left & above-right & below-left )
    dQP = Median or Avg.(QP_C, QP_D))
else if (above-left & above-right ) dQP = Avg.(QP_C, QP_D)
else if (above-right & below-left ) dQP = Avg.(QP_C, QP_E)
else if (above-left & below-left ) dQP = Avg.(QP_D, QP_E)
else dQP = QP_LS
```

IMAGE DECODING DEVICE, IMAGE ENCODING DEVICE, AND METHOD THEREOF

CROSS REFERENCE TO PRIOR APPLICATION

This application is a continuation of U.S. patent application Ser. No. 13/994,247 (filed on Jun. 14, 2013), which is a National Stage Patent Application of PCT International Patent Application No. PCT/JP2012/050456 (filed on Jan. 12, 2012) under 35 U.S.C. §371, which claims priority to Japanese Patent Application Nos. P2011-011861 (filed on Jan. 24, 2011) and P2011-153183 (filed on Jul. 11, 2011), which are all hereby incorporated by reference in their entirety.

TECHNICAL FIELD

The present technology relates to an image decoding device, image encoding device, and a method thereof. More particularly, encoding efficiency of quantization parameters is improved.

BACKGROUND ART

In recent years, there have come into widespread use devices which handle image information as digital in order to perform highly effective information transmission and storage at that time, for example, compliant to formats such as MPEG or the like to compress the image by orthogonal transform such as discrete cosine transform or the like and motion compensation, both in broadcasting and general households.

In particular, MPEG2 (ISO/IEC 13818-2) is defined as a general-purpose image encoding format, and has widely been employed now by a broad range of applications for professional usage and for consumer usage. By employing the MPEG2 compression format, a code amount (bit rate) of 4 through 8 Mbps is allocated in the event of an interlaced scanning image of standard resolution having 720×480 pixels, for example, whereby high compression and good image quality can be realized. Also, a code amount (bit rate) of 18 through 22 Mbps is allocated in the event of an interlaced scanning image of high resolution having 1920×1088 pixels, whereby high compression and good image quality can be realized.

Also, standardization has been performed as Joint Model of Enhanced-Compression Video Coding which realizes higher encoding efficiency though greater computation amount is required for encoding and decoding thereof, and has become an international Standard called H.264 and MPEG-4 Part 10 (hereinafter written as "H.264/AVC (Advanced Video Coding)").

With this MPEG and J.264/AVC, at the time of quantizing macroblocks, the size of quantization steps can be changed so that the compression rate is constant. Also, with MPEG, quantization parameters proportionate to the quantization steps are used, and with H.264/AVC, quantization parameters are used in which the parameter value increases by "6" when the quantization step doubles. In MPEG and H.264/AVC, quantization parameters are encoded (see PTL 1).

CITATION LIST

Patent Literature

PTL 1: Japanese Unexamined Patent Application Publication No. 2006-094081

SUMMARY OF INVENTION

Technical Problem

Now, with encoding processing of quantization parameters, in the event that the decoding order is in raster scan order as illustrated in, FIG. 1 for example, a quantization parameter SliceQPY with an initial value is used for the head macroblock of the slice. Subsequently, processing is performed in the decoding order indicated by the arrows, and the quantization parameters of this macroblock is updated by the difference value in quantization parameters as to the macroblock situated at the left side (mb_qp_delta). Accordingly, there are cases where, when the decoding order transitions from the block at the right edge to the block at the left edge, the difference value becomes great since the image is different, and encoding efficiency becomes poor. Also, encoding efficiency becomes poor in the event that the difference value as to the macroblock situated at the left side is great as well.

Further, with image compression technology, standardization is being studied for HEVC (High Efficiency Video Coding) which realizes even higher encoding efficiency than the H.264/AVC format. With this HDVC, basic units called coding units (CU: Coding Unit) which are extensions of the concept of macroblocks. In the event that each block illustrated in FIG. 2 is a coding unit, the decoding order is the order of blocks with numbers sequentially increasing from "0". In the event that the decoding order is not raster scan order in this way, moving from block "7" to block "8", for example, or from block "15" to block "16", may conceivably lead to a greater difference value since the spatial distance is great.

Accordingly, it is an object of the present technology to improve the encoding efficiency of quantization parameters.

Solution to Problem

A first aspect of this technology is an image decoding device, including: an information acquiring unit configured to take quantization parameters of decoded blocks spatially or temporally adjacent to a block to be decoded, as selection candidates, and extract, from stream information, difference information indicating difference as to a prediction quantization parameter selected from the selection candidates; and a quantization parameter calculating unit configured to calculate, from the prediction quantization parameter and the difference information, a quantization parameter of the block to be decoded.

With this technology, difference information indicating difference as to a prediction quantization parameter selected from selection candidates, which are quantization parameters of decoded blocks spatially or temporally adjacent to a block to be decoded, is extracted from stream information. Also, with the image decoding device, at least blocks where quantization parameters are redundant or blocks where inverse quantization using quantization parameters is not performed are excluded from quantization parameters of decoded blocks spatially or temporally adjacent to the block to be decoded, and selection candidates are taken. For setting of the prediction quantization parameter, a quantization parameter is selected in an order indicated by identification information included in the stream information, with the adjacent decoded blocks in a predetermined order, for example. Alternatively, determination is performed of selection candidates in an order set beforehand, and the prediction quantization parameter is set based on the determination result. Alternatively, one or the other is selected of processing of setting to the prediction quantization parameter a quantization parameter in an order indicated by identification information included in the stream information, and processing of determining selection candidates in an order set beforehand and setting the prediction quantization parameter, based on the determination result included in the stream information. Further, with the image decoding device, a quantization parameter of the block to be decoded is calculated by adding difference which the difference information indicates to the prediction quantization parameter. Further, in the event that there is no selection candidate, a quantization parameter of an initial value in a slice is taken as the prediction quantization parameter. Also, including a quantization parameter updated last in the selection candidates is also performed.

A second aspect of this technology is an image decoding method, including: a process of taking quantization parameters of decoded blocks spatially or temporally adjacent to a block to be decoded, as selection candidates, and extracting, from stream information, difference information indicating difference as to a prediction quantization parameter selected from the selection candidates; and a process of calculating, from the prediction quantization parameter and the difference information, a quantization parameter of the block to be decoded.

A third aspect of the present technology is an image encoding device, including: a control unit configured to set a quantization parameter as to a block to be encoded; an information generating unit configured to take quantization parameters of encoded blocks spatially or temporally adjacent to a block to be encoded, as selection candidates, select from the selection candidates a prediction quantization parameter in accordance to the set quantization parameter, and generate difference information indicating difference between the prediction quantization parameter and the set quantization parameters; and an encoding unit configured to include the difference information in stream information generated by performing encoding processing of the block to be encoded, using the set quantization parameter.

With this technology, at least blocks where quantization parameters are redundant or blocks where quantization using quantization parameters is not performed are excluded from quantization parameters of encoded blocks spatially or temporally adjacent to the block to be encoded, and selection candidates are taken. Also, a quantization parameter updated last or the like is also included in the selection candidates. A quantization parameter of which the difference as to the quantization parameter set from these selection candidates is the smallest, is selected as the prediction quantization parameter, and identification information for selecting the prediction quantization parameter from the selection candidates is generated. For example, identification information is the order of blocks corresponding to the selected quantization parameter, with the adjacent encoded blocks in a predetermined order. Also, the predetermined array is an order of array where priority is given to one of an encoded block adjacent to the left side, an encoded block adjacent above, and an encoded block temporally adjacent. Also, the order of array of adjacent encoded blocks can be switched. Further, quantization parameters of encoded blocks temporally adjacent may be reordered in accordance with parameter values, with the order of selected quantization parameters being taken as identification information. Also, determination of selection candidates may be performed in an order set beforehand, with the prediction quantization parameter being selected based on the determination result. Further, with the image encoding device, difference information indicating the difference between the prediction quantization parameter and the set quantization parameter is generated. Also, in the event that there is no selection candidate, difference information indicating difference between a quantization parameter of an initial value in a slice, and the set quantization parameters, is generated. Also, selection can be made between processing of setting a quantization parameter of which the difference as to the set quantization parameter is the smallest as the prediction quantization parameter, and processing of performing determination of selection candidates in an order set beforehand and selecting the prediction quantization parameter based on the determination result, and determination information indicating the selected processing is generated. The generated difference information, identification information, and determination information are included in stream information generated by performing encoding processing of the block to be encoded using the set quantization parameter.

A fourth aspect of this technology is an image encoding method, including: a process of setting a quantization parameter as to a block to be encoded; a process of taking quantization parameters of encoded blocks spatially or temporally adjacent to a block to be encoded, as selection candidates, selecting from the selection candidates a prediction quantization parameter in accordance to the set quantization parameter, and generating difference information indicating difference between the prediction quantization parameter and the set quantization parameters; and a process of including the difference information in stream information generated by performing encoding processing of the block to be encoded, using the set quantization parameter.

Advantageous Effects of Invention

According to this technology, quantization parameters of encoded blocks spatially or temporally adjacent to a block to be encoded are taken as selection candidates, and a prediction quantization parameter is selected from the selection candidates in accordance with the quantization parameter set to the block to be encoded. Difference information indicating difference between the prediction quantization parameter and the quantization parameters set as to the block to be encoded is generated. Accordingly, the difference of quantization parameters can be prevented from becoming a great value, and encoding efficiency of quantization parameters can be improved.

Also, in a case of decoding stream information where difference information is included, a prediction quantization parameter is selected from quantization parameters of decoded blocks spatially or temporally adjacent to a block to be decoded, and a quantization parameter of the block to be decoded is calculated from the prediction quantization parameter and the difference information. Accordingly, even in the event that stream information is generated with improved encoding efficiency of quantization parameters, the quantization parameters can be restored based on the prediction quantization parameter and difference information when decoding this stream information, and decoding processing can be correctly performed.

BRIEF DESCRIPTION OF DRAWINGS

FIG. 13 is a diagram exemplarily illustrating a sequence parameter set.

FIG. 16 is a diagram exemplarily illustrating a slice header.

FIG. 17 is a flowchart illustrating slice encoding processing.

FIG. 27 is a diagram exemplarily illustrating a program.

DESCRIPTION OF EMBODIMENTS

Hereinafter, embodiments of the present invention will be described. Note that description will proceed in the following order.
1. Configuration of Image Encoding Device
2. Operation of Image Encoding Device
3. Generating Operation of Identification Information and Difference Information based on Quantization Parameters
4. Configuration of Image Decoding Device
5. Operation of Image Decoding Device
6. Other Operations of Image Encoding Device and Image Decoding Device
7. Case of Software Processing
8. Case of Application to Electronic Equipment <1. Configuration of Image Encoding Device>

Figure 1:
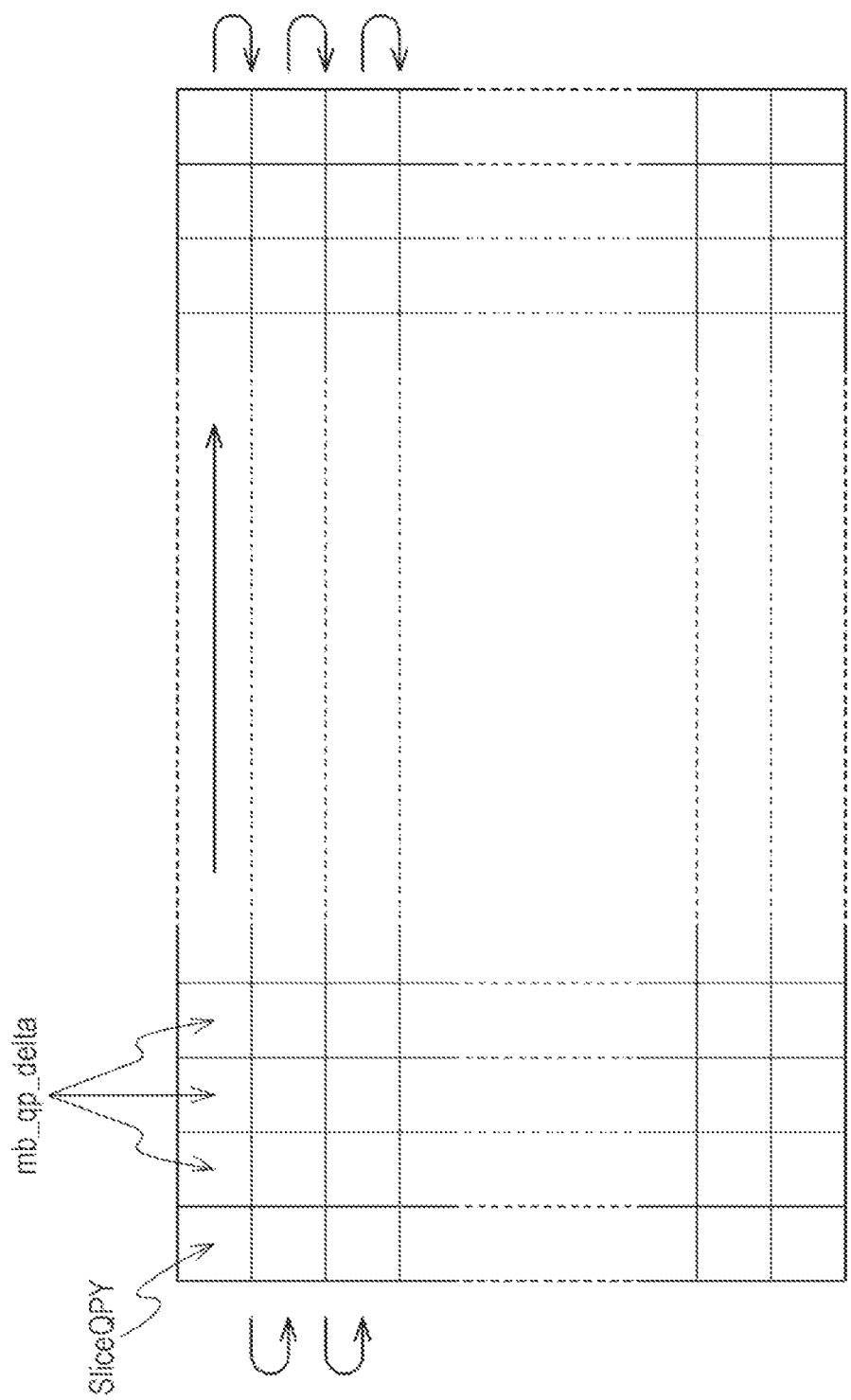
FIG. 1 is a diagram illustrating a case where decoding order is raster scan order.
Figure 2:
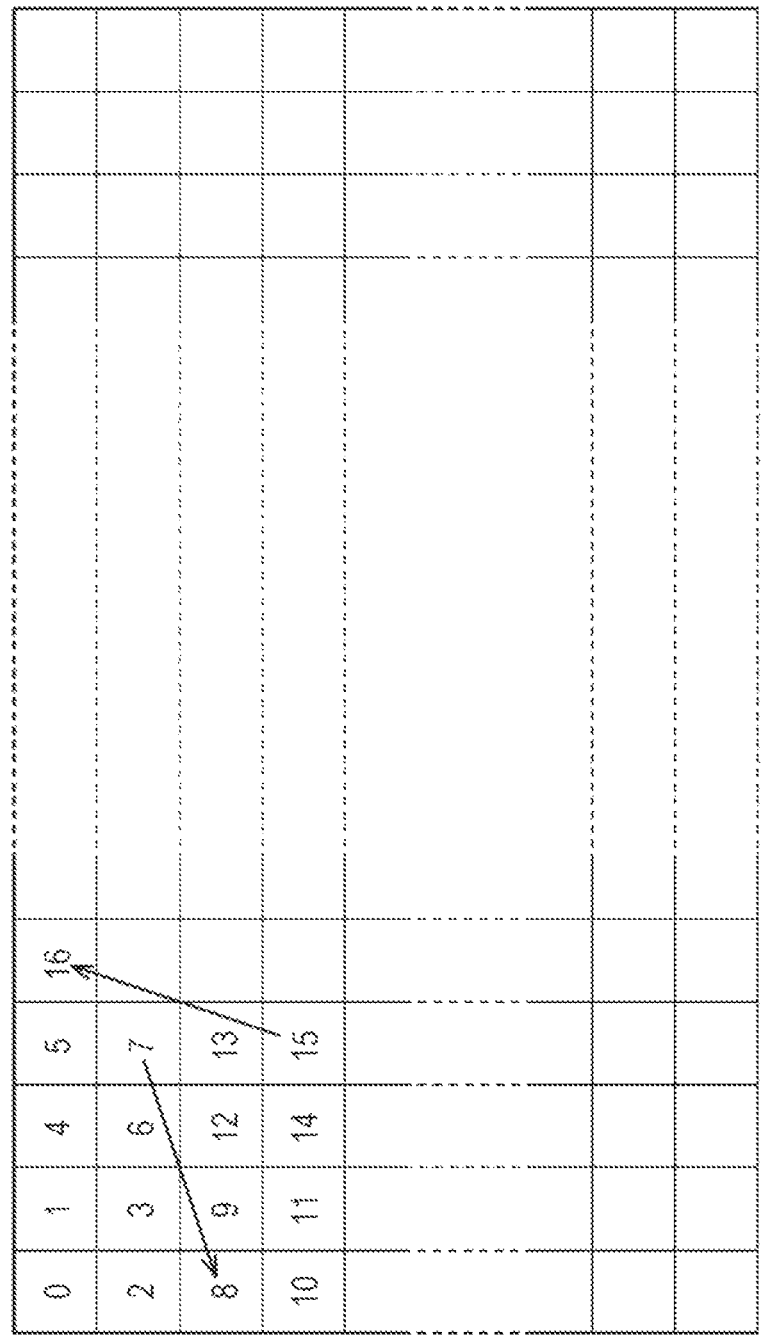
FIG. 2 is a diagram illustrating a case where decoding order is not raster scan order.
Figure 3:
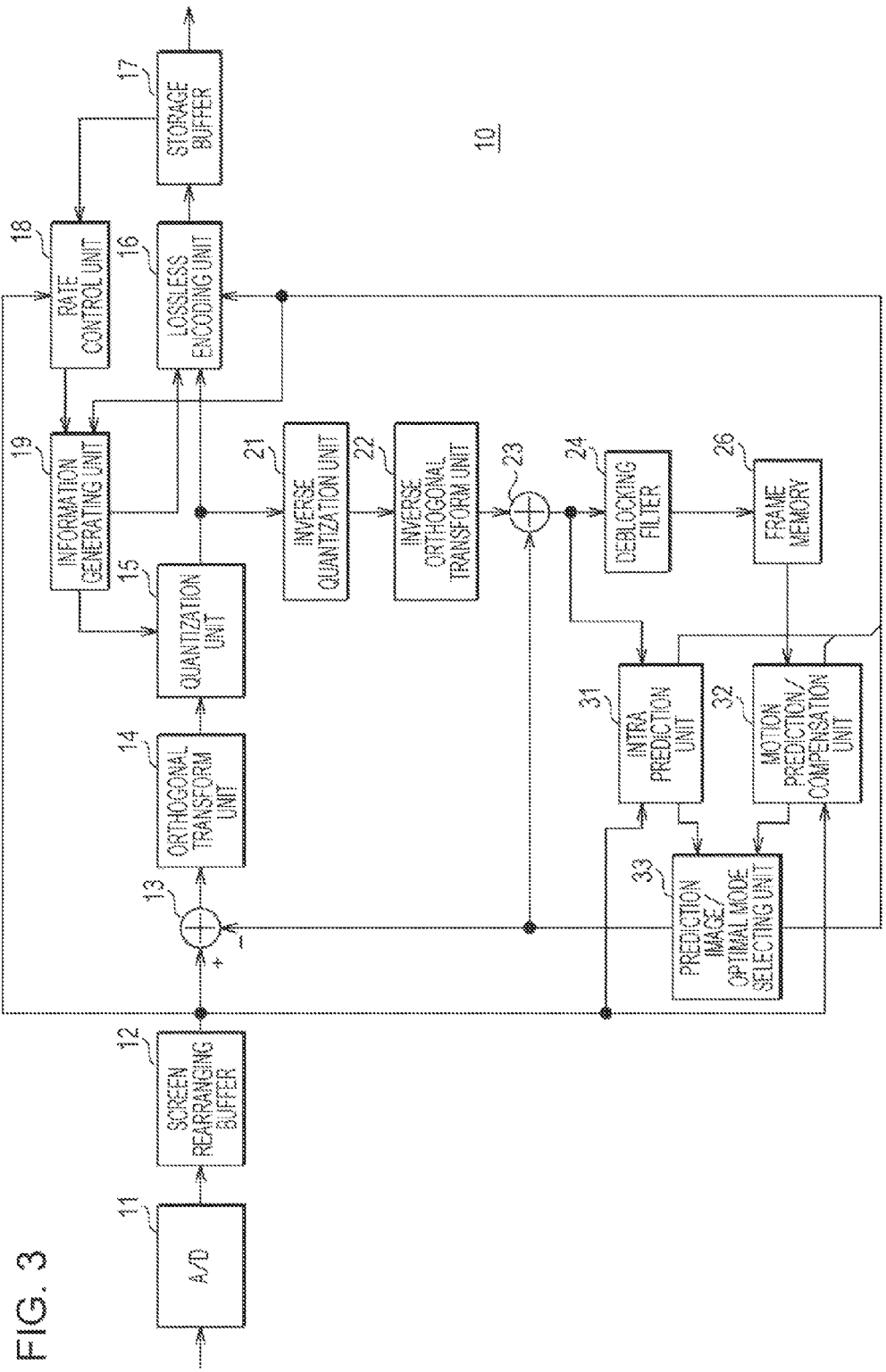
FIG. 3 is a diagram illustrating a configuration of an image encoding device.

FIG. 3 illustrates a configuration of an image encoding device. The image encoding device 10 includes an Analog/Digital conversion unit (A/D conversion unit) 11, a screen rearranging buffer 12, a subtracting unit 13, an orthogonal transform unit 14, a quantization unit 15, a lossless encoding unit 16, a storage buffer 17, and a rate control unit 18. Further, the image encoding device 10 includes an inverse quantization unit 21, an inverse orthogonal transform unit 22, an adding unit 23, a deblocking filter 24, a frame memory 26, a selector 26, an intra prediction unit 31, a motion prediction/compensation unit 32, and a prediction image/optimal mode selecting unit 33.

The A/D conversion unit 11 performs conversion of analog image signals into digital image data and outputs these to the screen rearranging buffer 12.

The screen rearranging buffer 12 performs rearranging of frames as to the image data output from the A/D conversion unit 11. The screen rearranging buffer 12 performs rearranging of the frames according to a GOP (Group of Pictures) structure relating to the encoding processing, and outputs the image data after rearranging to the subtracting unit 13, rate control unit 18, intra prediction unit 31, and motion prediction/compensation unit 32.

The image data output from the screen rearranging buffer 12 and the prediction image data selected at the later-described prediction image/optimal mode selecting unit 33 are supplied to the subtracting unit 13. The subtracting unit 13 calculates prediction error data which is a difference between the image data output from the screen rearranging buffer 12 and the prediction image data supplied from the prediction image/optimal mode selecting unit 33, and outputs this to the orthogonal transform unit 14.

The orthogonal transform unit 14 performs orthogonal transform processing such as discrete cosine transform (DCT: Discrete Cosine Transform), Karhunen-Loéve transform or the like, as to the prediction error data output from the subtracting unit 13. The orthogonal transform unit 14 outputs the transform coefficient data obtained by performing orthogonal transform processing to the quantization unit 15.

The transform coefficient data output from the orthogonal transform unit 14 and the quantization parameter (quantization scale) from a later-described information generating unit 19 are supplied to the quantization unit 15. The quantization unit 15 performs quantization of the transform coefficient data and outputs the quantized data to the lossless encoding unit 16 and inverse quantization unit 21. Also, the quantization unit 15 changes the bit rate of quantized data based on the quantization parameters set at the rate control unit 18.

The quantized data output from the quantization unit 15, identification information and difference information from the later-described information generating unit 19, prediction mode information from the intra prediction unit 31, and prediction mode information and difference motion vector information and the like from the motion prediction/compensation unit 32, are supplied to the lossless encoding unit 16. Also, information indicating whether the optimal mode is intra prediction or inter prediction is supplied from the prediction image/optimal mode selecting unit 33. Note that the prediction mode information includes prediction mode and block size information of motion prediction unit and so forth, according to whether intra prediction or inter prediction.

The lossless encoding unit 16 performs lossless encoding processing as to the quantized data, for example using variable length coding, arithmetic coding, or the like, to generate stream information and outputs this to the storage buffer 17. Also, in the event the optimal mode is intra prediction, the lossless encoding unit 16 performs lossless encoding on the prediction mode information supplied from the intra prediction unit 31. Also, in the event the optimal mode is inter prediction, the lossless encoding unit 16 performs lossless encoding on the prediction mode information and difference motion vectors and the like supplied from the motion prediction/compensation unit 32. Further, the lossless encoding unit 16 performs lossless encoding of information relating to the quantization parameters, such as difference information for example. The lossless encoding unit 16 includes the information following lossless encoding in stream information.

The storage buffer 17 stores an encoded stream from the lossless encoding unit 16. Also, the storage buffer 17 outputs the stored encoded stream with a transmission speed in accordance with the transmission path.

The rate control unit 18 performs monitoring of a available capacity of the storage buffer 17, and sets the quantization parameters such that, in the event that there is little capacity available, the bit rate of the quantized data drops, and in the event that there is sufficient capacity the bit rate of the quantized data rises. Also, the rate control unit 18 detects complexity of the image, such as activity which is information indicating the variance of pixel values for example, using image data supplied from the screen rearranging buffer 12. The rate control unit 18 the quantization parameters such that rough quantization is realized for image portions where the variance value of pixels is low and fine quantization for portions otherwise, for example, based on the detection results of complexity of the image. The rate control unit 18 outputs the quantization parameters that have been set to the information generating unit 19.

The information generating unit 19 outputs the quantization parameters supplied from the rate control unit 18 to the quantization unit 15. The information generating unit 19 also takes quantization parameters of encoded blocks spatially or temporally adjacent to a block to be encoded as selection candidates. The information generating unit 19 selects a quantization parameter from the selection candidates in accordance with the quantization parameter set at the rate control unit 18, and takes as a prediction quantization parameter. Further, the information generating unit 19 generates identification information corresponding to the selected quantization parameters, i.e., identification information for selecting prediction quantization parameters from the selection candidates, and difference information indicating the difference between the prediction quantization parameters and the set quantization parameters.

Figure 4:
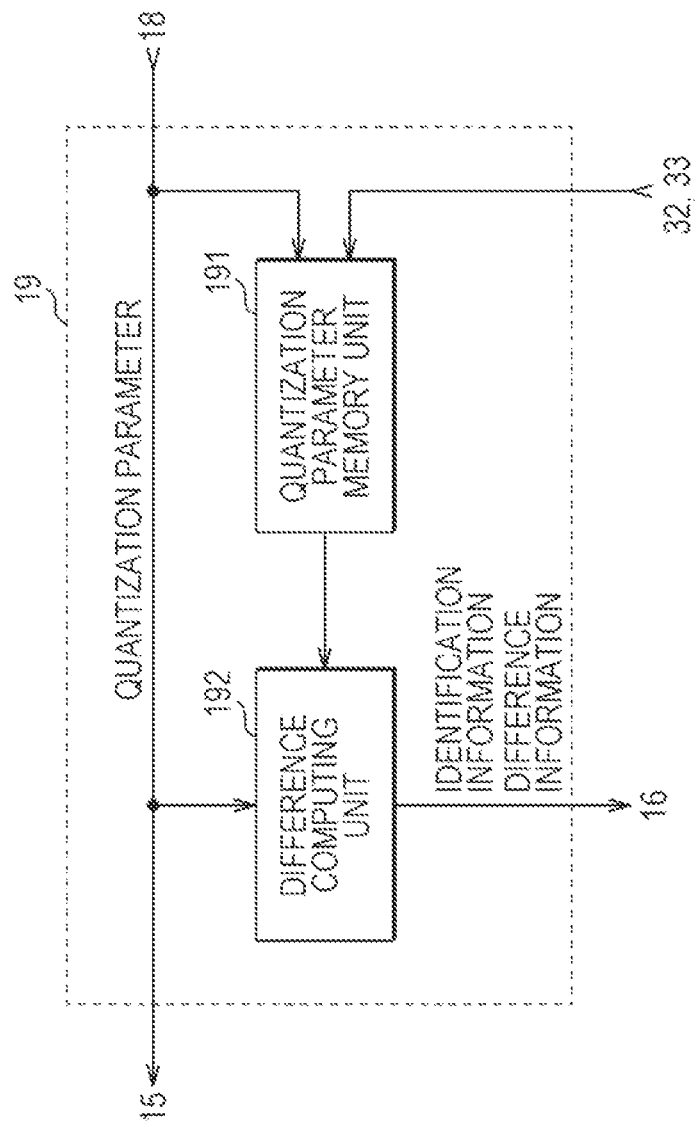
FIG. 4 is a diagram illustrating a configuration of an information generating unit.

FIG. 4 illustrates a configuration of the information generating unit. The information generating unit 19 has a quantization parameter memory unit 191 and a difference computing unit 192. The information generating unit 19 outputs to the quantization unit 15 the quantization parameters supplied from the rate control unit 18. Also, the information generating unit 19 supplies the quantization parameters supplied from the rate control unit 18 to the quantization parameter memory unit 191 and difference computing unit 192.

The quantization parameter memory unit 191 stores the supplied quantization parameters. The difference computing unit 192 reads out, from the quantization parameters of encoded blocks stored in the quantization parameter memory unit 191, quantization parameters of encoded blocks in the spatial or temporal periphery of the block to be encoded, as selection candidates. Also, at least blocks where quantization parameters are redundant, and blocks where quantization using quantization parameters is not performed, such as blocks where transform coefficient data to be quantized at the quantization unit 15 is all "0" for example, are excluded from selection candidates. Also, the difference computing unit 192 excludes from selection candidates, blocks (hereinafter referred to as "skip blocks") regarding which determination has been made to perform skip processing based on information from the later-described motion prediction/compensation unit 32 and prediction image/optimal mode selecting unit 33.

The difference computing unit 192 selects a quantization parameter from the quantization parameters, in accordance with the quantization parameter of the block to be encoded, i.e., the quantization parameter supplied from the rate control unit 18, as a prediction quantization parameter. The difference computing unit 192 further generates difference information indicating the difference between identification information for selecting prediction quantization parameters from the selection candidates and a quantization parameter of the block to be encoded, and outputs this to the lossless encoding unit 16.

Returning to FIG. 3, the inverse quantization unit 21 performs inverse quantization processing of the quantized data supplied from the quantization unit 15. The inverse quantization unit 21 outputs the transform coefficient data obtained by performing inverse quantization processing to the inverse orthogonal transform unit 22.

The inverse orthogonal transform unit 22 performs inverse transform processing of the transform coefficient data supplied from the inverse quantization unit 21, and outputs the obtained data to the adding unit 23.

The adding unit 23 adds data supplied from the inverse orthogonal transform unit 22 and prediction image data supplied from the prediction image/optimal mode selecting unit 33 to generate decoded image data, and outputs to the deblocking filter 24 and frame memory 26. Note that the decoded image data is used as image data of the reference image.

The deblocking filter 24 performs filtering processing to decrease block distortion which occurs at the time of image encoding. The deblocking filter 24 performs filtering processing to remove the block distortion from the decoded image data supplied from the adding unit 23, and outputs the decoded image data after filtering processing in the frame memory 26.

The frame memory 26 holds the decoded image data after filtering processing supplied from the deblocking filter 24. The decoded image held in the frame memory 26 is supplied to the motion prediction/compensation unit 32 as reference image data.

The intra prediction unit 31 performs prediction in intra prediction processing of all the candidate intra prediction modes, using input image data of the image to be encoded supplied from the screen rearranging buffer 12 and reference image data supplied from the adding unit 23, and determines an optimal intra prediction mode. The intra prediction unit 31 calculates a cost function value for each intra prediction mode for example, and takes the intra prediction mode where the encoding efficiency is best, based on the calculated cost function value, as the optimal intra prediction mode. The intra prediction unit 31 outputs the prediction image data generated in the optimal intra prediction mode, and the cost function value of the optimal intra prediction mode, to the prediction image/optimal mode selecting unit 33. Further, the intra prediction unit 31 outputs prediction mode information indicating the intra prediction mode to the lossless encoding unit 16.

The motion prediction/compensation unit 32 performs prediction in all candidate inter prediction modes, using the input image data of the image to be encoded, supplied from the screen rearranging buffer 12, and the reference image data supplied from the frame memory 26, and decides the optimal inter prediction mode. The motion prediction/compensation unit 32 calculates a cost function value in each inter prediction mode for example, and takes the inter prediction mode where the encoding efficiency is best, based on the calculated cost function values, as the optimal inter prediction mode. The motion prediction/compensation unit 32 outputs the prediction image data generated in the optimal inter prediction mode and the cost function value of the optimal inter prediction mode, to the prediction image/optimal mode selecting unit 33. Further, the motion prediction/compensation unit 32 outputs prediction mode information relating to the optimal inter prediction mode to the lossless encoding unit 16 and information generating unit 19.

The prediction image/optimal mode selecting unit 33 compares the cost function value supplied from the intra prediction unit 31 to the cost function value supplied from the motion prediction/compensation unit 32, and selects the one of which the cost function value is less than the other as the optimal mode where the encoding efficiency will be best. Also, the prediction image/optimal mode selecting unit 33 outputs the prediction image data generated in the optimal mode to the subtracting unit 13 and adding unit 23. Further, the prediction image/optimal mode selecting unit 33 outputs information indicating whether the optimal mode is the intra prediction mode or the inter prediction mode to the lossless encoding unit 16 and information generating unit 19. Note that the prediction image/optimal mode selecting unit 33 performs switching of the intra prediction or inter prediction in increments of slices.

<2. Operation of Image Encoding Device>

Figure 5:
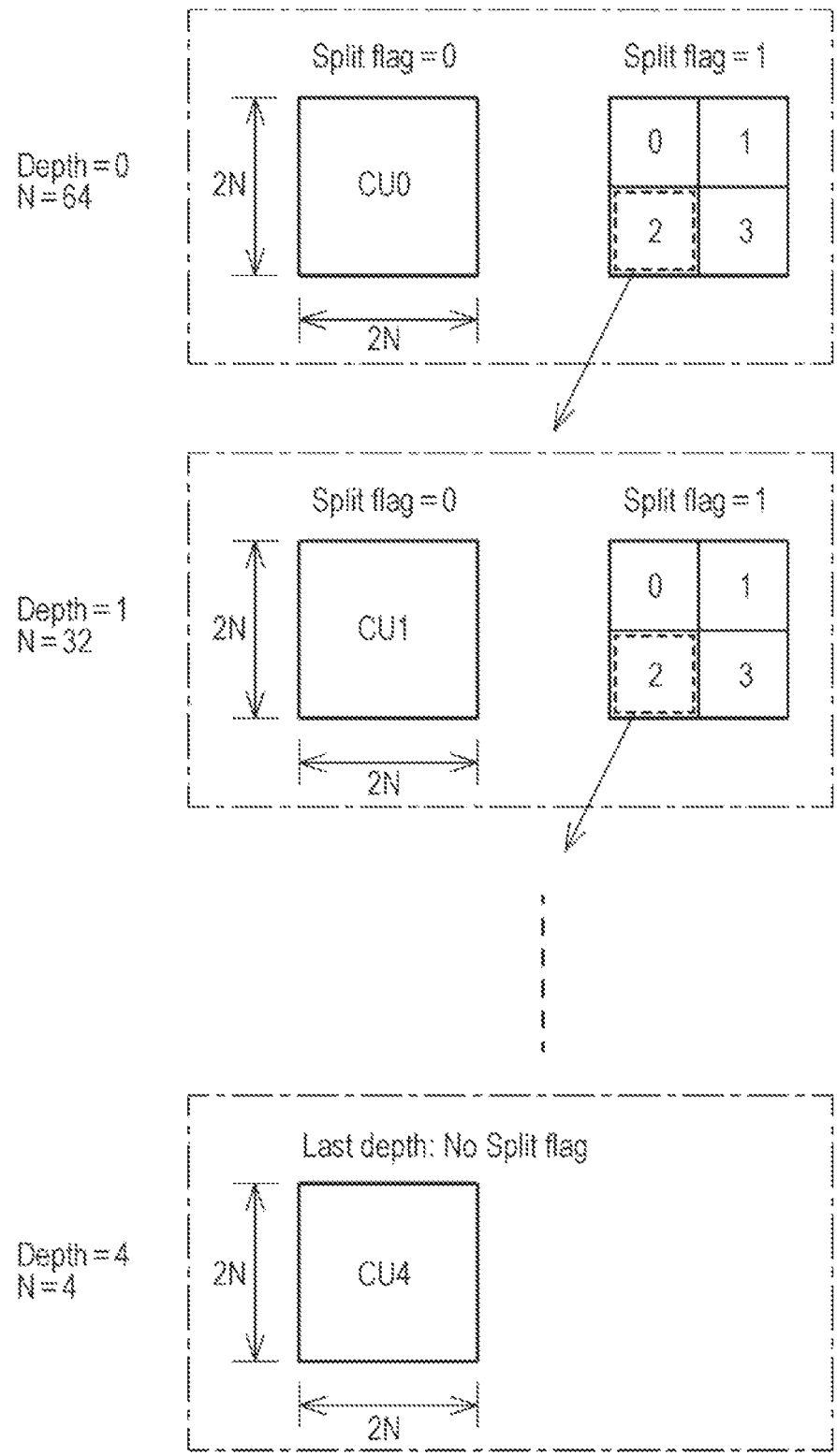
FIG. 5 is a diagram exemplarily illustrating a hierarchical structure of a coding unit.

With the image encoding device, encoding processing is performed with the macroblock size extended beyond that with the H.264/AVC format, for example. FIG. 5 exemplarily illustrates the hierarchical structure of coding units. Note that FIG. 5 illustrates a case where the maximum size is 128 pixels×128 pixels, and the hierarchical depth (Depth) is "5". For example, in the event that the hierarchical depth is "0", a 2N×2N (N=64 pixels) block is coding unit CU0. Also, when split flag=1, the coding unit CU0 is divided into four independent N×N blocks, with the N×N blocks being blocks of one hierarchical level lower. That is to say, the hierarchical depth is "1", and 2N×2N (N=32 pixels) blocks are coding unit CU1. In the same way, when split flag=1, this is divided into four independent blocks. Further, when the depth "4" which is the deepest hierarchical level, 2N×2N (N=4 pixels) blocks are coding unit CU4, and 8 pixels×8 pixels are the smallest size for coding units CU. Also, with HEVC, prediction unit (PU: Prediction Unit) which is a basic unit for dividing coding units and predicting, and transform unit (TU: Transform Unit) which is a basic unit for transformation and quantization, are defined.

Figure 6:
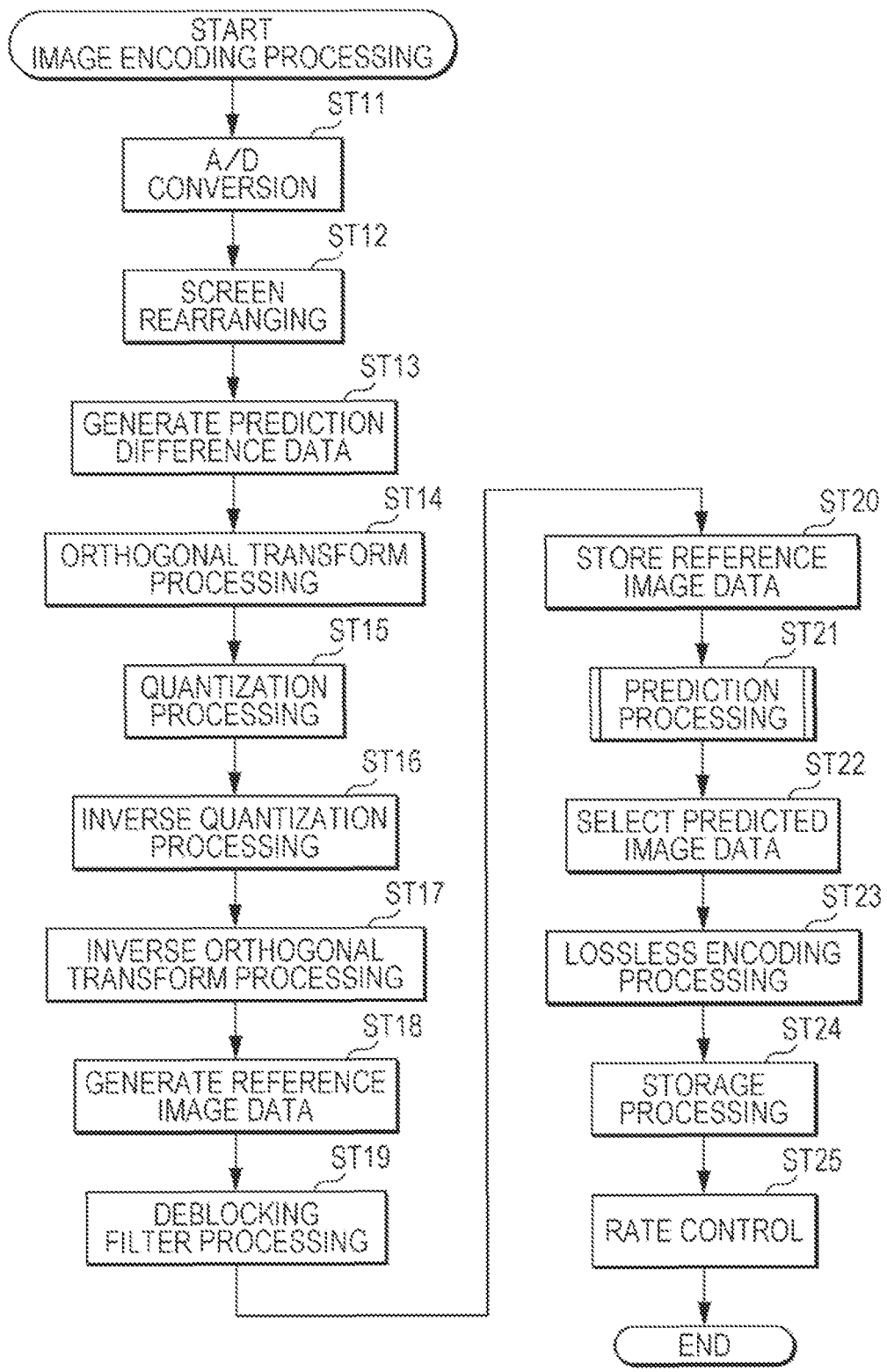
FIG. 6 is a flowchart illustrating operations of an image encoding device.

Next, operations of the image encoding device will be described with reference to the flowchart in FIG. 6. In step ST11, the A/D converting unit 11 performs A/D conversion on the input image signals.

In step ST12, the screen rearranging buffer 12 performs image rearranging. The screen rearranging buffer 12 stores image data supplied from the A/D converting unit 11 and performs rearranging from an order for displaying the pictures to an order for encoding.

In step ST13, the subtracting unit 13 generates prediction error data. The subtracting unit 13 calculates the difference between the image data of images rearranged in step ST12 and prediction image data selected at the prediction image/optimal mode selecting unit 33 to generate prediction error data. The data amount of the prediction error data is smaller than that of the original image data. Therefore, data amount can be compressed in comparison with a case where the image is encoded as it is.

In step ST14, the orthogonal transform unit 14 performs orthogonal transform processing. The orthogonal transform unit 14 performs orthogonal transform on the prediction error data supplied from the subtracting unit 13. Specifically, orthogonal transform such as discrete cosine transform, Karhunen-Loéve transform, and the like are performed as to the prediction error data to output transform coefficient data.

In step ST15, the quantization unit 15 performs quantization processing. The quantization unit 15 quantizes transform coefficient data. Rate control is performed at the time of quantization, as illustrated in the later-described processing in step ST25.

The inverse quantization unit 21 performs inverse quantization processing in step ST16. The inverse quantization unit 21 performs inverse quantization on the transform coefficient data quantized by the quantization unit 15 with properties corresponding to the properties of the quantization unit 15.

In step ST17, the inverse orthogonal transform unit 22 performs inverse orthogonal transform processing. The inverse orthogonal transform unit 22 performs inverse orthogonal transform on the transform coefficient data subjected to inverse quantization by the inverse quantization unit 21 with properties corresponding to the properties of the orthogonal transform unit 14.

In step ST18, the adding unit 23 generates reference image data. The adding unit 23 adds the prediction image data supplied from the prediction image/optimal mode selecting unit 33 and the data after inverse orthogonal transform of the corresponding position to this prediction image, to generate decoded data (reference image data).

In step ST19, the deblocking filter 24 performs filtering processing. The deblocking filter 24 filters decoded image data output from the adding unit 23 and removes block distortion.

In step ST20, the frame memory 26 stores the reference image data. The frame memory 26 stores the decoded image data after filtering processing (reference image data).

In step ST21, the intra prediction unit 31 and motion prediction/compensation unit 32 each performs prediction processing. That is to say, the intra prediction unit 31 performs intra prediction processing of the intra prediction mode, and the motion prediction/compensation unit 32 performs motion prediction/compensation processing of the inter prediction mode. The prediction processing is described below with reference to FIG. 7, in which the prediction processing with all candidate prediction modes is each performed, and cost function values with all the candidate prediction mode are each calculated by this processing. Further, based on the calculated cost function values, the optimal intra prediction mode and optimal inter prediction mode are selected, and the prediction image and the cost function and prediction mode information generated in the selected prediction mode are supplied to prediction image/optimal mode selecting unit 33.

In step ST22, the prediction image/optimal mode selecting unit 33 selects the prediction image data. The prediction image/optimal mode selecting unit 33 decides in the optimal mode of which the encoding efficiency is best, based on each cost function value output from the intra prediction unit 31 and motion prediction/compensation unit 32. That is to say, the prediction image/optimal mode selecting unit 33 decides the coding unit where the encoding efficiency is best from each of the hierarchical levels illustrated in FIG. 5 for example, the block size of prediction untie in this coding unit, and which of intra prediction and inter prediction to perform. Further, the prediction image/optimal mode selecting unit 33 outputs the prediction image data of the decided optimal mode to the subtracting unit 13 and adding unit 23. This prediction image data is used for the computation of step ST13 and ST18, as described above.

In step ST23, the lossless encoding unit 16 performs lossless encoding processing. The lossless encoding unit 16 performs lossless encoding on the quantization data output from the quantization unit 15. That is, lossless encoding such as variable length encoding or arithmetic encoding is performed as to the quantization data to be made data compression. Also, the lossless encoding unit 16 performs lossless encoding of prediction mode information and the like corresponding to the prediction image data selected in step ST22, and lossless encoded data such as prediction mode information and the like is included in steam information generated by performing lossless encoding of quantization data.

In step ST24, the storage buffer 17 performs storage processing. The storage buffer 17 stores stream information output from the lossless encoding unit 16. The stream information stored in this storage buffer 17 is read out appropriately and is transmitted to the decoding side over the transmission path.

In step ST25, the rate control unit 18 performs rate control. The rate control unit 18 controls, in the case of storing stream information in the storage buffer 17, the rate of the quantization operation of the quantization unit 15 so that overflow or underflow does not occur in the storage buffer 17.

Figure 7:
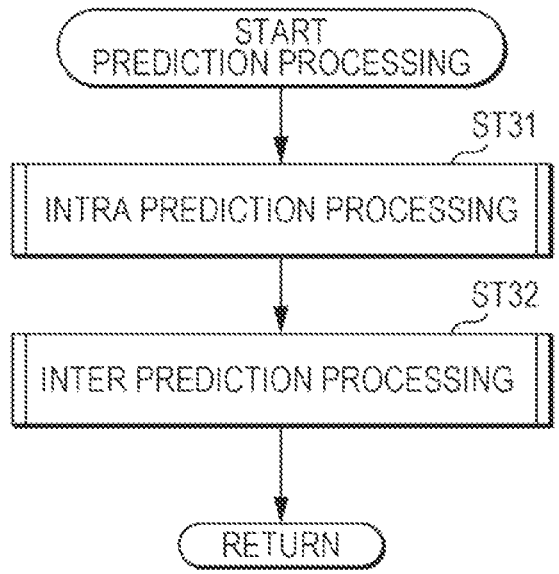
FIG. 7 is a flowchart illustrating prediction processing.

Next, prediction processing in step ST21 in FIG. 6 will be described with reference to the flowchart in FIG. 7.

In step ST31, the intra prediction unit 31 performs intra prediction processing. The intra prediction unit 31 performs intra prediction on the image of the prediction unit to be encoded, in all candidate intra prediction modes. Note that, for the image data of the decoded image referred to in intra prediction, the decoded image data before being subjected to deblocking filter processing by the deblocking filter 24 is used. Due to this intra prediction processing, intra prediction is performed in all candidate intra prediction modes, and a cost function value is calculated for all candidate intra prediction modes. One intra prediction mode of which the encoding efficiency is best is then selected from all intra prediction modes, based on the calculated cost function values.

In step ST32, the motion prediction/compensation unit 32 performs inter prediction processing. The motion prediction/compensation unit 32 performs inter prediction processing of all candidate inter-prediction modes using decoded image data after deblocking filter processing stored in the frame memory 26. Due to this inter prediction processing, prediction processing is performed in all candidate inter prediction modes, and cost function values are calculated for candidate inter prediction modes. One inter prediction mode of which encoding efficiency is the best is then selected from all inter prediction modes, based on the calculated cost function values.

Figure 8:
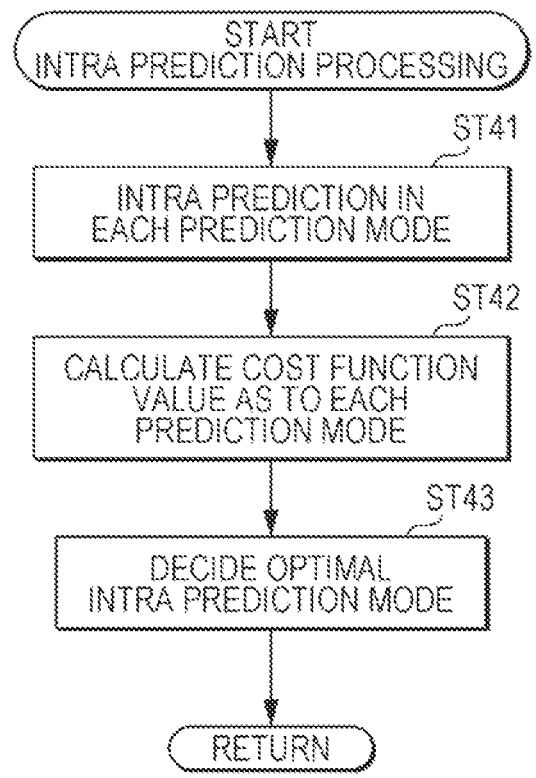
FIG. 8 is a flowchart illustrating intra prediction processing.

The intra prediction processing in step ST31 in FIG. 7 will be described with reference to the flowchart in FIG. 8.

In step ST41, the intra prediction unit 31 performs intra prediction of each prediction mode. The intra prediction unit 31 generates prediction image data in each intra prediction mode, using decoded image data before and after blocking filter processing.

In step ST42, the intra prediction unit 31 calculates cost function values in each prediction mode. Calculation of cost function values is performed, as stipulated in JM (Joint Model) which is the reference software in the H.264/AVC format, based on either technique of the High Complexity mode or Low Complexity mode.

That is to say, in the High Complexity mode, up to the lossless encoding processing is tentatively performed as to all candidate prediction modes, and the cost function value represented by the following Expression (1) are calculated as to each prediction mode.

$$\text{Cost}(\text{Mode} \in \Omega) = D + \lambda \cdot R \tag{1}$$

$\Omega$ represents an whole set of candidate prediction modes to encode the image of this prediction unit. D represents difference energy (distortion) between a decoded image and an input image in the event that encoding has been performed in prediction mode. R is generated code amount including orthogonal transform coefficient, prediction mode information, and so forth, and $\lambda$ is a Lagrange multiplier given as a function of quantization parameter QP. That is, in High Complexity Mode, up to the lossless encoding processing is tentatively performed for all candidate prediction modes as the processing of step ST42, and the cost function values represented by Expression (1) above are calculated for each prediction mode.

On the other hand, in the Low Complexity mode, generating of prediction images and generating of header bits including difference motion vectors and prediction mode information and so forth, is performed for all candidate prediction modes, and cost function values represented by the following Expression (2) are calculated.

$$\text{Cost}(\text{Mode} \in \Omega) = D + QP2\text{Quant}(QP) \cdot \text{Header\_Bit} \tag{2}$$

$\Omega$ represents the whole set of candidate prediction modes to encode the image of this prediction unit. D represents difference energy (distortion) between a decoded image and an input image in the event that encoding has been performed in prediction mode. Header_Bit is a header bit for the prediction mode, and QP2Quant is a function which is given as a function of quantization parameter QP. That is, in the Low Complexity Mode, the cost function value represented by Expression (2) above is calculated for each prediction mode, using generating of prediction image and header bits such as motion vectors and prediction mode information and so forth, as the processing of step ST42.

In step ST43, the intra prediction unit 31 decides the optimal intra prediction mode. The intra prediction unit 31 selects an intra prediction mode of which the cost function value is the smallest based on the cost function values calculated in step ST42, which is decided to the optimal intra prediction mode.

Figure 9:
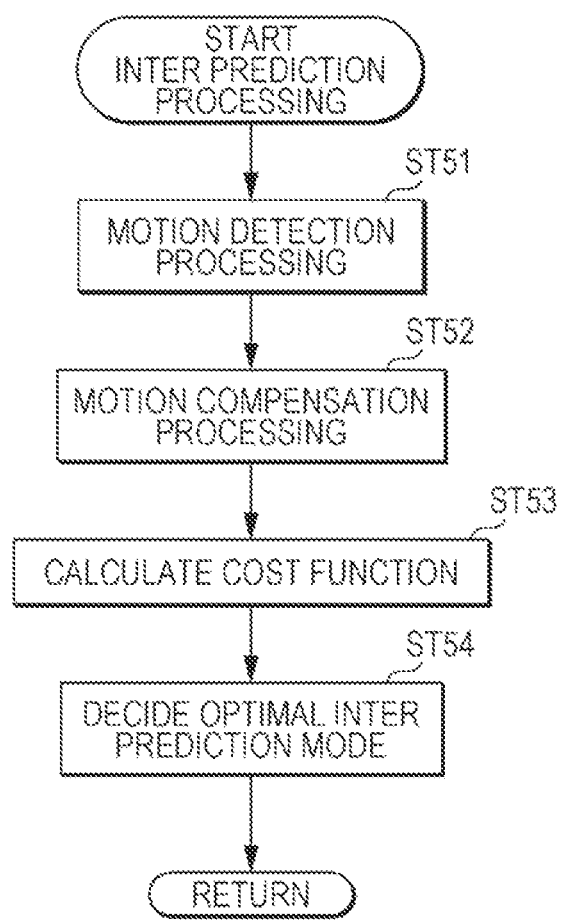
FIG. 9 is a flowchart illustrating inter prediction processing.

Next, the inter prediction processing of step ST32 in FIG. 7 will be described with reference to the flowchart in FIG. 9.

In step ST51, the motion prediction/compensation unit 32 performs motion detection processing. The motion prediction/compensation unit 32 detects motion vectors and advances to step ST52.

In step ST52, the motion prediction/compensation unit 32 performs motion compensation processing. The motion prediction/compensation unit 32 performs motion compensation using reference image data based on the motion vectors detected in step ST51, and generates prediction image data.

In step ST53, the motion prediction/compensation unit 32 performs calculation of cost function values. The motion prediction/compensation unit 32 calculates cost function values as described above, using the input image data of the prediction image which is to be encoded, and the prediction image data generated in step ST52 and so forth, and advances to step ST54.

The motion prediction/compensation unit 32 decides an optimal inter prediction mode. The motion prediction/compensation unit 32 performs the processing from step ST51 through ST53 for each inter prediction mode. The motion prediction/compensation unit 32 distinguishes the reference index where the cost function value calculated for each prediction mode is the smallest value, the block size of the coding unit, and the block size of the prediction unit in this coding unit, and decodes the optimal inter prediction mode. Note that with decision of the mode where the cost function is the smallest, the cost function value in a case of having performed inter prediction in skip mode is also used.

Also, in the event that the optimal inter prediction mode has been selected as the optimal prediction mode at the prediction image/optimal mode selecting unit 33, the motion prediction/compensation unit 32 generates prediction image data such that prediction image data of the optimal inter prediction mode can be supplied to the subtracting unit 13 and the adding unit 23.

<3. Generating Operation of Identification Information and Difference Information based on Quantization Parameters>

In the above-described image encoding processing, the image encoding device 10 sets quantization parameters that suitable quantization is performed for each block according to the complexity of the image. Also, the image encoding device 10 generates identification information and difference information and includes these in the stream information, to improve encoding efficiency of the quantization parameters used in the quantization processing in step ST15.

Next, description will be made regarding generating of the identification information and difference information. The rate control unit 18 sets the quantization parameters using the code amount control format stipulated with TM5 in MPEG2, for example.

With the code amount control format stipulated with TM5 in MPEG2, the processing of step 1 through step 3 is illustrated.

In step 1, the amount of code to be allocated to each picture within a GOP (Group of Pictures) is distributed to the pictures not encoded yet, including pictures for allocation, based on an allocation bit amount R. This distribution is repeated in the order of encoded pictures within the GOP. At this time, code amount allocation to each picture is performed using the following two assumptions.

The first assumption is that the product of mean quantized scale code and generated code amount, used at the time of encoding each picture, will be constant for each picture type, unless the screen changes.

Accordingly, after encoding each picture, parameters $X_I$, $X_P$, and $X_B$ (Global Complexity Measure) representing the complexity of the screen are updated by Expressions (3) through (5). The relation between the quantization scale code and generated code amount can be estimated by these parameters.

$$X_I = S_I * Q_I \quad (3)$$

$$X_P = S_P * Q_P \quad (4)$$

$$X_B = S_B * Q_B \quad (5)$$

Here, $S_I$, $S_P$, and $S_B$, are generated code bits at the time of picture encoding, and $Q_I$, $Q_P$, and $Q_B$, are mean quantization scale code at the time of picture encoding. Also, initial values are values illustrated by the Expressions following (6), (7), and (8), using bit_rate [bits/sec] which is the target code amount.

$$X_I = 160 \times \text{bit\_rate}/115 \quad (6)$$

$$X_P = 160 \times \text{bit\_rate}/115 \quad (7)$$

$$X_B = 160 \times \text{bit\_rate}/115 \quad (8)$$

The second assumption is that the overall image quality will be constantly optimized when the ratios $K_P$ and $K_B$ for quantization scale code of the P and B pictures, with the quantization scale code of the I picture as a reference, are such as stipulated in Expression (9).

$$K_P = 1.0; K_B = 1.4 \quad (9)$$

That is to say, the quantization scale code for B pictures is constantly set to 1.4 times the quantization scale code for I and P pictures. This assumes that by making the B pictures to be quantized somewhat coarser than as compared with the I and P pictures and thereby adding the code amount conserved with the B pictures to the I and P pictures, the image quality of the I and P pictures will be improved, and also the image quality of the B pictures referring to these will be improved.

According to the above two assumptions, the allocated code amounts ($T_I$, $T_B$, $T_B$) as to each picture in the GOP are the values indicated in the Expressions (10), (11), and (12). Note that picture_rate indicates the number of pictures displayed per second in this sequence.

[Math. 1]

$$T_I = \max\left\{ \frac{R}{1 + \frac{N_P X_P}{X_I K_P} + \frac{N_B K_B}{X_I K_B}}, \frac{\text{bit\_rate}}{8 \times \text{picture\_rate}} \right\} \quad (10)$$

$$T_P = \max\left\{ \frac{R}{N_P + \frac{N_B K_P X_B}{K_B X_P}}, \frac{\text{bit\_rate}}{8 \times \text{picture\_rate}} \right\} \quad (11)$$

$$T_B = \max\left\{ \frac{R}{N_B + \frac{N_P K_B X_P}{K_P X_B}}, \frac{\text{bit\_rate}}{8 \times \text{picture\_rate}} \right\} \quad (12)$$

Now, $N_P$, $N_B$ are the number of P and B pictures not encoded within the GOP. That is to say, of the pictures not encoded within the GOP, with regard to pictures to which allocation is to be performed and those of different picture types, estimation is made regarding how many times the generated code amount of the picture for allocation the code amount generated by those pictures will be, under the above-described image quality optimization conditions. Next, how many pictures to be encoded worth of code amount the estimated generated code amount which the entirety of unencoded pictures generates is equivalent to is obtained. For example, $N_P X_P / X_I K_P$, which is the second term of the denominator of the first argument in the expression relating to $T_I$, expresses how many I pictures that the $N_P$ unencoded pictures within the GOP are worth. Also, this is obtained by multiplying NE by a fraction $S_P / S_I$ of the generated code amount of the I picture as to the generated code amount of the P pictures, and expressing by $X_I$, $X_P$, and $X_B$ as described above.

The bit amount as to the pictures for allocation is obtained by dividing the allocation code amount R as to unencoded pictures by the number of pictures. Note that a lower limit is set to that value, however, taking into consideration the overhead code amount for the header and so forth.

Based on the allocated code amount thus obtained, the code amount R to be allocated to unencoded pictures within the GOP is updated by expression (13) each time each picture is encoded following steps 1 and 2.

$$R = R - S_{I,P,B} \tag{13}$$

Also, at the time of encoding the first picture of the GOP, R is updated by the following Expression (14).

[Math. 2]

$$R = \frac{\text{bit\_rate} \times N}{\text{picture\_rate}} - R \tag{14}$$

where N is the number of pictures within the GOP. Also, the initial value of R at the beginning of the sequence is 0.

Next, description will be made regarding step 2. In step 2, a quantization scale code for actually matching the allocation code amounts ($T_I$, $T_P$, $T_B$) as to each picture, obtained in step 1, to the actual code amount, is obtained. The quantization scale code is obtained by feedback control in macroblock increments for each picture type, based on the capacity of three types of virtual buffers independently established.

First, before encoding of a j'th macroblock, the occupation amounts of the virtual buffers are obtained by Expressions (15) through (17).

[Math. 3]

$$d_j^I = d_0^I + B_{j-1} - \frac{T_I \times (j-1)}{MBcnt} \tag{15}$$

$$d_j^P = d_0^P + B_{j-1} - \frac{T_P \times (j-1)}{MBcnt} \tag{16}$$

$$d_j^B = d_0^B + B_{j-1} - \frac{T_B \times (j-1)}{MBcnt} \tag{17}$$

$d_0^I$, $d_0^P$, and $d_0^B$ are the initial occupation amounts of the virtual buffers, $B_j$ is the generated bit amount from the head of the picture to the j'th macroblock, and $MB_{cnt}$ is the number of macroblocks within a single picture.

The occupation amounts of the virtual buffers at the time of ending encoding of each picture ($dMB_{cnt}^I$, $dMB_{cnt}^P$, $dMB_{cnt}^B$) are used as the initial values of the virtual buffers occupation amount for the next picture ($d_0^I$, $d_0^P$, $d_0^B$) for the same picture type, respectively.

Next, a reference quantization scale code $Q_j$ for the j'th macroblock is calculated by Expression (18).

[Math. 4]

$$Q_j = \frac{d_j \times 31}{r} \tag{18}$$

r is a parameter controlling response speed of a feedback group, called a reaction parameter, and is obtained by Expression (19).

[Math. 5]

$$r = 2 \times \frac{\text{bit\_rate}}{\text{picture\_rate}} \tag{19}$$

Note that the initial value of the virtual buffer at the beginning of the sequence is obtained by Expression (20).

[Math. 6]

$$d_0^I = 10 \times \frac{r}{31}, \ d_0^P = K_P d_0^I, \ d_0^B = K_B d_0^I \tag{20}$$

Next, step 3 will be described. Activity is obtained from Expressions (21) through (23) using luminance signal pixel values of the original image, e.g., using a pixel values of a total of eight blocks of four 8×8 blocks in frame DCT mode and four 8×8 blocks in field DCT encoding mode.

[Math. 7]

$$act_j = 1 + \min_{sblk=1,8}(\text{var } sblk) \tag{21}$$

$$\text{var } sblk = \frac{1}{64} \sum_{K=1}^{64} (P_k - \overline{P})^2 \tag{22}$$

$$\overline{P} = \frac{1}{64} \sum_{K=1}^{64} P_k \tag{23}$$

The var_sblk in Expression (21) is the sum of squares of difference between the image data of each pixel and the average value thereof, so the more complex the images of these 8×8 blocks are, the greater the value is. $P_k$ in Expressions (22) and (23) is in-block pixel values of luminance signals of the original image. The reason that the minimal value (min) is assumed in Expression (22) is to make quantization finer in the event that there is even a partially smooth portion within the 16×16 macroblock. Further, a normalized activity $N_{actj}$ where the value thereof is within the range of 0.5 to 2 is obtained by Expression (24).

[Math. 8]

$$Nact_j = \frac{2 \times act_j + \text{avg\_act}}{act_j + 2 \times \text{avg\_act}} \tag{24}$$

avg_act is the average value of activity up to the picture encoded immediately before. A quantization scale code $mquant_j$ which takes into consideration visual properties is obtained by Expression (25) based on reference quantization scale code $Q_j$.

[Math. 9]

$$mquant_j = Q_j \times Nact_j \tag{25}$$

The rate control unit 18 outputs the quantization scale code $mquant_j$ calculated as described above as a quantization parameter. Also, a quantization parameter is generated for the macroblock situated at the slice boundary in the same way as with macroblocks situated at other than the slice boundary, with the same technique. Note that quantization parameters are not restricted to cases of being decided based on activity as described above, and may be decided such that the cost function value is smaller.

Note that with the description of the rate control method stipulated with TM5 in MPEG2 described above, a case where processing is performed in increments of macroblocks is described. Accordingly, by performing similar processing in increments of blocks regarding which quantization parameters can be switched, quantization parameters can be set for each of the blocks regarding which quantization parameters can be switched.

Next, description will be made regarding generating operations of information used to improve encoding efficiency of quantization parameters. The information generating unit 19 takes encoded quantization parameters spatially or temporally adjacent to the block to be encoded as selection candidates. The information generating unit 19 also selects a quantization parameter from selection candidates in accordance with a quantization parameter set as to the block to be encoded, and takes this as a prediction quantization parameter. The information generating unit 19 further generates identification information for selecting a prediction quantization parameter from selection candidates, and difference information indicating the difference between the prediction quantization parameter and a quantization parameter set to the block to be encoded.

Figure 10:
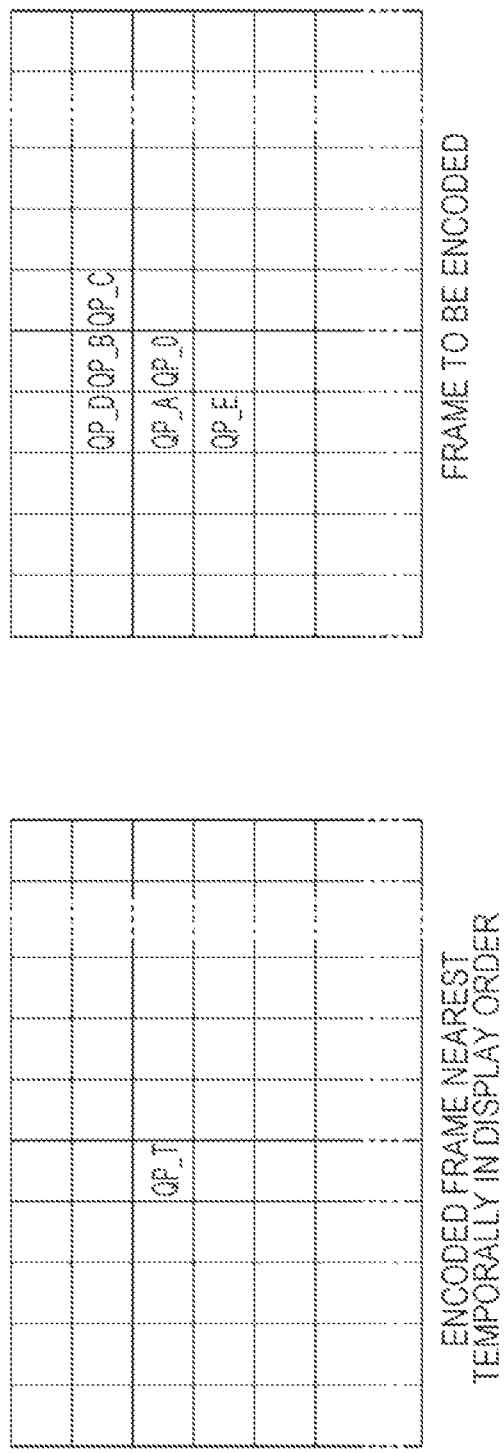
FIG. 10 is a diagram for describing operations of an information generating unit.

FIG. 10 is a diagram for describing operations of the information generating unit, illustrating a frame to be encoded, and an encoded frame which is temporally closest in display order. We will say that the quantization parameter of the block to be encoded in the frame to be encoded is, for example, "QP_0". Also, we will say that the quantization parameters of the block adjacent to the left is, for example, "QP_A". In the same way, we will say that the quantization parameter of the blocks adjacent above, to the upper right, to the upper left, and to the lower left are, for example, "QP_B", "QP_C", "QP_D", and "QP_E". Also, we will say that the quantization parameters of the block temporally adjacent is "QP_T". Note that when encoding the block to be encoded in the frame to be encoded, the quantization parameters "QP_A" through "QP_E" and "QP_T" are stored in the quantization parameter memory unit 191. Also, we will say that each block is the smallest increment block regarding which quantization parameters can be changed.

The difference computing unit 192 takes quantization parameters of encoded block adjacent to the block to be encoded as selection candidates, selects from the selection candidates the quantization parameter of which the difference as to the quantization parameter set to the block to be encoded is the smallest, and takes this as a prediction quantization parameter. The difference computing unit 192 generates identification information for selecting the prediction parameter from the selection candidates, and difference information indicating the difference between the prediction quantization parameter and the quantization parameter of the block to be encoded.

Figure 11:
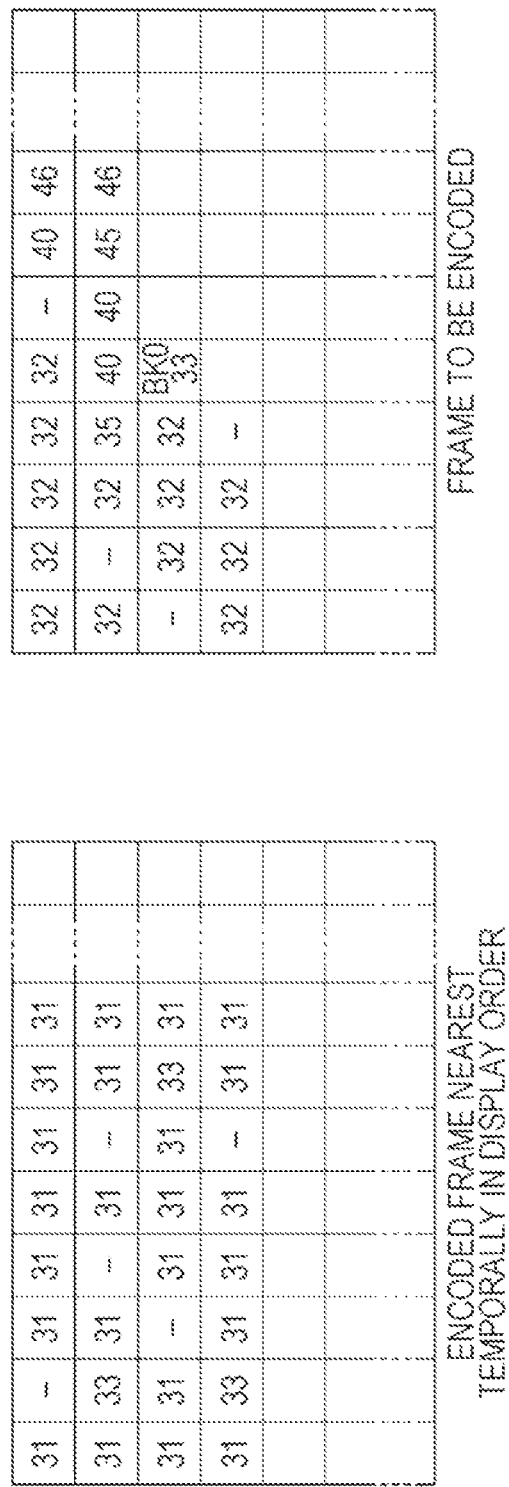
FIG. 11 is a diagram exemplarily illustrating operations of an information generating unit.

FIG. 11 is a diagram illustrating an operation example of the information generating unit. Note that cases where no quantization parameter is set to a block due to being a skip block or with no residual information are indicated by a "−"

With the block to be encoded as block BK0, the quantization parameters of the encoded blocks are "QP_A=32", "QP_B=40", "QP_C=40", "QP_D=35", "QP_E=−", and "QP_T=31". Here, the information generating unit 19 excludes blocks where no quantization parameter is set to a block due to being a skip block or a block with no residual information, and blocks where quantization parameters are redundant, from candidates. Accordingly, the selection candidates are the encoded blocks of the quantization parameters "QP_A=32", "QP_B=40", "QP_D=35", and "QP_T=31". Also, the information generating unit 19 sets identification information, index Nos. for example, to the selection candidates beforehand. The identification information may be set to adjacent encoded blocks alone, or may be set to the quantization parameters of the adjacent encoded blocks.

In the event of setting identification information to adjacent encoded blocks, the information generating unit 19 sets index numbers in order of array with the adjacent encoded blocks in a predetermined order of array. The predetermined order of array is, for example, an order of array where one of an encoded block adjacent to the left side, an encoded block adjacent above, and an encoded block temporally adjacent, is given priority. Also, the information generating unit 19 may be capable of switching the order of array. In the event of being capable of switching the order of array, information indicating what sort of order of array is included in the stream information. Also, the lossless encoding unit 16 and information generating unit 19 perform settings and lossless encoding of the identification information such that there is less code amount when encoding the identification information of the block given priority.

The difference computing unit 192 selects a candidate from the selection candidates where the difference as to the quantization parameter of the block to be encoded is smallest, and uses the identification information set to the selected candidate, thereby generating identification information for selecting a prediction quantization parameter from the selection candidates. Also, the difference computing unit 192 generates difference information indicating the difference between the prediction quantization parameters which is the selected candidate quantization parameter, and the quantization parameter of the block to be encoded. For example, in the event of giving priority to the encoded block adjacent to the left side in FIG. 11, the information generating unit 19 sets "0 (index No.): block of QP_A", "1: block of QP_B", "2: block of QP_B", and "3: block of QP_T". Also, if we way that the quantization parameter of the block to be encoded is "33" for example, the difference computing unit 192 sets the index No. of the block where the difference as to the quantization parameter of the block to be encoded is the smallest, to identification information "0 (index No.)". Also, the difference computing unit 192 generates difference information "1 (=33−32)" indicating the difference between the prediction quantization parameter and the quantization parameter of the block to be encoded.

By setting identification information to blocks to be encoded in this way, the encoding efficiency of quantization parameters can be improved. For example, if the block at the left side is given priority and the block order is quantization parameters "QP_A", "QP_B", "QP_C", "QP_D", "QP_E", "QP_T", data amount will be small with images where there are more blocks to be encoded that are similar to the image of the block to the left side. Also, if the block above is given priority and the block order is quantization parameters "QP_B", "QP_A", "QP_C", "QP_D", "QP_E", "QP_T", data amount will be small with images where there are more blocks to be encoded that are similar to the image of the block above. Further, if the block temporally adjacent is given priority and the block order is quantization parameters "QP_T", "QP_A", "QP_B", "QP_C", "QP_D", "QP_E", data amount will be small with images where there are more blocks to be encoded that are similar to the image temporally adjacent, i.e., more still subjects.

In a case of setting identification information as to quantization parameters of adjacent encoded blocks, the information generating unit 19 sets index Nos. with the adjacent encoded blocks in a predetermined order of array. For example, the information generating unit 19 sets index Nos. in order of quantization parameters with small parameter values. That is to say, in the case of FIG. 11, the information generating unit 19 sets index Nos. such as "0 (index No.): 32 (quantization parameter)", "1:40", "2:35", "3:31".

The difference computing unit 192 selects a candidate from the selection candidates where the difference as to the quantization parameter of the block to be encoded is smallest, and uses the identification information set to the selected candidate, thereby generating identification information for selecting a prediction quantization parameter from the selection candidates. Also, the difference computing unit 192 generates difference information indicating the difference between the prediction quantization parameter and the quantization parameter of the block to be encoded. For example, if we say that the quantization parameter of the block to be encoded is "33", the difference computing unit 192 generates difference information "1 (=33−32)" as identification information.

Also, in the event that there are not selection candidates, the difference computing unit 192 generates difference information indicating the difference between the quantization parameter SliceQPY of the initial value in the slice and the set quantization parameter.

Figure 12:
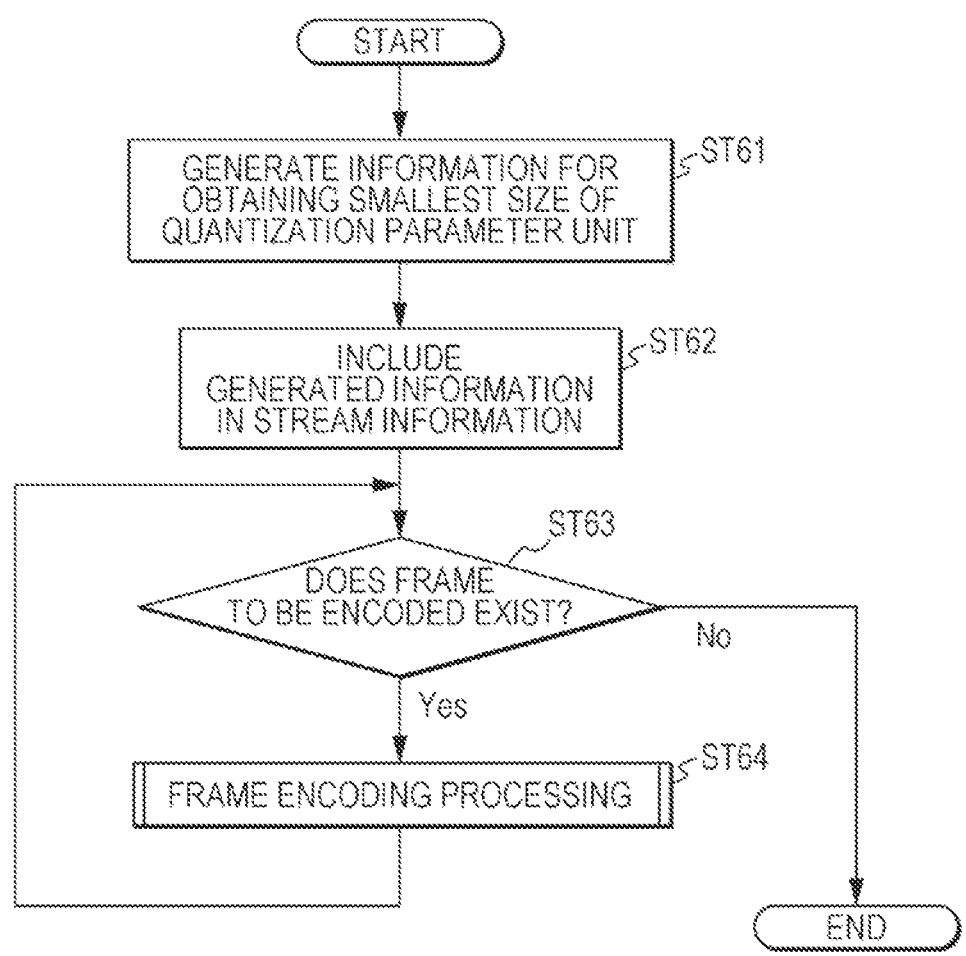
FIG. 12 is a flowchart illustrating processing regarding quantization parameters in encoding.

FIG. 12 is a flowchart illustrating processing regarding quantization parameters in encoding. In step ST61, the image encoding device 10 generates information for obtaining a quantization parameters unit minimum size (MinQpUnitSize). The quantization parameters unit minimum size is the smallest size where quantization parameters can be adaptively switched.

The image encoding g device 10 uses, as information for obtaining the quantization parameters unit minimum size (MinQpUnitSize), difference as to a transform unit minimum size (MinTransformUnitSize), for example.

The quantization parameters unit minimum size (MinQpUnitSize) is determined by Expression (26).

$$\text{MinQpUnitSize}=1<<(\log 2\_\min\_\text{transform\_unit\_}\\\text{size\_minus2}+\log 2\_\min\_qp\_\text{unit\_size\_offset}+2) \quad (26)$$

Note that "log 2 min_transform_unit_size_minus2" is a parameter for deciding the transform unit minimum size (MinTransformUnitSize).

The transform unit minimum size (MinTransformUnitSize) is decided by Expression (27).

$$\text{MinTransformUnitSize}=1<<(\log 2\_\min\_\text{transform\_}\\\text{unit\_size\_minus2}+2) \quad (27)$$

The difference between the quantization parameter unit minimum size (MinQpUnitSize) and the transform unit minimum size (MinTransformUnitSize) is, as can be clearly understood from Expressions (26) and (27), is equivalent to "log 2_min_qp_unit_size_offset". Note that quantization parameters are used in increments of transform units (TU). That is to say, a quantization parameter is unchanged within a transform unit.

Also, the quantization parameter unit minimum size (MinQpUnitSize) may be decided in accordance with coding unit size. In this case, the image encoding unit 10 uses, for example, information stipulating the minimum size of the coding unit CU (log 2_min_coding_block_size_minus3), and maximum size of the coding unit CU (log 2_diff_max_min_coding_block_size). Note that the maximum size of the coding unit CU "log 2MaxCUSize" is as illustrated in Expression (28).

$$\log 2\text{MaxCUSize}=\log 2\_\min\_\text{coding\_block\_size\_}\\\text{minus }3+3+\log 2\_\text{diff\_max\_min\_coding\_block\_}\\\text{size} \quad (28)$$

The logarithmic value of the quantization parameter unit minimum size (log 2MinQpUnitSize) is decided by Expression (29).

$$\log 2 MinQpUnitSize = \log 2\_\min\_\text{coding\_block\_size\_minus }3 + \\ 3 + \log 2\_\text{diff\_max\_min\_coding\_block\_size} - \\ \log 2\_\min\_qp\_\text{unit\_size\_offset} \quad (29)$$

Accordingly, setting "log 2_min_qp_unit_size_offset" so as to be greater makes the quantization parameter unit minimum size smaller. For example, in a case where the smallest size of a coding unit CU is "8×8" and the greatest size is "64×64", setting "log 2_min_qp_unit_size_offset" to "1" makes the quantization parameter unit minimum size to be "32×32". Also, setting "log 2_min_qp_unit_size_offset" to "2" makes the quantization parameter unit minimum size to be "16×16".

In step ST62, the image encoding device 10 performs processing of including the generated information in the stream information. The image encoding device 10 includes "log 2_min_qp_unit_size_offset", and "log 2_min_qp_unit_size_offset" which is a parameter to decide the transform unit minimum size (MinTransformUnitSize), in the stream information, and advances to step ST63. Also, in the event of deciding the quantization parameter unit minimum size in accordance with the coding unit size, "log 2_min_coding_block_size_minus3", "log 2_diff_max_min_coding_block_size", and "log 2_min_qp_unit_size_offset" are included in the stream information. The image encoding device 10 includes the generated information in a sequence parameter set (SPS: sequence parameter set) defined as a syntax of RBSP (raw byte sequence payload), for example. Note that FIG. 13 exemplarily illustrates a sequence parameter set.

In step ST63, the image encoding device 10 determines whether or not a frame to encode exists. In the event that a frame to encode exists, the image encoding device 10 advances to step ST 64 and performs frame encoding processing illustrated in FIG. 14, and if this does not exist, ends encoding processing.

Figures 14, 15:
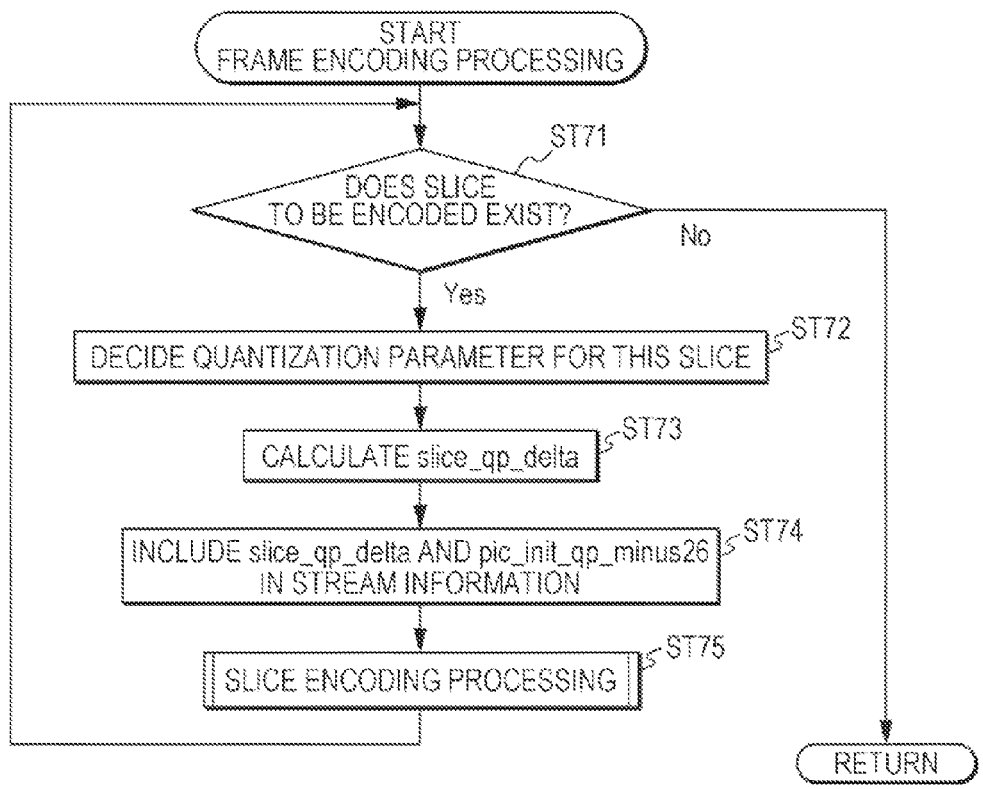
FIG. 14 is a flowchart illustrating frame encoding processing.
FIG. 15 is a diagram exemplarily illustrating a picture parameter set.

In the frame encoding processing in FIG. 14, in step ST71 the image encoding device 10 determines whether or not a slice to encode exists. In the event that a slice to encode exists, the image encoding device 10 advances to step ST72, and if this does not exist, ends the encoding processing of the frame.

In step ST72, the image encoding device 10 decides the quantization parameters of the slice to encode. The image encoding device 10 decides the quantization parameter of the initial value in the size so as to be a target code amount, and advances to step ST73.

In step ST73, the image encoding device 10 calculates "slice_qp_delta". The quantization parameter SliceQPY of the initial value in the slice has the relation illustrated in Expression (30), with "pic_init_qp_minus26" being set by the user or the like beforehand. Accordingly, the image encoding device 10 calculates "slice_qp_delta" so as to be the quantization parameter decided in step ST72, and advances to step ST74.

$$SliceQPY=26+pic\_init\_qp\_minus26+slice\_qp\_delta \quad (30)$$

In step ST74 the image encoding device 10 includes "slice_qp_delta" and "pic_init_qp_minus26" in the stream information. The image encoding device 10 includes the calculated "slice_qp_delta" in the header slice, for example, of the stream information. Also, the image encoding device 10 includes the "pic_init_qp_minus26" that has been set, in the picture parameter set, for example, of the stream information. By thus including the "slice_qp_delta" and "pic_init_qp_minus26" in the stream information, the image decoding device which performs decoding of the stream information can calculate the quantization parameter SliceQPY of the initial value in the slice by performing the computation of Expression (30). Note that FIG. 15 exemplarily illustrates a sequence parameter set, and FIG. 16 a slice header.

In step ST75, the image encoding device 10 performs slice encoding processing. FIG. 17 is a flowchart illustrating performs slice encoding processing.

In step ST81 of FIG. 17, the image encoding device 10 determines whether or not a coding unit CU to encode exists. In the event that a coding unit regarding which encoding processing has not been performed yet exists in the slice to be encoded, the image encoding device 10 advances to step ST82. Also, in the event that encoding processing of all coding units in the slice has been completed, the image encoding device 10 ends the slice encoding processing.

In step ST82, the image encoding device 10 determines whether or not a transform unit TU exists in the coding unit CU to be encoded. In the event that a transform unit exists, the image encoding device 10 advances to step ST83, and in the event that a transform unit does not exist, advances to step ST87. For example, in the event that all coefficients to be quantized using a quantization parameter are "0", or in a case of a skip block, the flow advances to step ST87.

In step ST83, the image encoding device 10 decides the quantization parameter of the coding unit CU to be encoded. The rate control unit 18 of the image encoding device 10 decides the quantization parameter in accordance with the complexity of the image of the coding unit as described above, or such that the cost function value is small, and advances to step ST84.

In step ST84, the image encoding device 10 sets identification information to the selection candidates. The information generating unit 19 of the image encoding device 10 takes quantization parameters of encoded codings spatially or temporally peripheral to the coding unit to be encoded, as selection candidates. Also, in the event that no quantization parameters are set to the block due to being a skip block or having no residual information, or in the event that a quantization parameter is equal to another candidate, the information generating unit 19 excludes these from selection candidates. The image encoding device 10 sets identification information, e.g., index (ref_qp_block_index) to the selection candidates, and advances to step ST85.

In step ST85, the image encoding device 10 generates identification information and difference information. The information generating unit 19 of the image encoding device 10 selects from the selection candidates a candidate where the difference as to the quantization parameter of the coding unit to be encoded is smallest, and takes this as a prediction quantization parameter. The information generating unit 19 generates identification information by using the index (ref_qp_block_index) of the selected candidate as identification information for selecting the prediction quantization parameter from the selection candidates. Also, the information generating unit 19 takes the difference (qb_qp_delta) between the prediction quantization parameter and the quantization parameter of the coding unit to be encoded, as difference information, and advances to step ST86. Now, with the prediction quantization parameter indicated by the index (ref_qp_block_index) of the determined candidate as "ref_qp (ref_qp_block_index)", the quantization parameter of the coding unit to be encoded (CurrentQP) exhibits the relationship indicated in Expression (31).

$$CurrentQP=qb\_qp\_delta+ref\_qp(ref\_qp\_block\_index) \quad (31)$$

In step ST86, the image encoding device 10 includes the identification information and difference information in the stream information. The lossless encoding unit 16 of the image encoding device 10 performs lossless encoding of the identification information and difference information generated at the information generating unit 19, includes in the stream information, and advances to step ST87.

In step ST87 the image encoding device 10 uses the decided quantization parameter to perform quantization of the coding unit with the quantization unit 15, and returns to step ST81.

Thus, the image encoding device 10 selects, from quantization parameters of encoded blocks spatially or temporally adjacent to a block to be encoded, a candidate where the difference as to the quantization parameter of the block to be encoded is the smallest, as a prediction quantization parameter. Also, the image encoding device 10 generates identification information corresponding to the selected quantization parameter. Further, the image encoding device 10 generates difference information indicating difference between the prediction quantization parameter and the quantization parameter of the block to be encoded. The image encoding device 10 includes the generated identification information and difference identification in stream information. Thus, since a candidate where the difference is the smallest is selected as the prediction quantization parameter, the difference between the prediction quantization parameter and the quantization parameter of the block to be encoded can be prevented from becoming a great value. Accordingly, the image encoding device 10 can improve the encoding efficiency of quantization parameters.

<4. Configuration of Image Decoding Device>

Next, an image decoding device which performs decoding processing of stream information output from the image encoding device will be described. The encoded stream generated by encoding an input image is supplied to the image decoding device via a predetermined transmission path, recording medium, or the like, and decoded.

Figure 18:
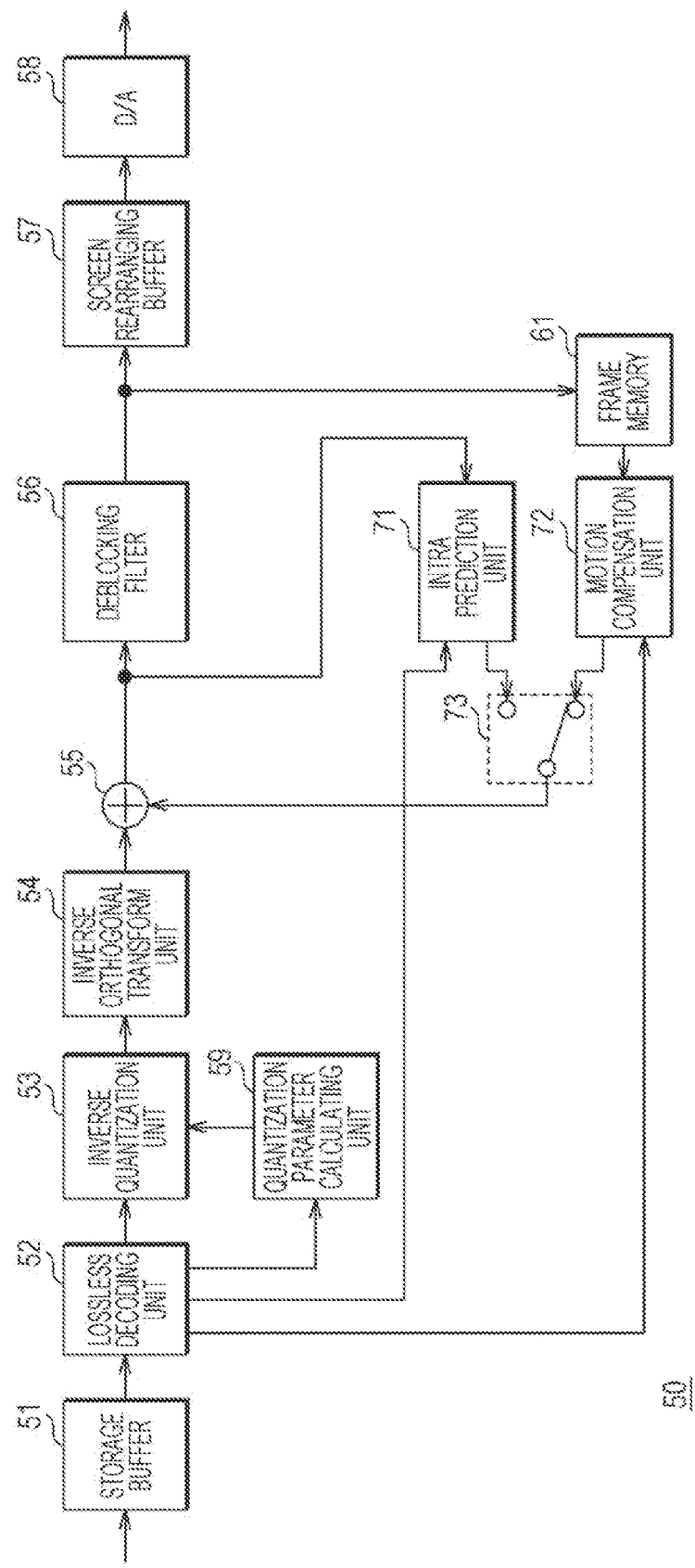
FIG. 18 is a diagram illustrating the configuration of an image decoding device.

FIG. 18 shows a configuration for an image decoding device which performs decoding processing of stream information. The image decoding device 50 includes a storage buffer 51, a lossless decoding unit 52, an inverse quantization unit 53, an inverse orthogonal transform unit 54, an adding unit 55, a deblocking filter 56, a screen rearranging buffer 57, and a digital/analog converting unit (D/A converting unit) 58. Furthermore, the image decoding device 50 includes a quantization parameter calculating unit 59, frame memory 61, an intra prediction unit 71, a motion compensation unit 72, an a selector 73.

The storage buffer 51 stores the stream information which has been transmitted. The lossless decoding unit 52 decodes the stream information supplied from the storage buffer 51 by a format corresponding to the encoding format of the lossless encoding unit 16 in FIG. 3.

The lossless decoding unit 52 operates as an information obtaining unit and obtains various types of information from the stream information. For example, the lossless decoding unit 52 outputs prediction mode information obtained by decoding the stream information to the intra prediction unit 71 and motion compensation unit 72. Also, the lossless decoding unit 52 outputs difference motion vectors, threshold values, or threshold value generating information, obtained by decoding the stream information, to the motion compensation unit 72. Also, the lossless decoding unit 52 outputs information related to quantization parameters obtained by decoding the stream information, e.g., difference information and the like, to the quantization parameter calculating unit 59. Further, the lossless decoding unit 52 outputs the quantization data obtained by decoding the stream information to the inverse quantization unit 53.

The inverse quantization unit 53 performs inverse quantization on the quantization data decoded at the lossless decoding unit 52 with the format corresponding to the quantization format of the quantization unit 15 in FIG. 3. The inverse orthogonal transform unit 54 performs inverse orthogonal transform on the output of the inverse quantization unit 53 with the format corresponding to the orthogonal transform format of the orthogonal transform unit 14 in FIG. 3 and outputs to the adding unit 55.

The adding unit 55 adds the data after inverse orthogonal transform to prediction image data supplied from the selector 73, to generate decoded image data and outputs to the deblocking filter 56 and intra prediction unit 71.

The deblocking filter 56 performs filtering processing as to the decoded image data supplied from the adding unit 55, removes block distortion and then supplies to and stores at the frame memory 61, and outputs to the screen rearranging buffer 57.

The screen rearranging buffer 57 performs rearranging of the images. That is, the order of the frame rearranged in order for encoding by the screen rearranging buffer 12 of FIG. 3 is rearranged to the original order for display and is output to the D/A converting unit 58.

The D/A converting unit 58 performs D/A conversion on the image data supplied from the screen rearranging buffer 57, so as to display the image by outputting to an unshown display.

Figure 19:
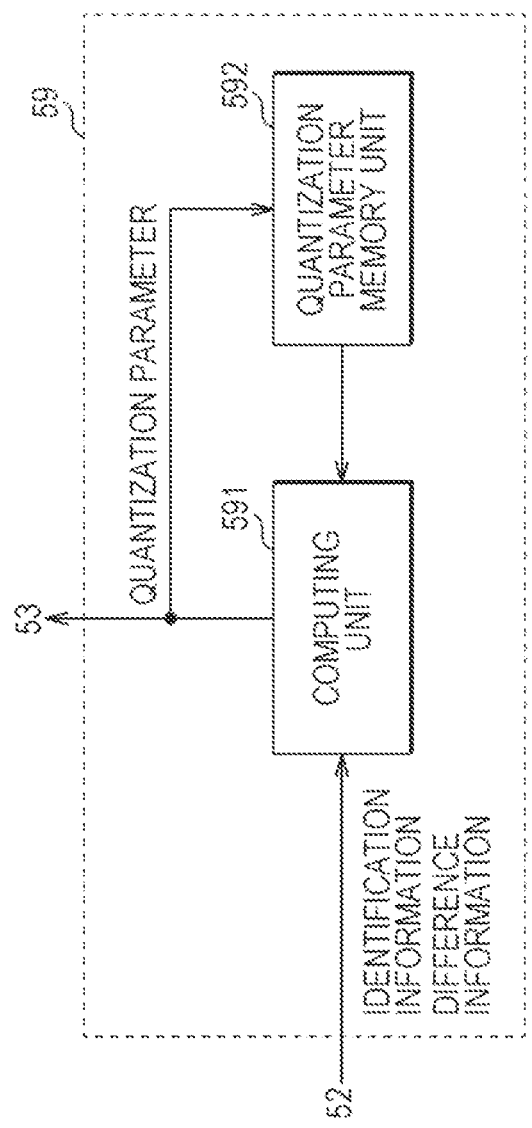
FIG. 19 is a diagram illustrating the configuration of quantization parameter calculating unit.

The quantization parameter calculating unit 59 restores quantization parameters based on information supplied from the lossless decoding unit 52, and outputs to the inverse quantization unit 53. FIG. 19 illustrates the configuration of the quantization parameter calculating unit, with the having a computing unit 591 and a quantization parameters memory unit 592.

The computing unit 591 uses information supplied from the lossless decoding unit 52 and quantization parameters stored in the quantization parameters memory unit 592 to restore the quantization parameter used in the quantization in the encoding to which the block to be decoded has been subjected to, and outputs to the inverse quantization unit 53. The computing unit 591 also stores the quantization parameter of the block to be decoded in the quantization parameters memory unit 592.

The computing unit 591 uses, for example, the "pic_init_qp_minus26" extracted from the parameter set, and the "slice_qp_delta" extracted from the slice header, to perform the computation of Expression (30), calculates the quantization parameters SliceQPY, and outputs to the inverse quantization unit 53.

The computing unit 591 also uses the identification information and difference information supplied from the lossless decoding unit 52 and the quantization parameters of the decoded blocks stored in the quantization parameters memory unit 592, and calculates the quantization parameter of the block to be decoded. The computing unit 591 outputs the calculated quantization parameter to the inverse quantization unit 53. In this case, the computing unit 591 reads out, from the quantization parameters of the decoded blocks stored in the quantization parameters memory unit 592, the quantization parameters of decoded blocks spatially or temporally peripheral to the block to be decoded. The computing unit 591 sets selection candidates in the same way as with the difference computing unit 192. For example, the computing unit 591 excludes at least blocks where quantization parameters are redundant or blocks where inverse quantization using quantization parameters is not performed, and takes as selection candidates. Further, the computing unit 591 sets identification information, i.e., index (ref_qp_block_index) equal to the difference computing unit 192 as to the quantization parameters of each of the candidates. That is to say, the computing unit 591 sets the index (ref_qp_block_index) with adjacent decoded blocks in a predetermined order of array. The computing unit 591 performs computation of the Expression (31) using the quantization parameter "ref_qp(ref_qp_block_index)" corresponding to identification information supplied from the lossless decoding unit 52, i.e., the prediction quantization parameter and the difference indicated by the difference information supplied from the lossless decoding unit 52 (qb_qp_delta). The computing unit 91 outputs the calculated quantization parameter (CurrentQP) to the inverse quantization unit 53 as the quantization parameter to be decoded. Also, in the event that there is no selection candidate, the computing unit 591 outputs the quantization parameter of the initial value in the slice to the inverse quantization unit 53.

Also, in the event that information specifying the order of array of blocks has been extracted from the stream information, the computing unit 591 sets index (ref_qp_block_index) with the decoded blocks in the specified order of array. Accordingly, even if the order of array is changed at the image encoding device 10, the quantization parameters used at the image encoding device 10 can be restored.

Returning to FIG. 18, the frame memory 61 holds the decoded image data after filtering processing supplied from the deblocking filter 24.

The intra prediction unit 71 generates prediction image data based on the prediction mode information supplied from the lossless decoding unit 52 and decoded image data supplied from the adding unit 55, and outputs the generated prediction image data to the selector 73.

The motion compensation unit 72 reads out reference image data from the frame memory 61 based on the prediction mode information and motion vector supplied from the lossless decoding unit 52 and performs motion compensation, to generate prediction image data. The motion compensation unit 72 outputs the generated prediction image data to the selector 73. Also, the motion compensation unit 72 generates prediction image data while switching filter properties in accordance with the magnitude of the motion vectors.

The selector 73 selects the intra prediction unit 71 in the case of intra prediction and the motion compensation unit 72 in the case of inter prediction, based on the prediction mode information supplied from the lossless decoding unit 52. The selector 73 outputs the prediction image data generated at the selected intra prediction unit 71 or motion compensation unit 72 to the adding unit 55.

The selector 73 selects the intra prediction unit 71 in the case of intra prediction and the motion compensation unit 72 in the case of inter prediction, based on the prediction mode information supplied from the lossless decoding unit 52. The selector 73 outputs the prediction image data generated at the selected intra prediction unit 71 or motion compensation unit 72 to the adding unit 55.

<5. Operation of Image Decoding Device>

Figure 20:
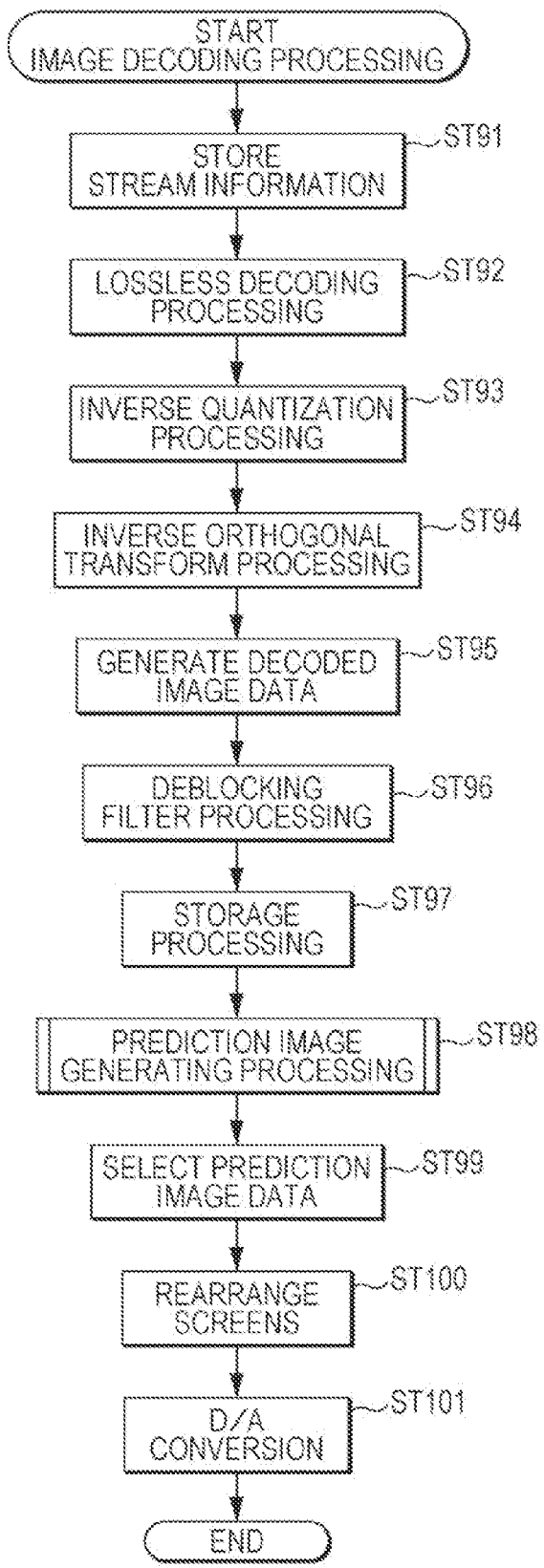
FIG. 20 is a flowchart illustrating operations of an image decoding device.

Next, operation of the image decoding device 50 will be described with reference to the flowchart in FIG. 20.

In step ST91, the storage buffer 51 stores the stream information which has been supplied thereto. In step ST92, the lossless decoding unit 52 performs lossless decoding processing. The lossless decoding unit 52 decodes the stream information supplied from the storage buffer 51. That is, the quantization data of each picture encoded by the lossless encoding unit 16 in FIG. 3 is obtained. Also, the lossless decoding unit 52, performs lossless encoding of prediction mode information included in the stream information, and in the event that the obtained prediction mode information is information relating to the intra prediction mode, outputs the prediction mode information to the intra prediction unit 71. Also, in the event that the prediction mode information is information relating to the inter prediction mode, the lossless decoding unit 52 outputs the prediction mode information to the motion compensation unit 72. Further, the lossless decoding unit 52 outputs the difference motion vectors, threshold values, or threshold generating information, obtained by decoding the stream information, to the motion compensation unit 72.

In step ST93, the inverse quantization unit 53 performs inverse quantization processing. The inverse quantization unit 53 performs inverse quantization on the quantization data decoded by the inverse decoding unit 52 with properties corresponding to the properties of the quantization unit 15 in FIG. 3.

In step ST94, the inverse orthogonal transform unit 54 performs inverse orthogonal transform processing. The inverse orthogonal transform unit 54 performs inverse orthogonal transform on the transform coefficient data subjected to inverse quantization by the inverse quantization unit 53 with properties corresponding to the properties of the orthogonal transform unit 14 of FIG. 3.

In step ST95, the adding unit 55 generates the decoded image data. The adding unit 55 adds the data obtained by being performed inverse orthogonal transform processing to the prediction image data selected in the later-described step ST99, and generates decoded image data. Thus, the original image is decoded.

In step ST96, the deblocking filter 56 performs filtering processing. The deblocking filter 56 performs filtering processing of the decoded image data output from the adding unit 55, and removes block distortion included in the decoded image.

In step ST97, the frame memory 61 performs storage processing of the decoded image data. Note that decoded image data stored in the frame memory 61 and decoded image data output from the adding unit 55 are used as reference image data to generate prediction image data.

In step ST98, the intra prediction unit 71 and motion compensation unit 72 perform prediction processing. The intra prediction unit 71 and motion compensation unit 72 each perform prediction processing corresponding to the prediction mode information supplied from the lossless decoding unit 52.

That is, when the prediction mode information of the intra prediction is supplied from the lossless decoding unit 52, the intra prediction unit 71 performs intra prediction processing based on the prediction mode information and generates prediction image data. Also, in the event that the prediction mode information of the inter prediction is supplied from the lossless decoding unit 52, the motion compensation unit 72 performs motion compensation based on the prediction mode information and generates prediction image data.

In step ST99, the selector 73 selects prediction image data. The selector 73 selects the prediction image supplied from the intra prediction unit 71 and prediction image data supplied from the motion compensation unit 72 and supplies the selected prediction image data to the adding unit 55, so as to add to the output of the inverse orthogonal transform unit 54 in step ST95, as described above.

In step ST100, the screen rearranging buffer 57 performs image rearranging. That is to say, in the screen rearranging buffer 57, the order of frames rearranged for encoding by the screen rearranging buffer 12 of the image encoding device 10 in FIG. 3 is rearranged to the original order for display.

In step ST101, the D/A conversion unit 58 performs D/A conversion on the image data from the screen rearranging buffer 57. This image is output to the unshown display and the image is displayed.

Figure 21:
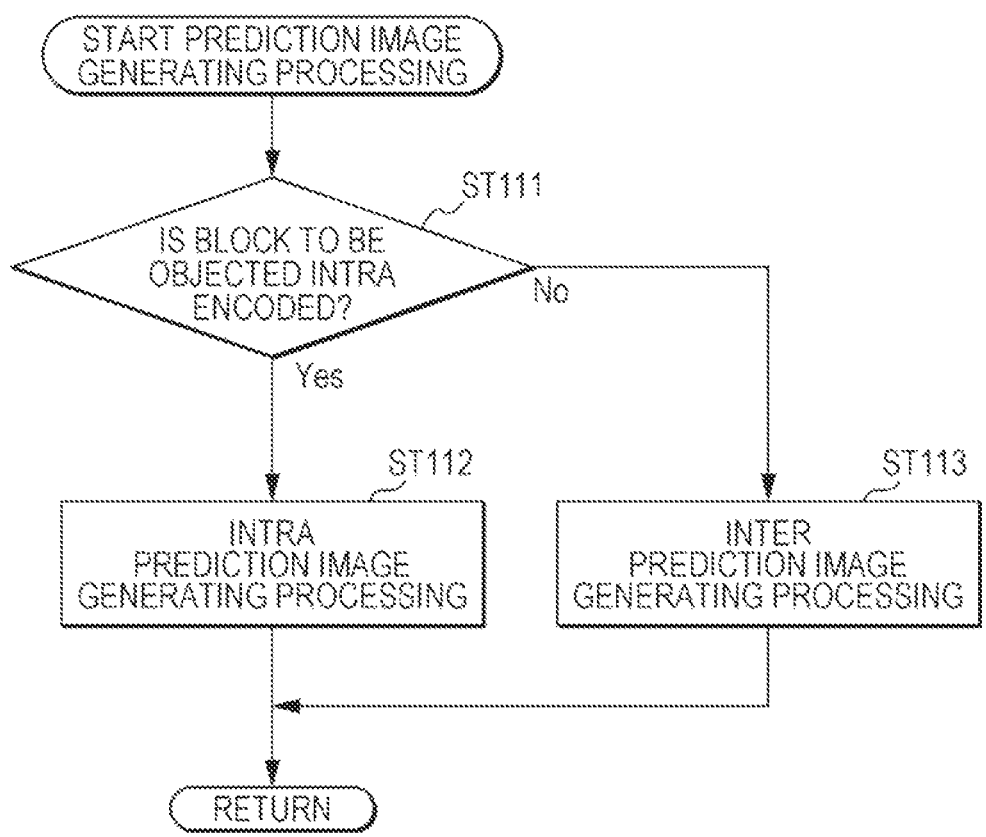
FIG. 21 is a flowchart illustrating prediction image generating processing.

Next, the prediction image generating processing in step ST98 in FIG. 20 will be described with reference to the flowchart in FIG. 21.

In step ST111, the lossless decoding unit 52 determines whether or not the current block has been intra encoded. In the event of the prediction mode information obtained by performing lossless decoding being intra prediction mode information, the lossless decoding unit 52 supplies the prediction mode information to the intra prediction unit 63 and advances to step ST112. Also, in the event of the prediction mode information not being inter prediction mode information, the lossless decoding unit 52 supplies the prediction mode information to the motion compensation unit 72, and proceeds to step ST113.

In step ST112, the intra prediction unit 71 performs intra prediction processing. The intra prediction unit 71 performs intra prediction using decoded image data before deblocking filter processing and prediction mode information supplied from the adding unit 55, and generates prediction image data.

In step ST113, the motion compensation unit 72 performs inter prediction image generating processing. The motion compensation unit 72 reads out reference image data from the frame memory 61 and generates prediction image data, based on information supplied from the lossless decoding unit 52 such as prediction mode information and so forth.

Figure 22:
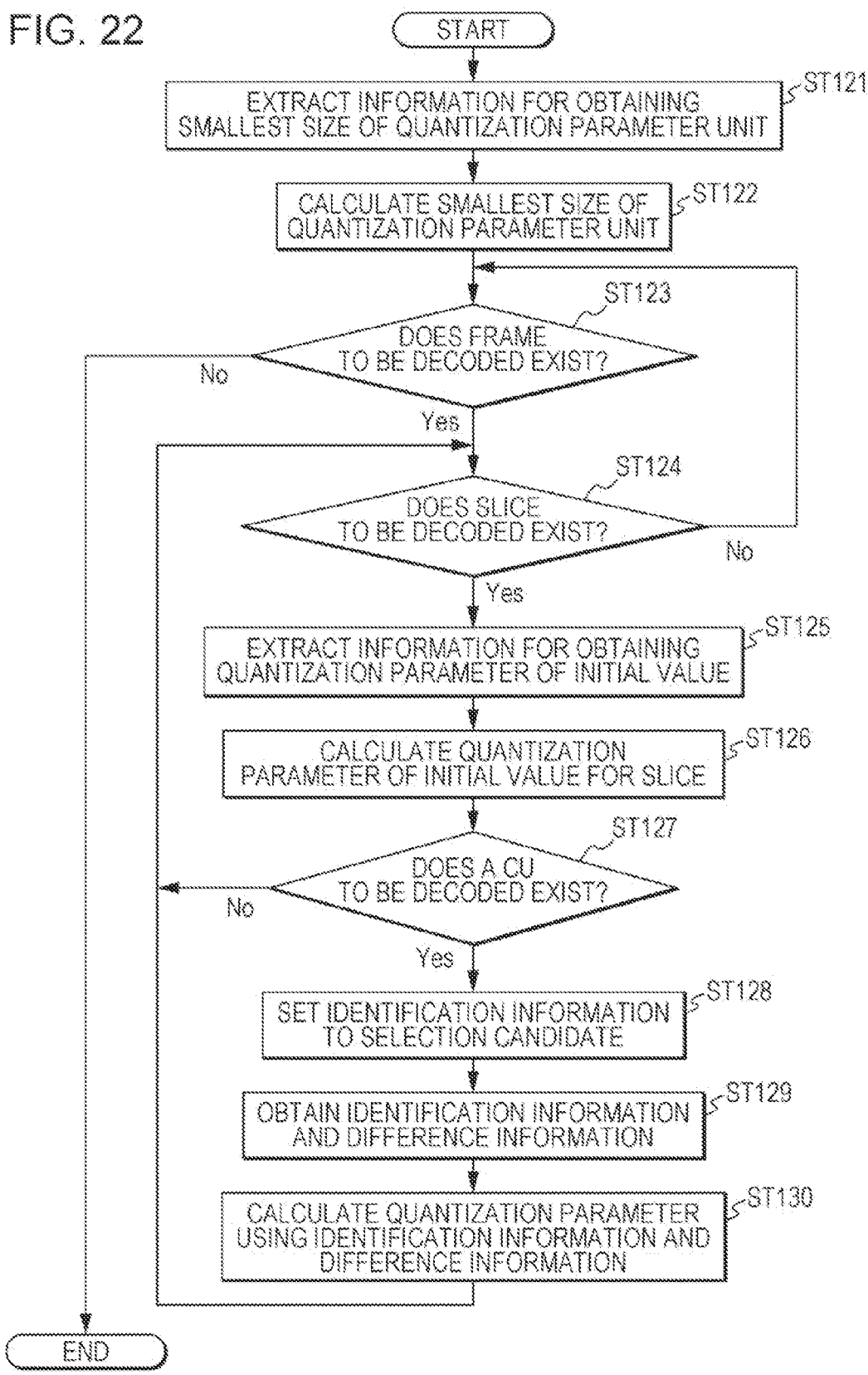
FIG. 22 is a flowchart illustrating processing regarding quantization parameters in decoding.

FIG. 22 is a flowchart illustrating processing relating to quantization parameters in decoding. In step ST121, the image decoding device 50 extracts information to obtaining the quantization parameter unit minimum size. The image decoding device 50 extracts information for obtaining the quantization parameter unit minimum size, e.g., "log 2_min_qp_unit_size_offset" from the stream information, and advances to step ST122.

In step ST122, the image decoding unit 50 calculates the quantization parameter unit minimum size. The image decoding unit 50 performs the computation of Expression (26) using "log 2_min_qp_unit_size_offset", and parameter "log 2_min_transform_unit_size_minus2" which decides the transform unit minimum size (MinTransformUnitSize), and calculates the quantization parameter unit minimum size (MinQpUnitSize). Also, the image decoding unit 50 may calculate the quantization parameter unit minimum size (MinQpUnitSize) by the computation of Expression (29).

In step ST123, the image decoding unit 50 determines whether or not there exists a frame to decode. In the event that there exists a frame to decode, the image decoding unit 50 advances to step ST124, and in the event that there exists no frame to decode, ends the processing.

In step ST124, the image decoding unit 50 determines whether or not there exists a slice to decode. In the event that there exists a slice to decode, the image decoding unit 50 advances to step ST125, and in the event that there exists no slice to decode, returns to step ST123.

In step ST125 the image decoding unit 50 extracts information for obtaining the quantization parameter of the initial value in the slice. The lossless decoding unit 52 of the image decoding unit 50 extracts, for example, "pic_init_qp_minus26" from a picture parameter set (PPS: picture parameter set). Also, "slice_qp_delta" is extracted from the slice header, and advances to step ST126.

In step ST126, the image decoding unit 50 calculates the quantization parameter of the initial value in the slice. The quantization parameter calculating unit 59 of the image decoding unit 50 performs computation of Expression (30) using "pic_init_qp_minus26" and "slice_qp_delta", calculates quantization parameter SliceQPY, and advances to step ST127.

In step ST127, the image decoding unit 50 determines whether or not there exists a coding unit CU to decode. In the event that there exists a coding unit to decode, the image decoding unit 50 advances to step ST128, and in the event that there exists none, returns to step ST124.

In step ST128, the image decoding unit 50 sets identification information to the selection candidates. The quantization parameter calculating unit 59 of the image decoding unit 50 sets identification information to the selection candidates in the same way as with the information generating unit 19 of the image encoding device 10. That is to say, the quantization parameter calculating unit 59 takes quantization parameters of decoded codings spatially or temporally peripheral to the coding unit to be decoded, as selection candidates. Also, in the event that no quantization parameters are set to the block due to being a skip block or having no residual information, or in the event that a quantization parameter is equal to another candidate, these are excluded from selection candidates. The quantization parameter calculating unit 59 sets identification information equal to the image encoding device 10, e.g., index (ref_qp_block_index), to the quantization parameters of the candidates, and advances to step ST129.

In step ST129, the image decoding unit 50 obtains identification information and difference information. The lossless decoding unit 52 of the image decoding unit 50 extracts the identification information and difference information included in the stream information at the image encoding device 10, i.e., the index (ref_qp_block_index) and difference qb_qp_delta). The lossless decoding unit 52 supplies the extracted identification information and difference information to the quantization parameter calculating unit 59 ad advances to step ST130.

In step ST130, the image decoding unit 50 uses the identification information and difference information to calculate quantization parameters. The quantization parameter calculating unit 59 of the image decoding unit 50 performs the computation of Expression (31) using the quantization parameter "ref_qp (ref_qp_block_index" corresponding to the index (ref_qp_block_index) which is identification information, and (qb_qp_delta) which is difference information. That is to say, by adding the difference to the prediction quantization parameter, the quantization parameter of the coding unit to be decoded is calculated. The quantization parameter calculating unit 59 outputs the quantization parameter of the coding unit to be decoded (CurrentQP) to the inverse quantization unit 53, and returns to step ST124.

Thus, by using identification information and difference information included in the stream information, quantization parameters related to the block to be decoded can be restored even if quantization parameters of each of the blocks are not included in the stream information. That is to say, even if the encoding efficiency of the quantization parameters has been improved by using identification information and difference information at the image encoding device 10, the quantization parameters relating to each of the blocks can be restored and decoding processing can be correctly performed to generate a decoded image at the image decoding unit 50.

<6. Other Operations of Image Encoding Device and Image Decoding Device>

With the above-described operations of the image encoding device and image decoding device, quantization parameters of encoded blocks spatially or temporally adjacent to the block to be encoded are taken as selection candidates. Also, a quantization parameter selected from the selection candidates in accordance to a quantization parameter set as to the block to be encoded is taken as a prediction quantization parameter. Further, encoding efficiency of quantization parameters is improved by including, in the stream information, identification information for selecting the prediction quantization parameter from the selection candidates, and difference information indicating the difference between the prediction quantization parameter and the quantization parameter set to the block to be encoded.

However, the selection candidates are not restricted to quantization parameters of encoded blocks spatially or temporally adjacent to the block to be encoded, and the last updated quantization parameter may be included in the selection candidates. As described later, even a block where encoded blocks spatially or temporally adjacent do not involve inverse quantization, a quantization parameter of a block at a position near to the block to be encoded can be set as a prediction quantization parameter. Further, quantization parameters may be implicitly or explicitly predicted quantization parameters of selection candidates, and difference information indicating the difference between the predicted quantization parameters and the quantization parameter of the block to be encoded, may be generated.

Next, description will be made regarding a case of deciding the quantization parameter unit minimum size (MinQpUnitSize) in accordance with the coding unit size, and implicitly or explicitly selecting a prediction quantization parameter from quantization parameters of selection candidates, as another operation of the image encoding device and image decoding device. Note that description will be made below regarding to portions differing from the image encoding device and image decoding device described above.

In the event of implicitly or explicitly selecting a prediction quantization parameter from quantization parameters of selection candidates, the image encoding device includes distinguishing information "qp_explicit_flag" indicating whether to explicitly or implicitly decide quantization parameters. Also, an arrangement may be made with the image encoding device and image decoding device where whether to implicitly decide or explicitly decide quantization parameters is decoded beforehand.

To implicitly decide quantization parameters means a prediction quantization parameter equal to the image encoding device can be selected at the image decoding device, without supplying identification information to select the prediction quantization parameters from the selection candidates from the image encoding device to the image decoding device. Specifically, there is a method of selecting a quantization parameter from the selection candidates based on a priority order decided beforehand and deciding the prediction quantization parameter, a method of taking a stochastic value of quantization parameters of the selection candidates as a prediction quantization parameter, a method of weighting quantization parameters of the selection candidates in accordance to distance from the current block, and taking a stochastic value of weighted quantization parameters as a prediction quantization parameter, or the like.

To explicitly decide quantization parameters means a prediction quantization parameter equal to the image encoding device can be selected at the image decoding device, by supplying identification information to select the prediction quantization parameters from the selection candidates from the image encoding device to the image decoding device. Specifically, there is a method of calculating index information specifying a selection candidate at the image encoding device and including this in the stream information, and using the quantization parameter of the selection candidate indicated in the index information as the prediction quantization parameter at the image decoding device, a method where index information is not included in blocks regarding which quantization is not performed, and so forth.

Figure 23:
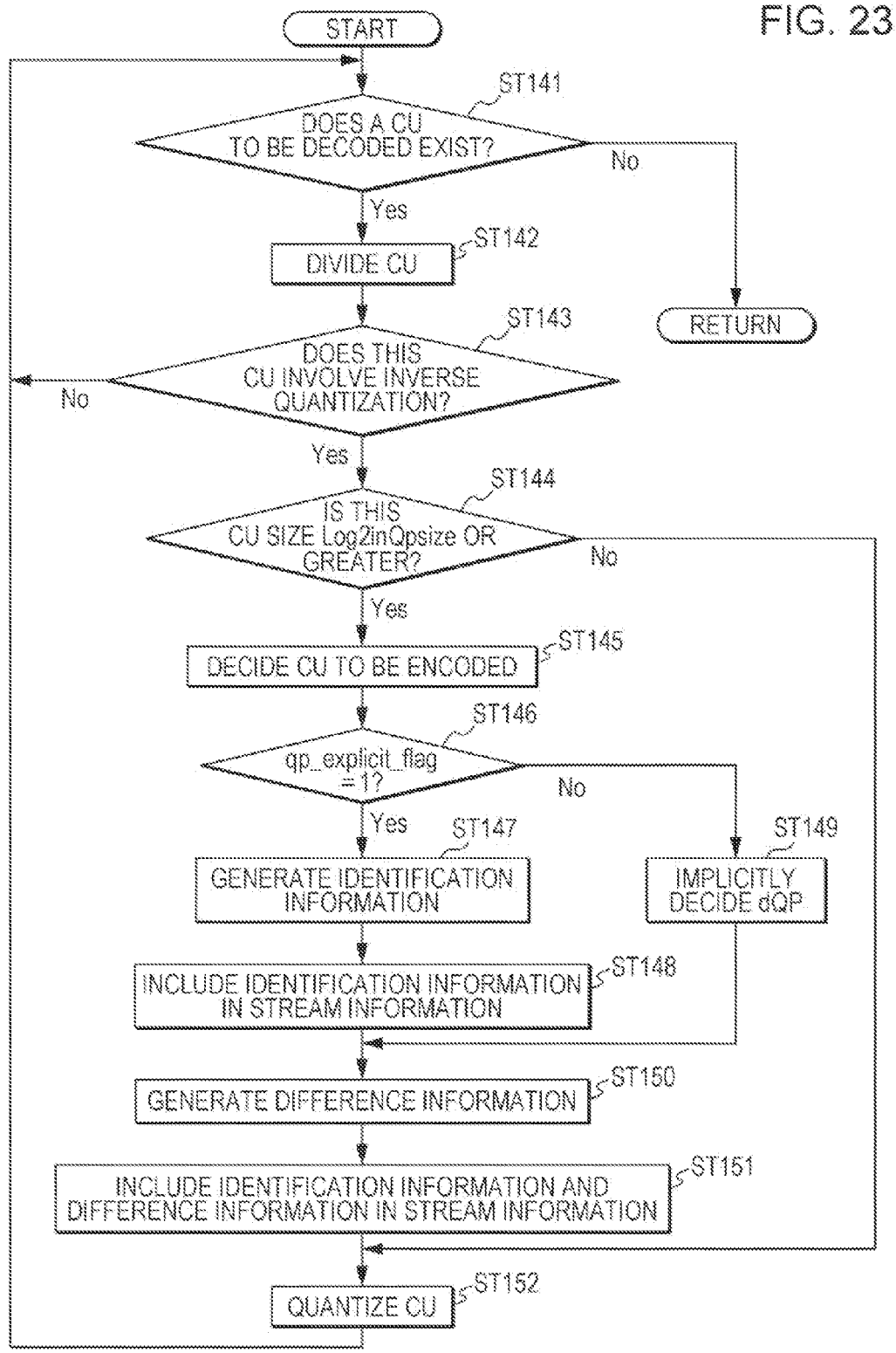
FIG. 23 is a flowchart for describing other operations of an image decoding device.

FIG. 23 is a flowchart for describing another operation of the image encoding device, illustrating slice encoding processing. In step ST141, the image encoding device 10 determines whether or not a coding unit CU to be encoded exists. In the event that a coding unit which has not been subjected to encoding processing exists in a slice to be encoding processed, the image encoding device 10 advances to step ST142. In the event that encoding processing has been completed for all coding units in the slice, the image encoding device 10 ends the slice encoding processing.

In step ST142, the image encoding device 10 splits the coding unit CU. The image encoding device 10 splits the coding unit CU as illustrated in FIG. 5, decides the size of the coding unit where the cost function value is small, and advances to step ST143. Also, in order to enable determination of the size of the coding unit where the cost function value is small, the image encoding device 10 includes in the stream information, for example, "Coding tree syntax", a "split_coding_unit_flag" equivalent to the split flag in FIG. 5.

In step ST143, the image encoding device 10 determines whether or not inverse quantization is involved with the coding unit to be encoded. In the event that the coding unit CU to be encoded is a block of a mode which does not need inverse quantization using quantization parameters to perform decoding, e.g., skip mode or I_PCM mode, or direct mode (CBP (Coded Block Pattern)=0) block, the image encoding device 10 returns to step ST141, and in the event of a block where inverse quantization is performed, advances to step ST144.

In step ST144, the image encoding device 10 determines whether or not the size of the coding unit CU is "log 2MinQpUnitSize" or greater. In the event that the size of the coding unit CU is "log 2MinQpUnitSize" or greater, the image encoding device 10 advances to step ST145. Also, in the event that the size of the coding unit CU is not "log 2MinQpUnitSize" or greater, the image encoding device 10 advances to step ST152.

In step ST145 the image encoding device 10 decides a quantization parameter QP for the coding unit CU to be encoded. The rate control unit 18 of the image encoding device 10 decides the quantization parameter in accordance with the complexity of the image of the coding unit as described above, or such that the cost function value is small, and advances to step ST146.

In step ST146, the image encoding device 10 determines whether or not distinguishing information "qp_explicit_flag" enabling identification of whether quantization parameters are to be predicted implicitly or explicitly is "1". In the event that the distinguishing information "qp_explicit_flag" is "1", and quantization parameters are to be predicted explicitly, the image encoding device 10 advances to step ST147. Also, in the event that the distinguishing information "qp_explicit_flag" is "0" and quantization parameters are to be predicted implicitly, the image encoding device 10 advances to step ST149. The image encoding device 10 compares the cost function value in the event that the distinguishing information "qp_explicit_flag" is set to "1" and the cost function value in the event that the distinguishing information "qp_explicit_flag" is set to "0", for example. The image encoding device 10 sets the value of the distinguishing information "qp_explicit_flag" such that the encoding efficiency is higher based on the comparison results. Also, in the event that the distinguishing information "qp_explicit_flag" can be set by the user, the image encoding device 10 sets the distinguishing information "qp_explicit_flag" in accordance with user instructions.

In step ST147, the image encoding device 10 generates identification information. The image encoding device 10 selects a candidate from the selection candidates such that the difference as to the quantization parameter of the coding unit to be encoded is smallest at the information generating unit 19 as described above, and takes this to be a prediction quantization parameter. The image encoding device 10 takes, for example, quantization parameters of encoded blocks spatially or temporally adjacent to the block to be encoded, the last updated quantization parameter, and the processing procedures set at the head block of the slice, as selection candidates. The image encoding device 10 selects a candidate from the selection candidates where the difference as to the quantization parameter of the coding unit to be encoded is smallest, and takes this as a prediction quantization parameter. Further, the information generating unit 19 takes the index (ref_qp_block_index) of the selected candidate to be identification information for selecting a prediction quantization parameter from the selection candidates, and advances to step ST148.

In step ST148, the image encoding device 10 includes the identification information in the stream information. The image encoding device 10 includes the identification information generated in step ST147, and advances to step ST150.

In step ST149, the image encoding device 10 implicitly decides a prediction quantization parameter dQP. That is to say, the image encoding device 10 predicts a quantization parameter with a method equal to the image decoding unit 50. As for a method for predicting the quantization parameter, the prediction quantization parameters is decoded based on a priority order decided beforehand, for example. Also, a stochastic value of multiple candidate quantization parameters may be taken as a prediction quantization parameter. Further, a method of weighting quantization parameters of the selection candidates in accordance with distance from the current block, and taking a stochastic value of weighted quantization parameters as a prediction quantization parameter, or the like, may be used. The image encoding device 10 calculates the prediction quantization parameter and advances to step ST150.

In step ST150 the image encoding device 10 generates difference information. The image encoding device 10 calculates the difference between the prediction quantization parameter indicated by the identification information generated in step ST147 and the quantization parameter decided in step ST145, or the difference between the prediction quantization parameter decided in step ST149 and the quantization parameter decided in step ST145. The image encoding device 10 generates difference information indicating the calculated difference and advances to step ST151.

In step ST151, the image encoding device 10 includes the difference information and distinguishing information in the stream information. The image encoding device 10 includes the difference information generated in step ST151 and the distinguishing information "qp_explicit_flag" used in step ST146 in the stream information. The image encoding device 10 includes the distinguishing information in one of, for example, the sequence parameter set, picture parameter set, slice header, or the like, and advances to step ST152.

In step ST152, the image encoding device 10 performs quantization of the coding unit CU. The image encoding device 10 performs quantization of the coding unit using the decided quantization parameter, and returns to step ST141.

Figure 24:
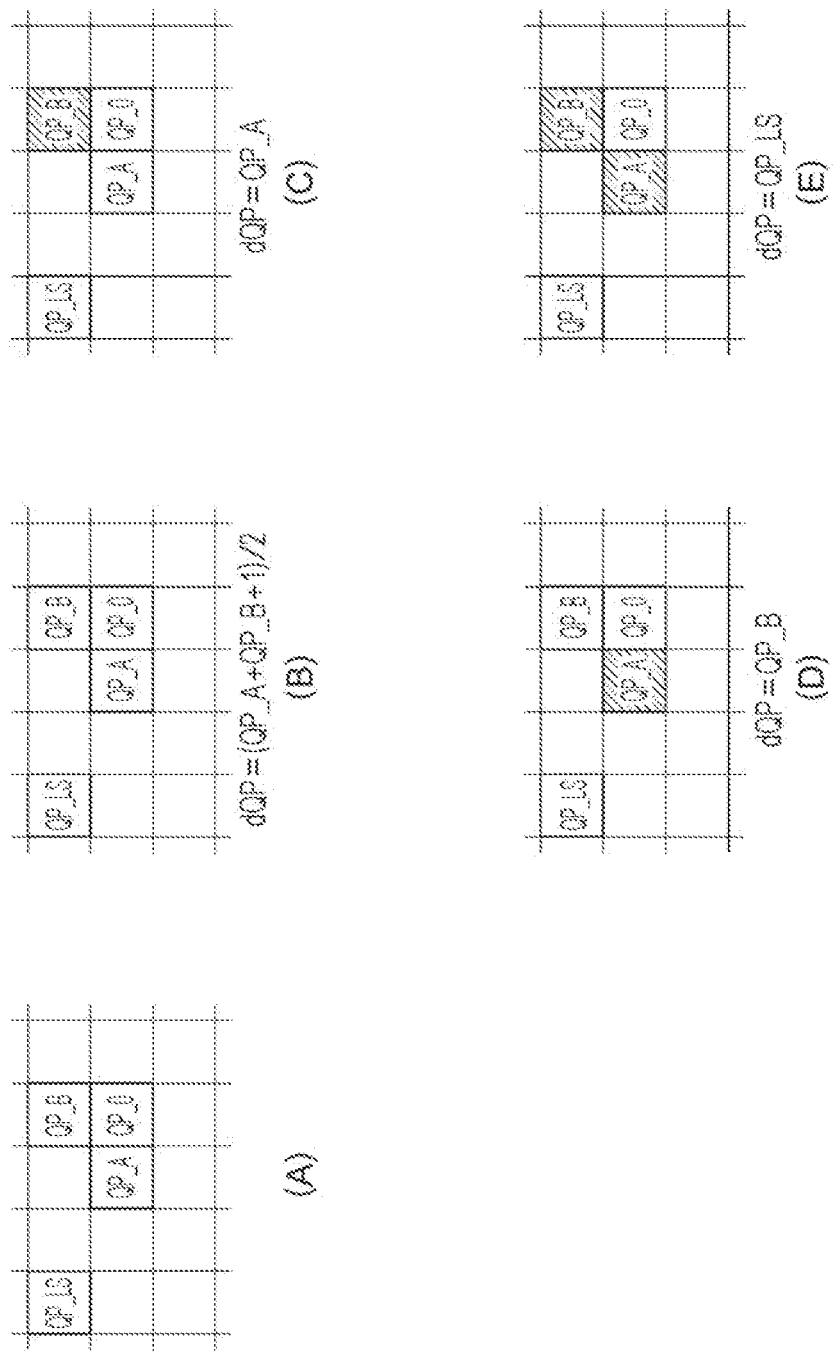
FIG. 24 is a diagram illustrating an operation example in a case of implicitly predicting quantization parameters.
Figure 25:
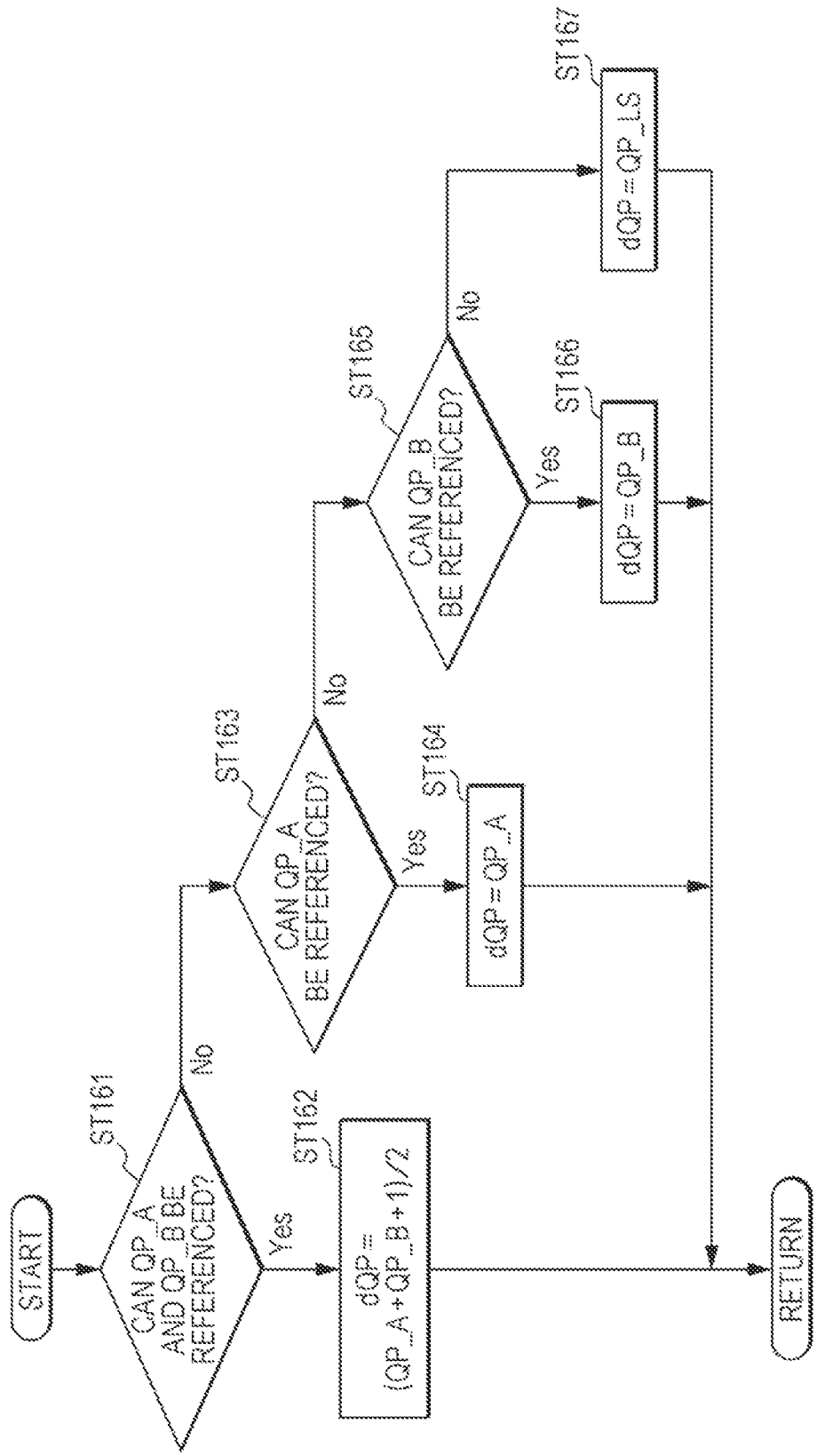
FIG. 25 is a flowchart example of a case of implicitly predicting quantization parameters.

FIG. 24 is an operation example in a case of implicitly predicting quantization parameters, and FIG. 25 illustrates a flowchart example in a case of explicitly predicting quantization parameters. Note that a case of three selection candidates is illustrated to facilitate description.

As illustrated in (A) in FIG. 24, the quantization parameter of the block to be encoded in the frame to be encoded is, for example, "QP_0". Also, the three candidates are the quantization parameter "QP_A" of the encoded block adjacent to the left, the quantization parameter "QP_B" of the adjacent encoded block, and the quantization parameter "QP_LS" of a decoded coding unit.

In FIG. 25, in step ST161 the image encoding device 10 determines whether or not quantization parameters "QP_A" "QP_B" can be referenced. In the event that the encoded block adjacent to the left and encoded block adjacent above are not blocks of a mode which does not need inverse quantization using quantization parameters to perform decoding, e.g., skip mode or I_PCM mode, or direct mode (CBP (Coded Block Pattern)=0) block, the image encoding device 10 determines that reference can be made and advances to step ST162. Also, in the event that at least one of the quantization parameter "QP_A" and the quantization parameter "QP_B" is a mode which does not need inverse quantization, advances to step ST163.

In step ST162, the image encoding device 10 takes the average value of quantization parameters "QP_A" "QP_B" to be prediction quantization parameter dQP. That is to say, as illustrated in (B) in FIG. 24, in the event that quantization parameters "QP_A" "QP_B" can be referenced, the average value of the quantization parameters "QP_A" "QP_B" "(QP_A+QP_B+1)/2" is taken as the prediction quantization parameter dQP.

In step ST163, the image encoding device 10 determines whether or not the quantization parameter "QP_A" can be referenced. In the event that the encoded block adjacent to the left is not a mode where there is no need to perform inverse quantization, the image encoding device 10 determines that this can be referenced, and advances to step ST164. Also, in the event that the encoded block adjacent to the left is a mode where there is no need to perform inverse quantization, the image encoding device 10 determines that this cannot be referenced, and advances to step ST165.

In step ST164, the image encoding device 10 takes the quantization parameter "QP_A" as the prediction quantization parameter dQP. That is to say, in the event that the quantization parameter "QP_A" can be referenced and the quantization parameter "QP_B" cannot be referenced, as illustrated in (C) in FIG. 24, the quantization parameter "QP_A" is taken as the prediction quantization parameter dQP. Note that in FIG. 24 and the later-described FIG. 26, blocks of a mode which do not need inverse quantization, i.e., blocks that cannot be referenced, are indicated by hatching.

In step ST165, the image encoding device 10 determines whether or not the quantization parameter "QP_B" can be referenced. In the event that the encoded block adjacent above is not a mode where there is no need to perform inverse quantization, the image encoding device 10 determines that this can be referenced, and advances to step ST166. Also, in the event that the encoded block adjacent above is a mode where there is no need to perform inverse quantization, the image encoding device 10 determines that this cannot be referenced, and advances to step ST167.

In step ST166, the image encoding device 10 takes the quantization parameter "QP_B" as the prediction quantization parameter dQP. That is to say, in the event that the quantization parameter "QP_B" can be referenced and the quantization parameter "QP_A" cannot be referenced, as illustrated in (D) in FIG. 24, the quantization parameter "QP_B" is taken as the prediction quantization parameter dQP.

In step ST167, the image encoding device 10 takes the quantization parameter "QP_LS" as the prediction quantization parameter dQP. As illustrated in (E) in FIG. 24, in the event that the encoded block adjacent to the left and the encoded block adjacent above are a mode where there is no need to perform inverse quantization, the quantization parameter "QP_LS" is taken as the prediction quantization parameter dQP.

Figure 26:
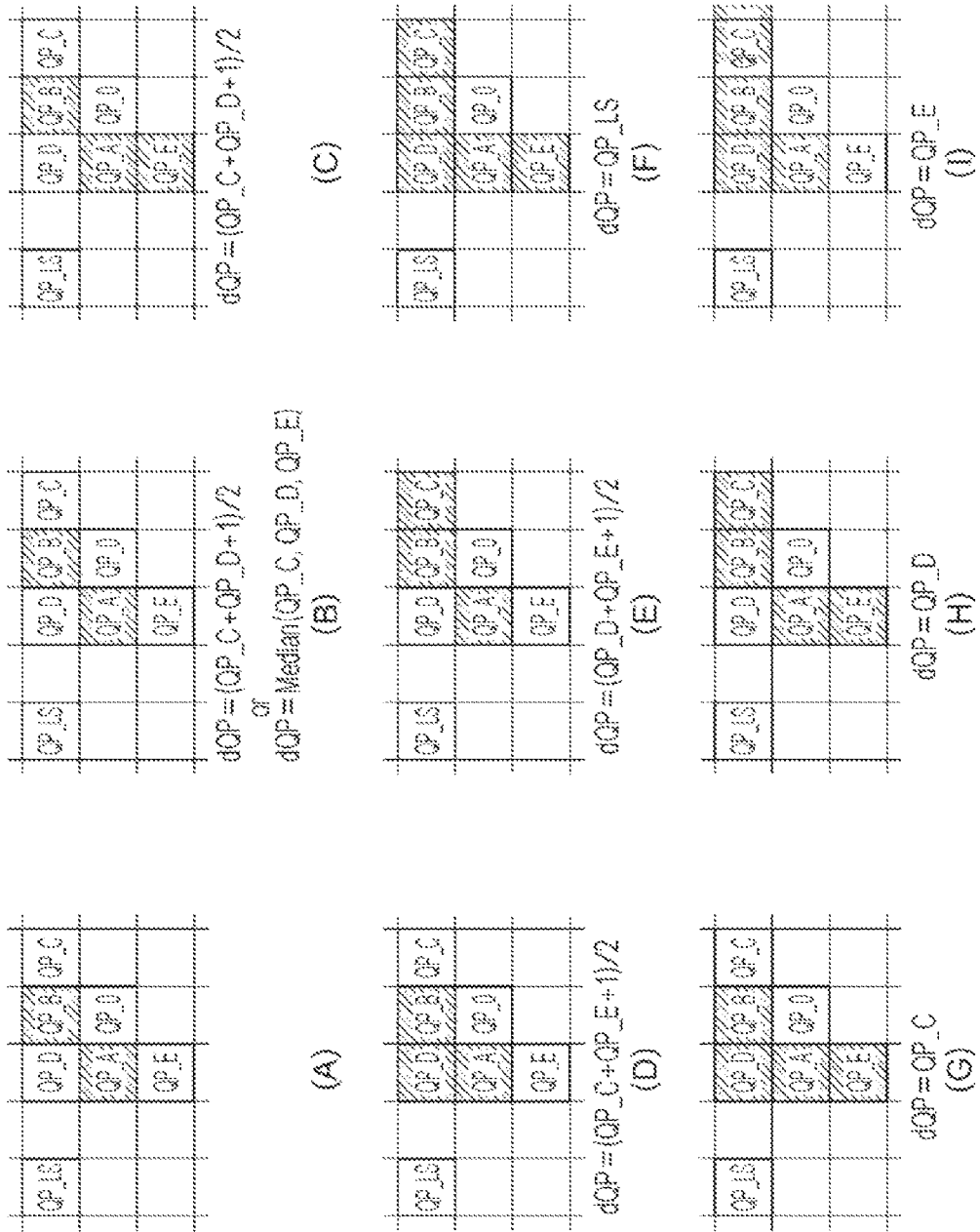
FIG. 26 illustrates another operation example in a case of implicitly predicting quantization parameters.

FIG. 26 illustrates another operation example of a case of implicitly predicting quantization parameters. For example, as illustrated in (E) in FIG. 24, in the event that the encoded block adjacent to the left and the encoded block adjacent above are a mode where there is no need to perform inverse quantization, the predetermined quantization parameter may be generated by increasing the number of selection candidates. For example, as illustrated in (A) in FIG. 26, the quantization parameter "QP_C" of the encoded block adjacent to the upper right, the quantization parameter "QP_D" of the encoded block adjacent to the upper left, and the quantization parameter "QP_E" of the encoded block adjacent to the lower left, are added to the selection candidates.

In the event that the quantization parameters "QP_C", "QP_D", and "QP_E" can be referenced as illustrated in (B) in FIG. 26, the image encoding device 10 takes the average value "(QP_C+QP_D+1)/2" of the quantization parameters "QP_C" and "QP_D", or the median, as the prediction quantization parameter dQP.

In the event that the quantization parameters "QP_C" and "QP_D" can be referenced as illustrated in (C) in FIG. 26, the image encoding device 10 takes the average value "(QP_C+QP_D+1)/2" of the quantization parameters "QP_C" and "QP_D" as the prediction quantization parameter dQP.

In the event that the quantization parameters "QP_D" and "QP_E" can be referenced as illustrated in (D) in FIG. 26, the image encoding device 10 takes the average value "(QP_D+QP_E+1)/2" of the quantization parameters "QP_D" and "QP_E" as the prediction quantization parameter dQP.

In the event that the quantization parameters "QP_C" and "QP_E" can be referenced as illustrated in (E) in FIG. 26, the image encoding device 10 takes the average value "(QP_C+QP_E+1)/2" of the quantization parameters "QP_C" and "QP_E" as the prediction quantization parameter dQP.

In the event that the quantization parameters "QP_C", "QP_D", and "QP_E" cannot be referenced as illustrated in (F) in FIG. 26, the image encoding device 10 takes the quantization parameter "QP_LS" as the prediction quantization parameter dQP. Note that FIG. 27 illustrates a program for performing the operations of (B) through (D) in FIG. 24 and (B) through (F) in FIG. 26.

Also, in the event that the number of quantization parameters that can referenced is one, as illustrated in (G) through (I) in FIG. 26, this quantization parameter that can referenced may be used as the prediction quantization parameter dQP.

Thus, the image encoding device 10 takes quantization parameters such as encoded blocks spatially or temporally adjacent to a block to be encoded as selection candidates, and selects a prediction quantization parameter from the selection candidates in accordance with a set quantization parameter. Also, the image encoding device 10 generates identification information for selecting a prediction quantization parameter from the selection candidates. Further, the image encoding device 10 generates difference information indicating difference between the prediction quantization parameter and the quantization parameter set to the block to be encoded. The image encoding device 10 includes the generated identification information and difference information in stream information. By performing such processing, the difference between the quantization parameter of the block to be encoded and the prediction quantization parameter can be prevented from becoming a great value. Accordingly, the image encoding device 10 can improve encoding efficiency of quantization parameters.

Also, in the event of implicitly prediction quantization parameters, a prediction quantization parameter equal to the image encoding device 10 can be used at the image decoding device 50, without including identification information to select prediction quantization parameters from the selection candidates in the stream information. Further, by including distinguishing information in the stream information, explicit prediction of prediction quantization parameters and implicit prediction of prediction quantization parameters can be adaptively switched.

Figure 28:
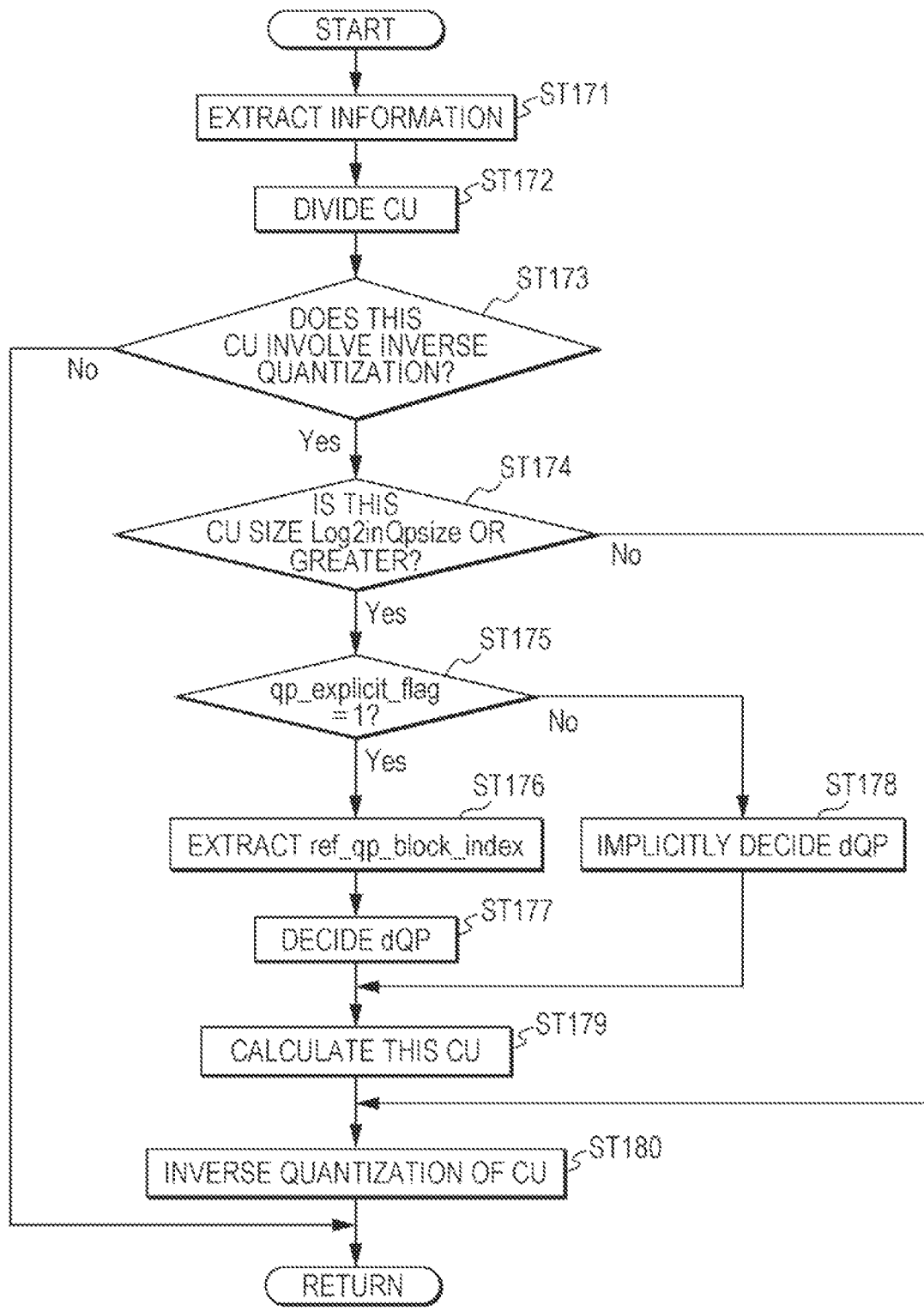
FIG. 28 is a flowchart for describing other operations of an image decoding device.

FIG. 28 is a flowchart for describing other operations of the image decoding device. In step ST127 in FIG. 22, in the event that determination is made that a coding unit to decode exists, the image decoding unit 50 performs processing from step ST171, and performs decoding of the coding unit.

In step ST171, the image decoding unit 50 extracts information. The image decoding unit 50 extracts information from the stream information to use in decoding of the coding unit. For example, information "Coding tree syntax" enabling determination of the size of the coding unit, information "log 2_min_qp_unit_size_offset" enabling determination of the quantization parameter unit minimum size, distinguishing information "qp_explicit_flag", and so forth, are extracted, and advances to step ST172.

In step ST172, the image decoding unit 50 splits the coding unit CU. The image decoding unit 50 splits the coding unit CU based on "split_coding_unit_flag" and so forth included in the stream information, and advances to step ST173.

In step ST173, the image decoding unit 50 determines whether or not the coding unit CU to be decoded involves inverse quantization. In the event that the coding unit CU to be encoded is a mode where inverse quantization using quantization parameters is performed, the image decoding unit 50 advances to step ST174, and in the event of a block where inverse quantization using quantization parameter is not necessary, the decoding processing ends.

In step ST174, the image decoding unit 50 determines whether or not the size of the coding unit CU is "log 2MinQpUnitSize" or greater. In the event that the size of the coding unit CU is "log 2MinQpUnitSize" or greater, the image decoding unit 50 advances to step ST175. Also, in the event that the size of the coding unit CU is not "log 2MinQpUnitSize" or greater, the image decoding unit 50 advances to step ST180.

In step ST175, the image decoding unit 50 determines whether or not distinguishing information "qp_explicit_flag" is "1". In the event that the distinguishing information "qp_explicit_flag" included in the stream information is "1", and quantization parameters are to be predicted explicitly, the image decoding unit 50 advances to step ST176. Also, in the event that the distinguishing information "qp_explicit_flag" is "0" and quantization parameters are to be predicted implicitly, the image decoding unit 50 advances to step ST178.

In step ST176, the image decoding unit 50 extracts the index (ref_qp_block_index) from the stream information and advances to step ST177.

In step ST177, the image decoding unit 50 decides the prediction quantization parameter dQP. The image decoding unit 50 selects the quantization parameter based on the index (ref_qp_block_index) from quantization parameters of selection candidates, equal to the image encoding device 10, decides the selected quantization parameter to be the prediction quantization parameter dQP, and advances to step ST179.

In step ST178, the image decoding unit 50 implicitly decides the prediction quantization parameter dQP. The image decoding unit 50 predicts the quantization parameter with a method equal to the image encoding device 10. As for a method for predicting the quantization parameter, a quantization parameter may be decided based on an order of priority decided beforehand, for example. Also, a stochastic value of quantization parameters of the selection candidates may be taken as a prediction quantization parameter. Further, a method of weighting quantization parameters of the selection candidates in accordance with distance from the current block, and taking a stochastic value of weighted quantization parameters as a prediction quantization parameter, or the like, may be used. The image decoding unit 50 predicts the quantization parameter and advances to step ST179.

In step ST179, the image decoding unit 50 calculates the quantization parameter QP of the current coding unit CU. The image decoding unit 50 obtains difference information "qb_qp_delta" from the stream information, adds this difference information to the prediction quantization parameter dQP, calculates the quantization parameter of the coding unit to be decoded, and advances to step ST180.

In step ST180, the image decoding unit 50 performs inverse quantization of the coding unit. The image decoding unit 50 performs inverse quantization of the coding unit using the decoded quantization parameter.

Accordingly, the image decoding unit 50 can perform decoding of images using quantization parameters equal to the quantization parameters used by the image encoding device.

<7. Case of Software Processing>

The series of the processing described above may be performed by hardware, software, or a combined configuration of both. In the case where processing by software is performed, a program in which is recorded a processing sequence is installed in memory within a computer built into dedicated hardware, and is executed. Alternatively, a program may be installed in a general-purpose computer by which various types of processing can be performed.

Figure 29:
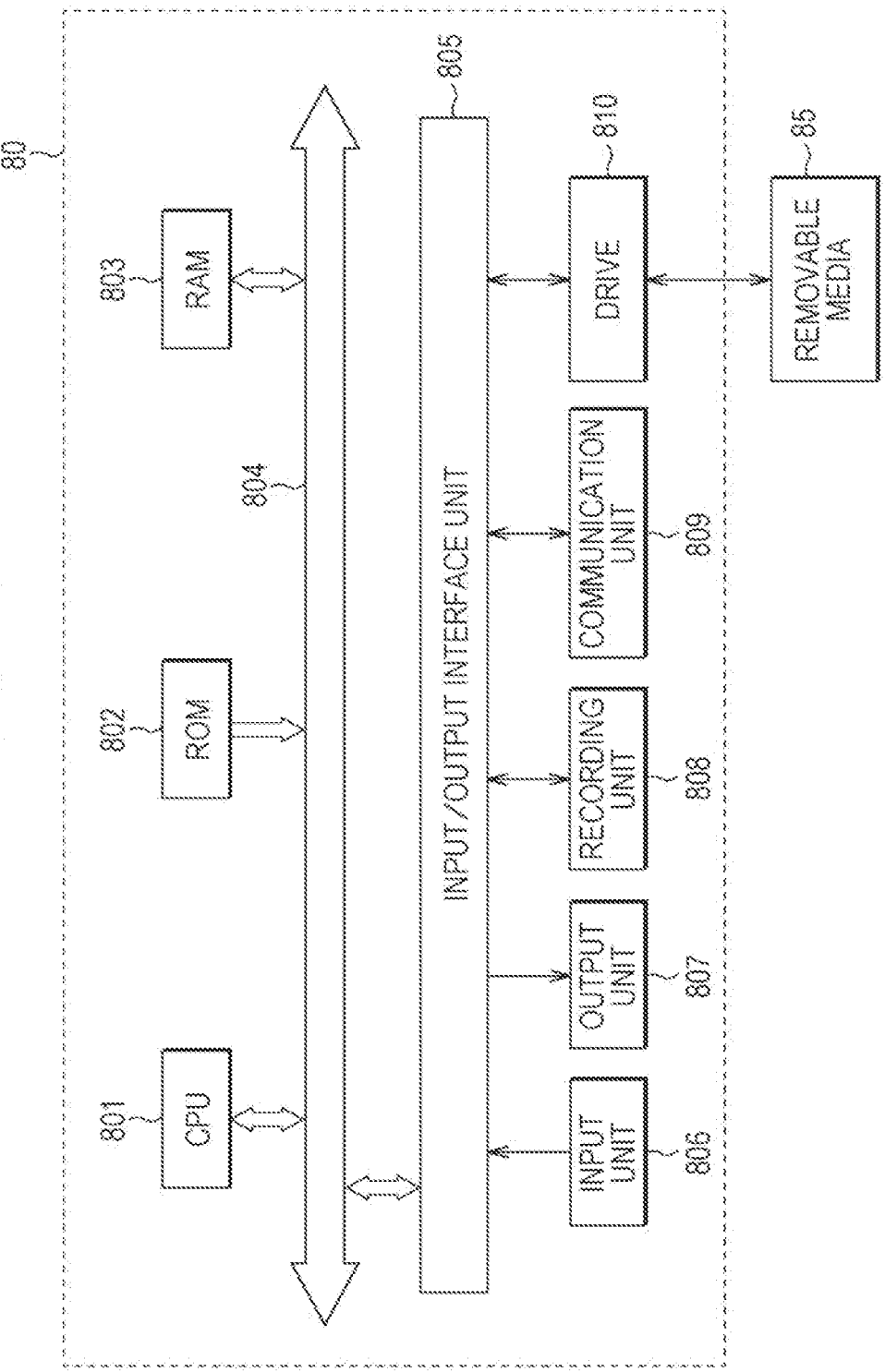
FIG. 29 is a diagram exemplifying a schematic configuration of a computer device.

FIG. 29 is a diagram exemplifying a schematic configuration of a computer device executing the above-described series of processing by a program. A CPU 801 of the computer device 80 executes various types of processing according to a program stored in ROM 802 or recorded in a recording unit 808.

Programs which the CPU 801 executes, data, and so forth, are stored in the RAM 803 as appropriate. The CPU 801, ROM 802, and RAM 803 are mutually connected via a bus 804.

An input/output interface 805 is also connected to the CPU 801 via the bus 804. An input unit 806 such as a touch panel, keyboard, mouse, microphone, or the like, and an output unit 807 made up of a display or the like, are connected to the CPU 801 as well. The CPU 801 executes various types of processing in accordance with commands input from the input unit 806. The CPU 801 then outputs the results of processing to the output unit 807.

The recording unit 808 connected to the input/output interface 805 is made up of a hard disk for example, and records programs which the CPU 801 executes, and various types of data. A communication unit 809 communicates with external devices via cable or wireless communication media such as networks like the Internet or local area networks, or digital broadcasting or the like. Also, the computer device 80 may acquire programs via the communication unit 809 and record in the ROM 802 or recording unit 808.

In the event that removable media 85 such as a magnetic disk, optical disc, magneto-optical disk, or semiconductor memory or the like is mounted to the drive 810, these are driven, and programs, data, and the like, recorded therein, are obtained. The obtained programs and data are transferred to the ROM 802 or RAM 803 or recorded unit 808 as necessary.

The CPU 801 reads out and executes a program performing the above-described series of processing, and performs encoding processing of image signals recorded in the recording unit 808 or removable media 85 or imaging signals supplied via the communication unit 809, or decoding processing of stream information.

8. Case of Applying to Electronic Devices>

Also, in the above, the H.264/AVC format has used as the encoding format/decoding format, but the present technology can be also applied to the image encoding device/image decoding device which uses an encoding format/decoding format which performs other motion prediction/compensation processing.

Furthermore, the present technology can be applied to the image encoding device and image decoding device used at the time of receiving stream information obtained by performing encoding processing, as with MPEG, H.26x or the like, via network media such as satellite broadcasting, cable TV (television), the Internet, cellular telephone, or the like, or at the time of processing on a storage medium such as an optical disc or magnetic disk, and flash memory.

Next, description will be made regarding an electronic device to which the above-described image encoding device 10 and image decoding device 50 have been applied.

Figure 30:
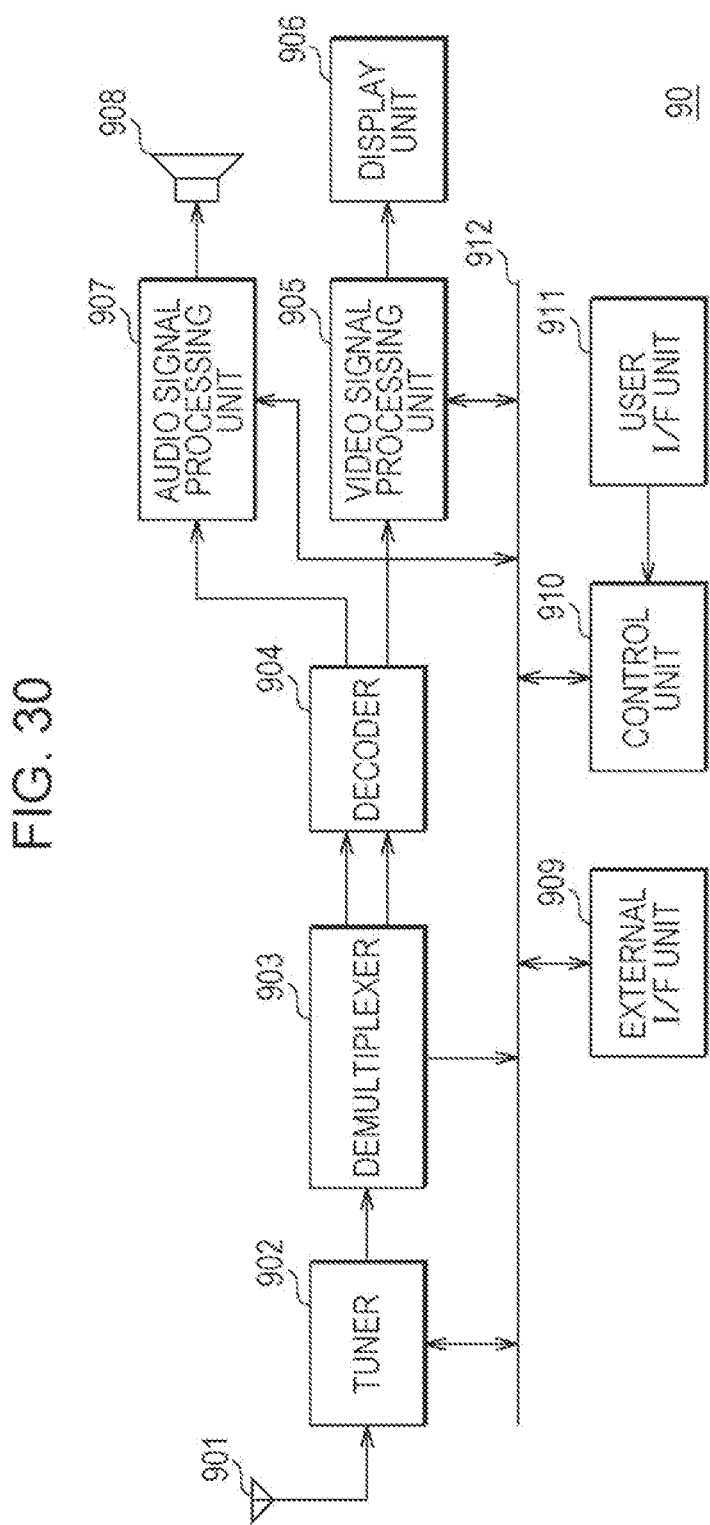
FIG. 30 is a diagram exemplifying a schematic configuration of a television receiver.

FIG. 30 exemplarily illustrates a schematic configuration of a television apparatus to which the present technology has been applied. The television apparatus 90 has an antenna 901, a tuner 902, a demultiplexer 903, a decoder 904, a video signal processing unit 905, a display unit 906, an audio signal processing unit 907, a speaker 908, and an external interface unit 909. Furthermore, the television apparatus 90 has a control unit 910, a user interface unit 911 or the like.

The tuner 902 performs demodulation by choosing a desired channel from the broadcast wave signals received at the antenna 901, and outputs the obtained stream to the demultiplexer 903.

The demultiplexer 903 extracts the packet of a video and audio of a program to be viewed from a stream and outputs the data of extracted packets to the decoder 904. Also, the demultiplexer 903 supplies the packets of data such as EPG (Electronic Program Guide) to the control unit 910. Note that in the event that scrambling has been performed, descrambling is performed at a demultiplexer or the like.

The decoder 904 performs decoding process of the packet, and outputs the video data generated by being subjected to decoding processing to the video signal processing unit 905 and audio data to the audio signal processing unit 907.

The video signal processing unit 905 performs video processing according to the noise reduction and user settings, on the video data. The video signal processing unit 905 generates video data for displaying programs on the display unit 906 and image data according to processing based on applications supplied through the network. Also, the video signal processing unit 905 generates video data to display menu screens or the like such as for selection of items, and superimposes this on video data of the program. The video signal processing unit 905 generates driving signals based on the video data generated in this way and drives the display unit 906.

The display unit 906 drives a display device (e.g., liquid crystal display device or the like) based on the driving signal from the video signal processing unit 905 so as to display the video of the program.

The audio signal processing unit 907 subjects the audio data to predetermined processing such as noise reduction and performs audio output by performing D/A converting processing and amplifying processing of the audio data after processing and supplying to the speaker 908.

The external interface unit 909 is an interface to be connected to external equipment or a network, and performs data transmission and reception of such as video data or audio data.

The user interface unit 911 is connected to the control unit 910. The user interface unit 911 is configured of an operation switch or a remote control signal receiver or the like, and supplies operation signals according to user operation to the control unit 910.

The control unit 910 is configured using a CPU (Central Processing Unit), memory or the like. The memory stores programs to be executed by the CPU, and various data necessary for the CPU to perform processing, EPG data, data obtained via a network, and the like. The program stored in the memory is read out by the CPU at a predetermined timing such as at the time of starting up the television apparatus 90 and is executed. The CPU controls each part so that the television apparatus 90 operates according to user operations by executing a program.

Note that with the television apparatus 90, a bus 912 is provided to connect a tuner 902, a demultiplexer 903, a video signal processing unit 905, an audio signal processing unit 907, an external interface unit 909 and a control unit 910.

With the television apparatus thus configured, the function of the image decoding device (image decoding method) of the present application is provided to the decoder 904. Therefore, even if processing is performed in the image encoding processing at the broadcasting station side to reduce the amount of code necessary for transmitting quantization parameters, the television device can correctly restore the quantization parameters and generate a decoded image.

Figure 31:
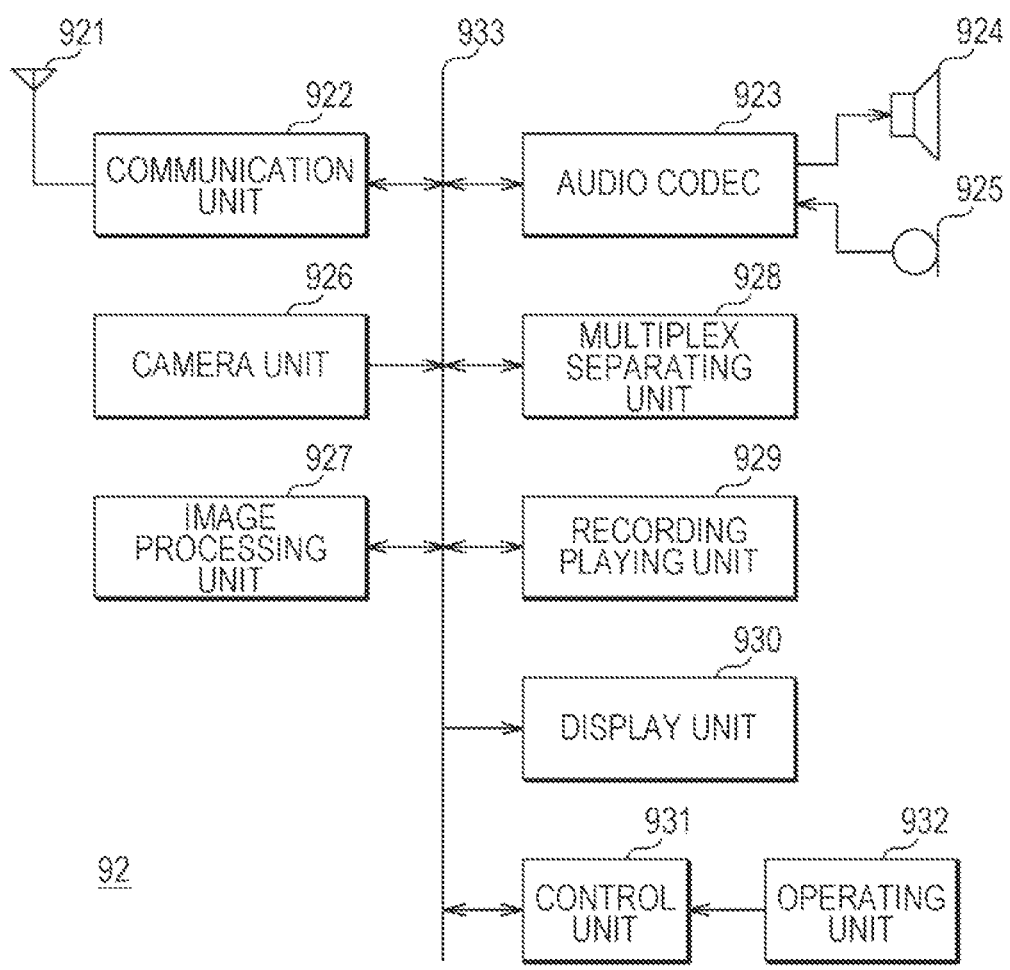
FIG. 31 is a diagram exemplifying a schematic configuration of a cellular telephone.

FIG. 31 exemplarily illustrates a schematic configuration of the cellular telephone to which the present technology has been applied. The cellular telephone 92 has a communication unit 922, an audio codec 923, a camera unit 926, an image processing unit 927, a multiplex separating unit 928, a record reproduction unit 929, a display unit 930, and a control unit 931. These are connected each other through a bus 933.

Also, an antenna 921 is connected to the communication unit 922, and a speaker 924 and microphone 925 are connected to the audio codec 923. Furthermore, an operating unit 932 is connected to the control unit 931.

The cellular telephone 92 performs various operation such as transmission and reception of audio signals, transmission and reception of email and image data, image shooting, data recording, and so forth, in various modes such as audio call mode or data communication mode.

In an audio call mode, audio signals generated at the microphone 925 are converted to audio data and data compression at the audio codec 923 and supplied to the communication unit 922. The communication unit 922 performs demodulation processing of the audio data and frequency conversion processing of audio data to generate transmission signals. Also, the communication unit 922 supplies transmission signals to the antenna 921 so as to be transmitted to an unshown base station. Also, the communications unit 922 performs amplification, frequency conversion processing, and demodulation processing of reception signals received at the antenna 921, and supplies the obtained audio data to the audio codec 923. The audio codec 923 performs data decompression of audio data and conversion to the analog audio signals and outputs to the speaker 924.

Also, in data communication mode, in the event of performing email transmission, the control unit 931 receives text data input by the operation of the operating unit 932 and displays the input text to the display unit 930. Also, the control unit 931 generates email data based on user instructions at the operating unit 932 and supplies to the communication unit 922. The communication unit 922 performs modulation processing, frequency conversion processing, and so forth of the email data, and transmits the obtained transmission signals from the antenna 921. Also, the communication unit 922 performs amplification, frequency conversion processing, and demodulation processing of the reception signals received with the antenna 921, and restores the email data. This email data is supplied to the display unit 930 to display the contents of the email.

Note that the cellular telephone 92 may store the received email data in storage medium in the recording/playback unit 929. The storage medium is any storage medium which is readable/writeable. For example, the storage medium is semiconductor memory such as RAM or built-in flash memory, removable media such as a hard disk, a magnetic disk, an MO disc, an optical disc, USB memory, a memory card, or the like.

In the event that image data is transmitted in a data communication mode, the image data generated at the camera unit 926 is supplied to the image processing unit 927. The image processing unit 927 performs encoding processing of the image data and generates stream information.

The multiplex separating unit 928 multiplexes stream information generated at the image processing unit 927 and audio data supplied from the audio codec 923 by a predetermined format and supplies to the communication unit 922. The communication unit 922 performs demodulation processing, frequency conversion processing, and the like of the multiplexed data, and transmits the obtained transmission signals from the antenna 921. Also, the communication unit 922 performs amplification, frequency conversion processing, demodulation processing, or the like of the reception signals received at the antenna 921, and restores the multiplexed data. This multiplexed data is supplied to the multiplex separating unit 928. The multiplex separating unit 928 performs separating of the multiplexed data, and supplies the stream information to the image processing unit 927 and the audio data to the audio codec 923.

The image processing unit 927 performs decoding processing of the encoded data, and generates image data. This image data is supplied to the display unit 930 to display the received image. The audio codec 923 converts the audio data into analog audio signals and supplies to the speaker 924 to output the received audio.

With the cellular telephone device thus configured, the image processing unit 927 has functions of the present application. Accordingly, data can be reduced when performing encoding processing and transmission of images, for example. Also, in the decoding processing of the received image, the quantization parameters can be restored and a decoded image can be generated.

Figure 32:
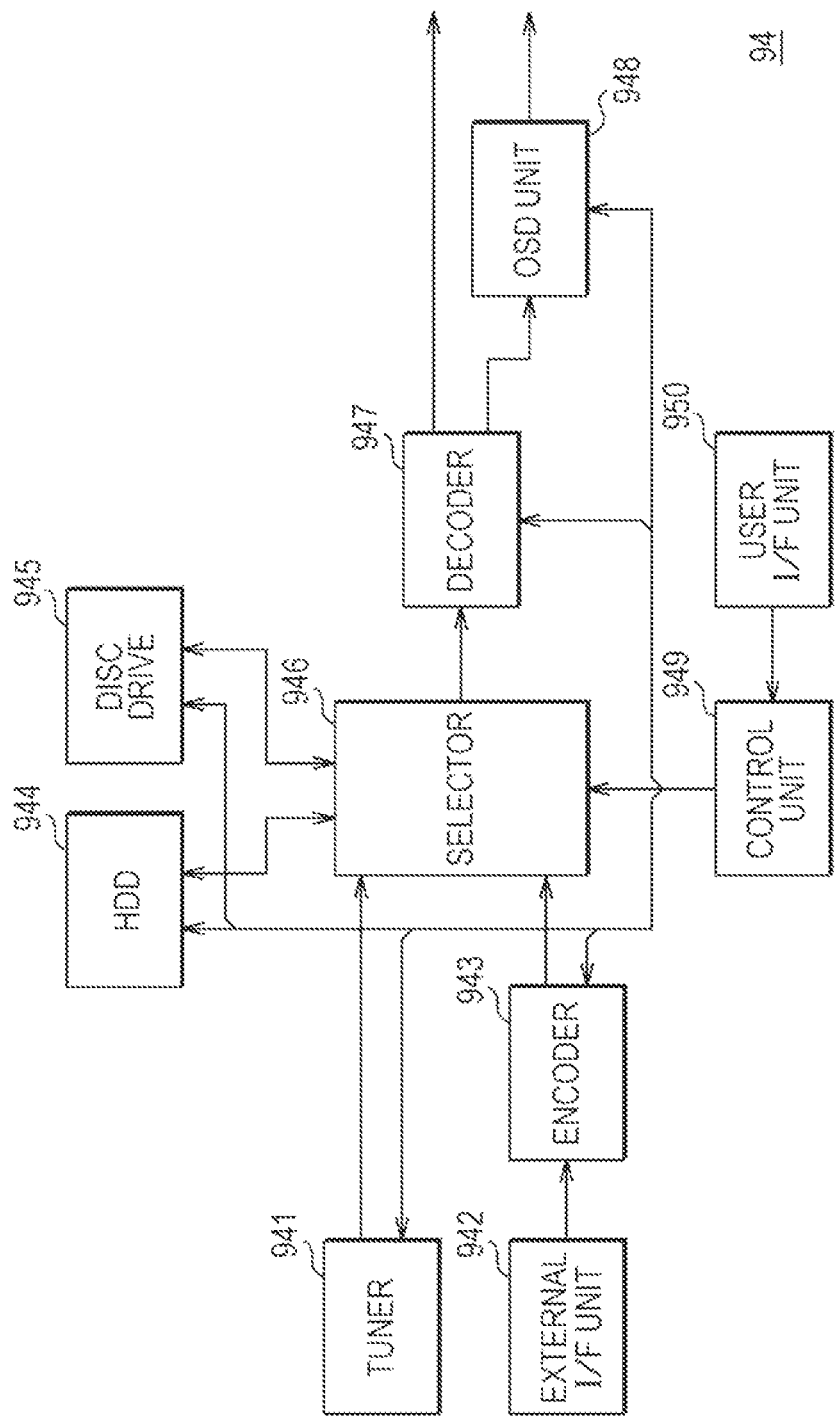
FIG. 32 is a diagram exemplifying a schematic configuration of a recording/playback device.

FIG. 32 exemplarily illustrates a schematic configuration of the recording playback device to which the present technology has been applied. The recording/playback device 94 records, for example, audio data and video data of the received broadcast program to a recording medium, and provides the recorded data to a user in a timing according to the instructions of the user. Also, an arrangement can be made such that the recording/playback device 94 may acquire, for example, audio data and video data from other devices, so as to record to a recording medium. Furthermore, an arrangement can be made such that the recording/playback device 94 may perform, by decoding audio data and video data recorded in a recording medium to output image display and audio output on monitor devices.

The recording/playback device 94 has a tuner 941, an external interface unit 942, an encoder 943, an HDD (Hard Disk Drive) unit 944, a disk drive 945, a selector 946, a decoder 947, an OSD (On-Screen Display) unit 948, a control unit 949, and a user interface unit 950.

The tuner 941 chooses a station of a desired channel from the broadcast signals received at an unshown antenna. The tuner 941 outputs the encoded stream obtained by demodulating the reception signals of the desired channel to the selector 946.

The external interface unit 942 is configured of at least any one of an IEEE1394 interface, a network interface unit, a USB interface, a flash memory interface, and so forth. The external interface unit 942 is an interface to be connected to an external device, network, memory card, or the like, and performs data reception of such as video data and audio data to record.

The encoder 943 performs encoding processing in a case where video data and audio data supplied from the external interface unit 942 are not encoded by a predetermined format and outputs stream information to the selector 946.

The HDD unit 944 records the content data such as the video or the audio, various programs, other data, or the like, in a built-in hard disk, and also reads out these at the time of playback from the hard disk.

The disk drive 945 performs recording or playback of the signals to a mounted optical disc. An optical disc is, e.g., a DVD disc (DVD-Video, DVD-RAM, DVD-R, DVD-RW, DVD+R, DVD+RW or the like) or a Blu-ray disk or the like.

The selector 946 selects, at the time of the recording of video and audio, either stream from the tuner 941 or encoder 943, and supplies to either of HDD unit 944 and disk drive 945. Also, the selector 946 supplies, at the time of the playback of video and audio, a stream output from the HDD unit 944 or disk drive 945 to the decoder 947.

The decoder 947 performs decoding process of the stream. The decoder 947 supplies the generated video data to the OSD unit 948 by performing decoding processing. Also, the decoder 947 outputs the generated audio data by performing decoding processing.

The OSD unit 948 generates video data to display menu screens or the like such as for the selection of items and superimposes this on the video data output from the decoder 947, and outputs.

The user interface unit 950 is connected to the control unit 949. The user interface unit 950 is configured of an operation switch or a remote control signal receiver or the like and supplies operation signals according to user operations to the control unit 949.

The control unit 949 is configured using a CPU or memory. The memory stores a program executed by CPU and necessary various data when the CPU performing processing. The program stored in the memory is read out and executed at a predetermined timing such as at the time of start of the recording/playback device 94, by the CPU. The CPU controls each part so that the recording/playback device 94 operates in accordance with user operation, by executing a program.

With the recording/playback device thus configured, functions of the present application are provided to the encoder 943. Therefore, data amount can be reduced when performing encoding processing and recording of images, for example. Also, in the decoding processing of the recorded image, the quantization parameters can be restored and a decoded image can be generated.

Figure 33:
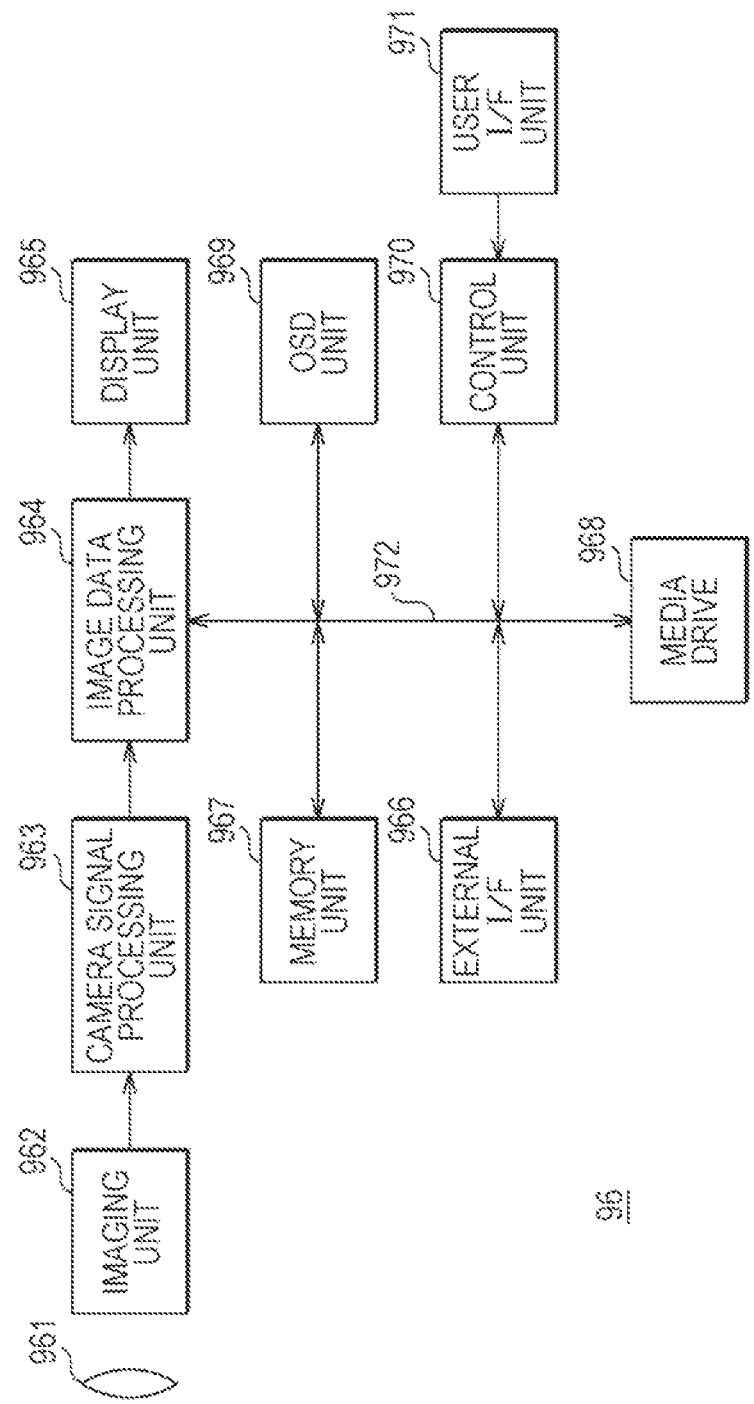
FIG. 33 is a diagram exemplifying a schematic configuration of an imaging apparatus.

FIG. 33 exemplarily illustrates a schematic configuration of an imaging apparatus to which the present invention has been applied. The imaging apparatus 96 images a subject so as to display the image of the subject on a display unit, and record this in a recording medium as image data.

The imaging apparatus 96 has an optical block 961, an imaging unit 962, a camera signal processing unit 963, an image data processing unit 964, a display unit 965, an external interface unit 966, a memory unit 967, a media drive 968, an OSD unit 969, and a control unit 970. Also, a user interface unit 971 is connected to the control unit 970. Furthermore, the image data processing unit 964 and external interface unit 966, memory unit 967, media drive 968, OSD unit 969, and control unit 970 and so forth are connected via a bus 972.

The optical block 961 is configured of a focusing lens, diaphragm mechanism, and so forth. The optical block 961 images an optical image of a subject on an imaging face of the imaging unit 962. The imaging unit 962 is configured using a CCD or CMOS image sensor, and electrical signals corresponding to the optical image are generated by photoelectric conversion and supplied to the camera signal processing unit 963.

The camera signal processing unit 963 performs various kinds of camera signal processing such as KNEE correction and gamma correction, color correction and the like, to the electrical signals supplied from the imaging unit 962. The camera signal processing unit 963 supplies the image data after camera signal processing to the image data processing unit 964.

The image data processing unit 964 performs encoding processing of the image data supplied from the camera signal processing unit 963. The image data processing unit 964 supplies the stream information generated by performing encoding processing to the external interface unit 966 and media drive 968. Also, the image data processing unit 964 performs decoding processing of the stream information supplied from the external interface unit 966 and media drive 968. The image data processing unit 964 supplies the generated image data to the display unit 965 by performing decoding processing. Also, the image data processing unit 964 performs processing to supply the image data supplied from the camera signal processing unit 963 to the display unit 965, and processing to superimpose data for display acquired from the OSD unit 969 onto the image data and supply to the display unit 965.

The OSD unit 969 generates data for display such as a menu screen or the icon made of signs, text or shapes, and outputs to the image data processing unit 964.

For example, the external interface unit 966 is configured of USB input and output terminals, and in a case of performing printing of the image, is connected to a printer. Also, a drive is connected to the external interface unit 966 according to need, and removable media such as a magnetic disk, optical disc, or the like is mounted as appropriate, and a program read out therefrom is installed according to need. Furthermore, the external interface unit 966 has a network interface connected to a predetermined network such as a LAN or the Internet. For example, according to the instructions from the user interface unit 971, the control unit 970 reads out stream information from the memory unit 967 so as to be supplied to the other devices connected via a network from the external interface unit 966. Also, the control unit 970 acquires stream information and image data supplied from other devices via a network, through the external interface unit 966, so as to supply this to the image data processing unit 964.

For example, as for a recording medium driven by the media drive 968, any removable media which is readable and writable may be used, such as a magnetic disk, an MO disk, an optical disc, and semiconductor memory. Also, with a recording medium, the kind of removable media is also optional, and may be a tape device, may be a disk or may be a memory card. As a matter of course this may be a non-contact IC card or the like.

Also, an arrangement may be made where the media drive 968 and recording medium are integrated and, for example, are configured of a non-portable storage medium such as a built-in type hard disk drive or SSD (Solid State Drive) or the like.

The control unit 970 is configured using a CPU memory, and so forth. The memory stores programs to be stored by the CPU, and various types of data necessary for the CPU to perform processing. Programs stored in the memory are read out at predetermined timing such as at the time of startup of the imaging device 96 by the CPU, and are executed. The CPU controls each part so that operations of the imaging device 96 correspond to user operations, by executing the program.

With the imaging device thus configured, the image data processing unit 964 is provided with functions of the present application. Therefore, at the time of encoding and recording the imaged image to the memory unit 967 or a recording medium, the amount of data to be recorded can be reduced. Also, in the decoding processing of the recorded image, the quantization parameters can be restored and a decoded image can be generated.

Furthermore, the present technology is not to be interpreted as being restricted to the above-described embodiments. The embodiments are disclosed exemplarily, and it is clearly understood that one skilled in the art can accomplish modifications and a substitutions of the embodiments without departing from the essence of the present technology. That is, the Claims should be taken into consideration to determine the essence of the present technology.

Also, the image decoding device and image encoding device according to the present technology may assume the following configurations.

(1) An image decoding device, including:
an information acquiring unit configured to take quantization parameters of decoded blocks spatially or temporally adjacent to a block to be decoded, as selection candidates, and extract, from stream information, difference information indicating difference as to a prediction quantization parameter selected from the selection candidates; and a quantization parameter calculating unit configured to calculate, from the prediction quantization parameter and the difference information, a quantization parameter of the block to be decoded.

(2) The image decoding device according to (1), wherein the quantization parameter calculating unit sets to the prediction quantization parameter a quantization parameter in an order indicated by identification information included in the stream information, with the adjacent decoded blocks in a predetermined order.

(3) The image decoding device according to (1), wherein the quantization parameter calculating unit performs determination of selection candidates in an order set beforehand, and sets the prediction quantization parameter based on the determination result.

(4) The image decoding device according to (1), wherein the quantization parameter calculating unit selects, based on determination information included in the stream information, performing one or the other of processing of setting to the prediction quantization parameter a quantization parameter in an order indicated by identification information included in the stream information, and processing of determining selection candidates in an order set beforehand and setting the prediction quantization parameter based on the determination result.

(5) The image decoding device according to any one of (1) through (4), wherein the quantization parameter calculating unit takes the selection candidates, having excluded from the adjacent decoded blocks at least blocks where quantization parameters are redundant or blocks where inverse quantization using quantization parameters is not performed.

(6) The image decoding device according to any one of (1) through (5), wherein, in the event that there is no selection candidate, the quantization parameter calculating unit takes a quantization parameter of an initial value in a slice as the prediction quantization parameter.

(7) The image decoding device according to any one of (1) through (6), wherein the quantization parameter calculating unit includes a quantization parameter updated last in the selection candidates.

(8) The image decoding device according to any one of (1) through (7), wherein the quantization parameter calculating unit calculates a quantization parameter of the block to be decoded by adding difference which the difference information indicates to the prediction quantization parameter.

(9) An image encoding device, comprising:

a control unit configured to set a quantization parameter as to a block to be encoded;

an information generating unit configured to take quantization parameters of encoded blocks spatially or temporally adjacent to a block to be encoded, as selection candidates, select from the selection candidates a prediction quantization parameter in accordance to the set quantization parameter, and generate difference information indicating difference between the prediction quantization parameter and the set quantization parameters; and an encoding unit configured to include the difference information in stream information generated by performing encoding processing of the block to be encoded, using the set quantization parameter.

(10) The image encoding device according to (9), wherein the information generating unit selects a quantization parameter of which the difference as to the set quantization parameter is the smallest, as the prediction quantization parameter.

(11) The image encoding device according to (10), wherein the information generating unit generates identification information indicating the order of blocks as to the selected quantization parameter, with the adjacent encoded blocks in a predetermined order;

and wherein the encoding unit includes the identification information in the stream information.

(12) The image encoding device according to (11), wherein the information generating unit takes an order of array where priority is given to one of an encoded block adjacent to the left side, an encoded block adjacent above, and an encoded block temporally adjacent.

(13) The image encoding device according to either of (11) or (12), wherein the information generating unit can switch the order of array of adjacent encoded blocks.

(14) The image encoding device according to (9), wherein the information generating unit performs determination of selection candidates in an order set beforehand, and selects the prediction quantization parameter based on the determination result.

(15) The image encoding device according to (9), wherein the information generating unit is capable of selecting between processing of selecting a quantization parameter of which the difference as to the set quantization parameter is the smallest as the prediction quantization parameter, and processing of performing determination of selection candidates in an order set beforehand and selecting the prediction quantization parameter based on the determination result, and generates determination information indicating the selected processing;

and wherein the encoding unit includes the determination information in the stream information.

(16) The image encoding device according to any one of (9) through (15), wherein the information generating unit takes the selection candidates, having excluded from the adjacent encoded blocks at least blocks where quantization parameters are redundant or blocks where quantization using quantization parameters is not performed.

(17) The image encoding device according to any one of (9) through (16), wherein, in the event that there is no selection candidate, the information generating unit generates difference information indicating difference between a quantization parameter of an initial value in a slice, and the set quantization parameters.

(18) The image encoding device according to any one of (9) through (17), wherein the information generating unit includes a quantization parameter updated last in the selection candidates.

INDUSTRIAL APPLICABILITY

With the image decoding device, image encoding device, and method thereof, according to this technology, quantization parameters of encoded blocks spatially or temporally adjacent to a block to be encoded are taken as selection candidates, and a prediction quantization parameter is selected from the selection candidates in accordance to the set quantization parameter. Difference information indicating difference between the prediction quantization parameter and the quantization parameters set as to the block to be encoded is generated. Accordingly, the difference of quantization parameters can be prevented from becoming a great value, and encoding efficiency of quantization parameters can be improved. Also, in a case of decoding stream information where difference information is included, a prediction quantization parameter is selected from quantization parameters of decoded blocks spatially or temporally adjacent to a block to be decoded, and a quantization parameter of the block to be decoded is calculated from the prediction quantization parameter and the difference information. Accordingly, even in the event that stream information is generated with improved encoding efficiency of quantization parameters, in the event of decoding this stream information the quantization parameters can be restored based on the prediction quantization parameter and difference information, and decoding processing can be correctly performed. Accordingly, this is suitable for equipment which transmits/receives stream information obtained by performing encoding in block increments, via network media such as satellite broadcasting, cable TV, the Internet, cellular telephones, and the like, and equipment and the like which processes this on storage media such as optical discs, magnetic disks, flash memory, and so forth.

REFERENCE SIGNS LIST

10 image encoding device
11 A/D conversion unit
12, 57 screen rearranging buffer
13 subtracting unit
14 orthogonal transform unit
15 quantization unit
16 lossless encoding unit
17, 51 storage buffer
18 rate control unit
19 information generating unit
21, 53 inverse quantization unit
22, 54 inverse orthogonal transform unit
23, 55 adding unit
24, 56 deblocking filter
26, 61 frame memory
31, 71 intra prediction unit
32 motion prediction/compensation unit
33 prediction image/optimal mode selecting unit
50 image decoding device
52 lossless decoding unit
58 D/A converting unit
59 quantization parameter calculating unit
62, 73 selector
72 motion compensation unit
80 computer device
90 television apparatus
92 cellular telephone
94 recording/playback device
96 imaging apparatus
191 quantization parameter memory unit
192 difference computing unit
591 computing unit
592 quantization parameter memory unit

| Reference Signs List | |
|---|---|
| 10 | image encoding device |
| 11 | A/D conversion unit |
| 12, 57 | screen rearranging buffer |
| 13 | subtracting unit |
| 14 | orthogonal transform unit |
| 15 | quantization unit |
| 16 | lossless encoding unit |
| 17, 51 | storage buffer |
| 18 | rate control unit |
| 19 | information generating unit |
| 21, 53 | inverse quantization unit |
| 22, 54 | inverse orthogonal transform unit |
| 23, 55 | adding unit |
| 24, 56 | deblocking filter |
| 26, 61 | frame memory |
| 31, 71 | intra prediction unit |
| 32 | motion prediction/compensation unit |
| 33 | prediction image/optimal mode selecting unit |
| 50 | image decoding device |
| 52 | lossless decoding unit |
| 58 | D/A converting unit |
| 59 | quantization parameter calculating unit |
| 62, 73 | selector |
| 72 | motion compensation unit |
| 80 | computer device |
| 90 | television apparatus |
| 92 | cellular telephone |
| 94 | recording/playback device |
| 96 | imaging apparatus |
| 191 | quantization parameter memory unit |
| 192 | difference computing unit |
| 591 | computing unit |
| 592 | quantization parameter memory unit |

The invention claimed is:

1. An image decoding method, comprising:
obtaining, when a block adjacent to the left of a current block and a block adjacent above the current block are referenceable, a prediction quantization parameter derived from an average value of a quantization parameter of the block adjacent to the left and a quantization parameter of the block adjacent above;
obtaining, when the block adjacent to the left and the block adjacent above are not referenceable, the prediction quantization parameter derived from a quantization parameter of a processing unit not adjacent to the current block;
obtaining, from bit stream information, a difference information indicating a difference between the obtained prediction quantization parameter and a quantization parameter of the current block; and
generating the quantization parameter of the current block, from the prediction quantization parameter and the difference information.

2. The image decoding method of claim 1,
wherein, when the block adjacent to the left and the block adjacent above are not referenceable, a quantization parameter of a previous block is derived to obtain the prediction quantization parameter.

3. The image decoding method of claim 1,
wherein the block is a coding unit, and the coding unit has a hierarchical structure defined by a hierarchical depth.

4. The image decoding method of claim 3, further comprising:
performing an inverse quantization by a transform unit included in the coding unit, based on the calculated quantization parameter of the current block.

5. The image decoding method of claim 1,
wherein the quantization parameter of the processing unit not adjacent to the current block is an initial value of a quantization parameter in a slice.

6. An information processing apparatus comprising:
a circuitry configured to:
obtain, when a block adjacent to the left of a current block and a block adjacent above the current block are referenceable, a prediction quantization parameter derived from an average value of a quantization parameter of the block adjacent to the left and a quantization parameter of the block adjacent above;

obtain, when the block adjacent to the left and the block adjacent above are not referenceable, the prediction quantization parameter derived from a quantization parameter of a processing unit not adjacent to the current block;

obtain, from bit stream information, a difference information indicating a difference between the obtained prediction quantization parameter and a quantization parameter of the current block; and generate the quantization parameter of the current block, from the prediction quantization parameter and the difference information.

7. The information processing apparatus of claim 6, wherein, when the block adjacent to the left and the block adjacent above are not referenceable, a quantization parameter of a previous block is derived to obtain the prediction quantization parameter.

8. The information processing apparatus of claim 6, wherein the block is a coding unit, and the coding unit has a hierarchical structure defined by a hierarchical depth.

9. The information processing apparatus of claim 8, wherein the processing circuitry is further configured to:
perform an inverse quantization by a transform unit included in the coding unit, based on the calculated quantization parameter of the current block.

10. The information processing apparatus of claim 6, further comprising:
a video signal processing circuit,
wherein the processing circuitry is further configured to decode the current block according to the quantization parameter and obtain video data, and
wherein the video signal processing circuit is configured to perform video processing on the video data.

11. The information processing apparatus of claim 10, wherein the video processing performed on the video data comprises a noise reduction of the video data.

12. The information processing apparatus of claim 11, further comprising:
a display circuit configured to drive a display device to display the video data.

13. The information processing apparatus of claim 10, further comprising:
a display circuit configured to drive a display device to display the video data.

14. The information processing apparatus of claim 6, further comprising:
a demultiplexer configured to extract encoded video data and encoded audio data from a bit stream, wherein the encoded video data includes the bit stream information.

15. The information processing apparatus of claim 14, further comprising:
a tuner circuit configured to perform demodulation by choosing a desired channel from broadcast wave signals received at an antenna and obtain the bit stream including the encoded video data and the encoded audio data.

16. The information processing apparatus of claim 14, further comprising:
an audio signal processing circuit configured to perform predetermined processing on audio data obtained by decoding the encoded audio data.

17. The information processing apparatus of claim 16, wherein the predetermined processing performed on the audio data by the audio signal processing circuit comprises a noise reduction of the audio data.

18. The information processing apparatus of claim 17, further comprising:
an audio codec circuit configured to convert the audio data into analog audio signals.

19. The information processing apparatus of claim 16, further comprising:
an audio codec circuit configured to convert the audio data into analog audio signals.

20. The information processing apparatus of claim 6, wherein the quantization parameter of the processing unit not adjacent to the current block is an initial value of a quantization parameter in a slice.

* * * * *